US012435831B2

(12) United States Patent
Fugallo, III et al.

(10) Patent No.: US 12,435,831 B2
(45) Date of Patent: Oct. 7, 2025

(54) CONSTRUCTION ANCHOR APPARATUS, SYSTEM AND METHODOLOGY

(71) Applicant: Anchor Ring Solutions LLC, Pen Argyl, PA (US)

(72) Inventors: Joseph A. Fugallo, III, East Meadow, NY (US); Joseph Fugallo, East Meadow, NY (US)

(73) Assignee: Anchor Ring Solutions, LLC, Pen Argyl, PA (US)

( * ) Notice: Subject to any disclaimer, the term of this patent is extended or adjusted under 35 U.S.C. 154(b) by 312 days.

(21) Appl. No.: 18/097,913

(22) Filed: Jan. 17, 2023

(65) Prior Publication Data

US 2023/0228371 A1    Jul. 20, 2023

Related U.S. Application Data

(60) Provisional application No. 63/352,205, filed on Jun. 14, 2022, provisional application No. 63/300,417, filed on Jan. 18, 2022.

(51) Int. Cl.
| | |
|---|---|
| *F16M 13/02* | (2006.01) |
| *B28B 23/00* | (2006.01) |
| *H02G 3/04* | (2006.01) |

(52) U.S. Cl.
CPC ........... *F16M 13/02* (2013.01); *B28B 23/005* (2013.01); *B28B 23/0056* (2013.01); *H02G 3/0456* (2013.01)

(58) Field of Classification Search
CPC ........ E04B 1/4121; E04B 1/41; E04B 1/3776; F16M 13/02; E04G 21/185; E04G 21/142
USPC .................................................. 52/699, 698
See application file for complete search history.

(56) References Cited

U.S. PATENT DOCUMENTS

| | | | | |
|---|---|---|---|---|
| 2,719,747 | A | | 10/1955 | Layne |
| 4,007,563 | A | * | 2/1977 | Nakagawa ............ E04D 3/3606 52/378 |
| 4,068,879 | A | * | 1/1978 | Torbet .................... B66C 1/666 52/707 |
| 4,325,575 | A | | 4/1982 | Holt |
| 5,286,130 | A | * | 2/1994 | Mueller .................. F16G 15/00 294/215 |

(Continued)

OTHER PUBLICATIONS

International Search Report for Counterpart PCT/US2023/11022 Dated Apr. 13, 2023.

(Continued)

*Primary Examiner* — Paola Agudelo
(74) *Attorney, Agent, or Firm* — RowanTree Law Group, PLLC; Joseph W. Schmidt

(57) ABSTRACT

A construction anchoring system includes one or more anchor apparatuses which are mountable relative to a form used to create a concrete support structure. The concrete is deposited in the form and cures whereby the one or more anchor apparatuses becomes embedded within the concrete support structure. The embedded anchor apparatus is readily accessible to be coupled with, or to support, construction supplies or equipment such as ductwork, electrical cables, plumbing, sprinklers, safety lines or fences, etc. within a construction site. A plurality of anchor apparatuses may be mounted relative to the concrete form to create a system for organizing the installation of construction materials and/or safety equipment.

18 Claims, 42 Drawing Sheets

(56) References Cited

U.S. PATENT DOCUMENTS

| | | | | |
|---|---|---|---|---|
| 5,428,936 | A | * | 7/1995 | Roth ................. E04B 1/4157 248/327 |
| 5,560,664 | A | * | 10/1996 | Lotze ................... B66C 1/12 294/215 |
| 5,634,734 | A | * | 6/1997 | Schron, Jr. ............ B66C 1/66 294/215 |
| 6,109,587 | A | * | 8/2000 | Peacock ................ B66C 1/66 249/91 |
| 6,267,422 | B1 | * | 7/2001 | Alba .................... B66C 1/66 294/215 |
| RE46,831 | E | * | 5/2018 | Francies, III .......... E04G 15/04 |
| 2006/0185314 | A1 | * | 8/2006 | Sack ................. E04G 21/142 52/698 |
| 2011/0262263 | A1 | | 10/2011 | Comerford |
| 2012/0306226 | A1 | * | 12/2012 | Alba .................... B66C 1/66 294/215 |
| 2015/0197931 | A1 | * | 7/2015 | Espinosa .............. E04C 5/16 52/699 |
| 2016/0069066 | A1 | * | 3/2016 | Connell ............. F16B 5/0225 52/701 |
| 2021/0271787 | A1 | * | 9/2021 | Fugallo, III .......... E04G 21/185 |
| 2022/0275819 | A1 | * | 9/2022 | Ziltener .............. E04B 1/4121 |

OTHER PUBLICATIONS

Written Opinion for Counterpart PCT/US2023/11022 Dated Apr. 13, 2023.

* cited by examiner

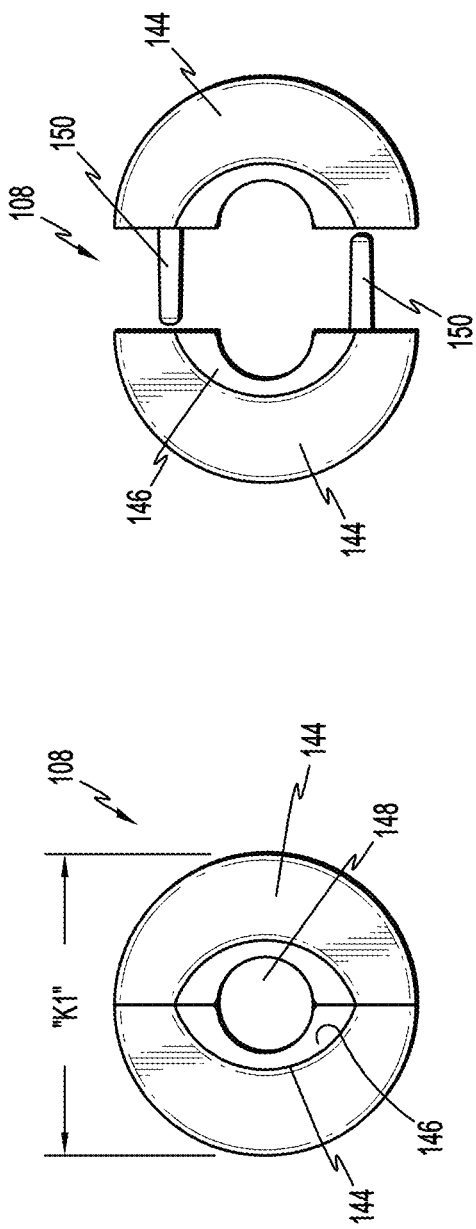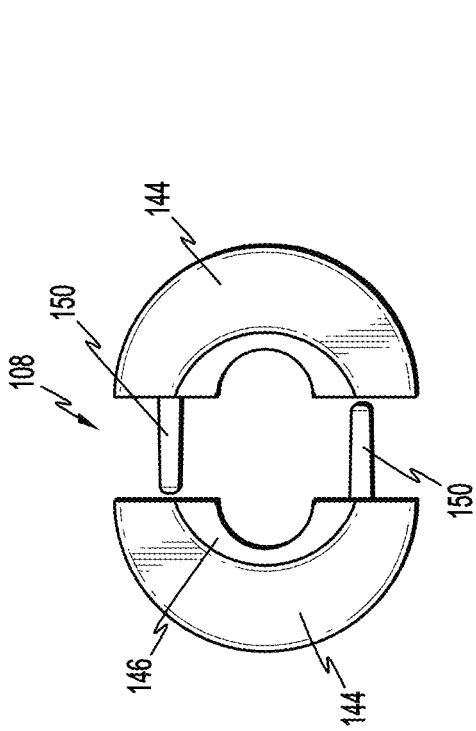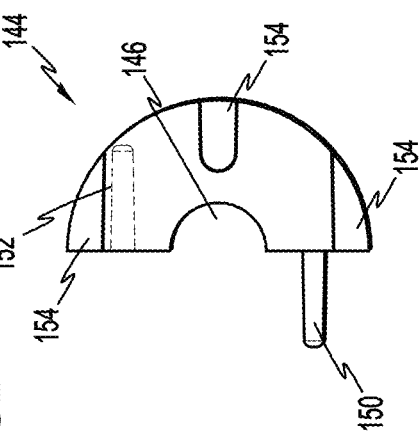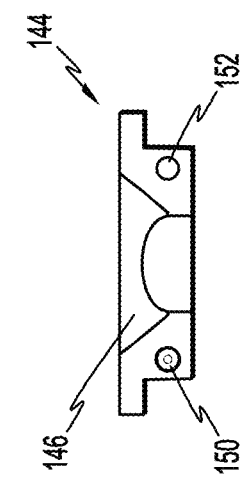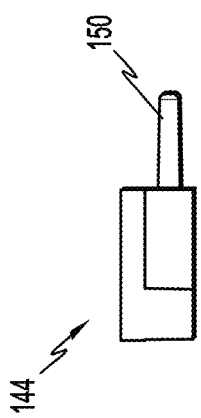

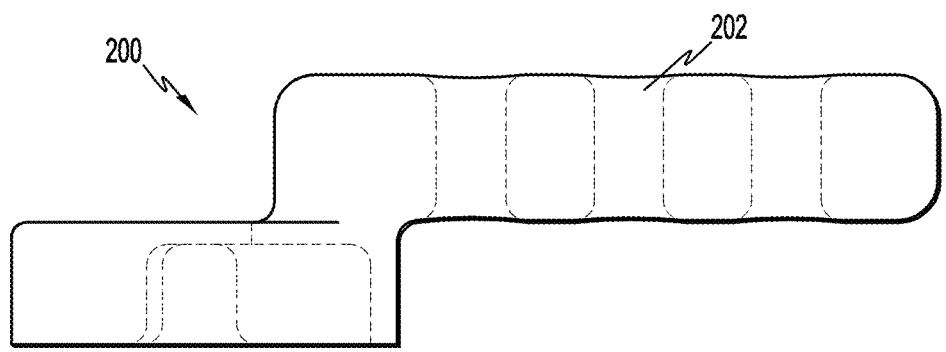
FIG. 12A
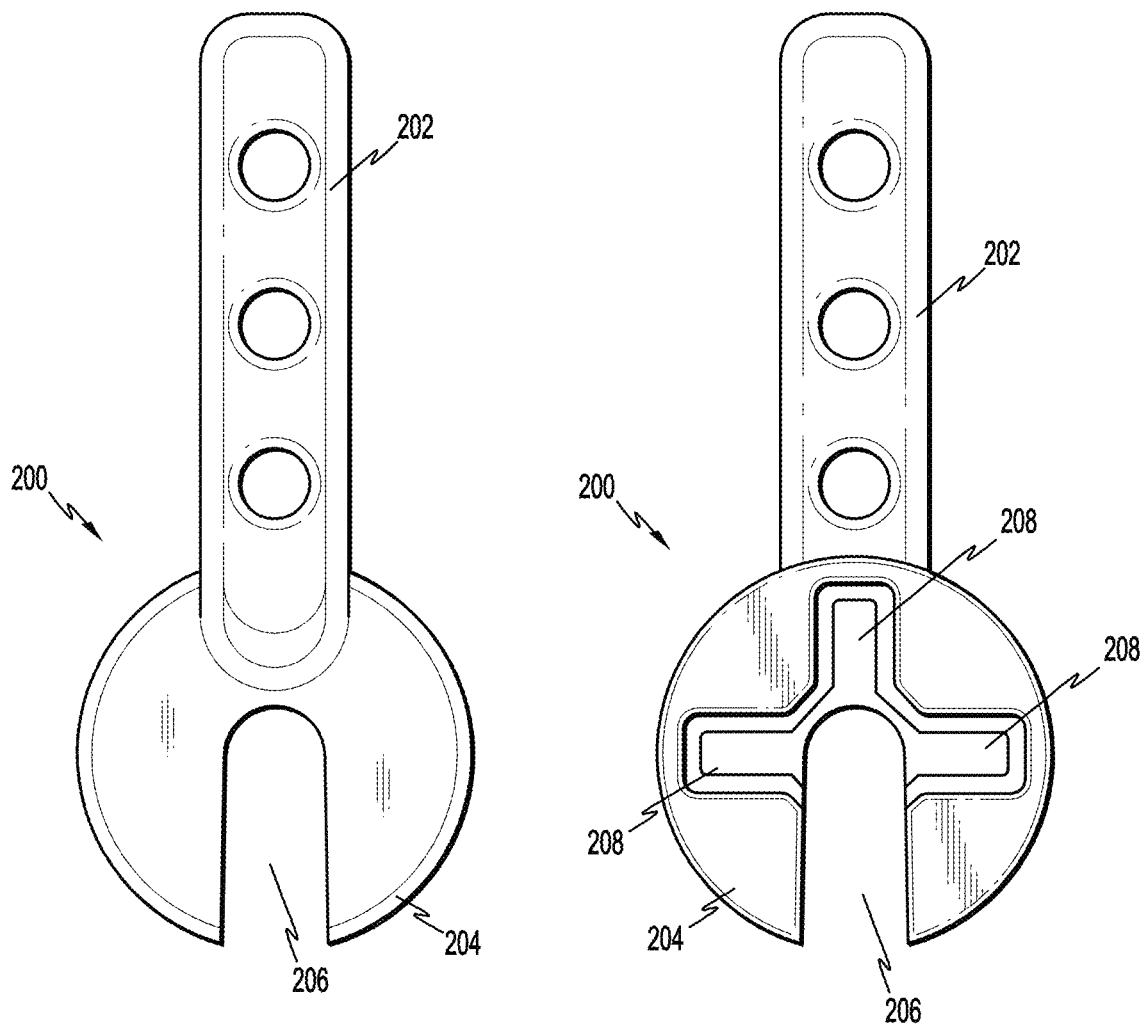
FIG. 12B   FIG. 12C

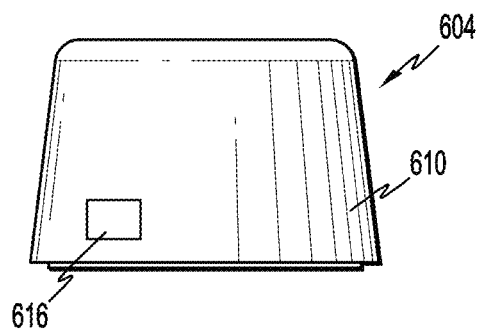
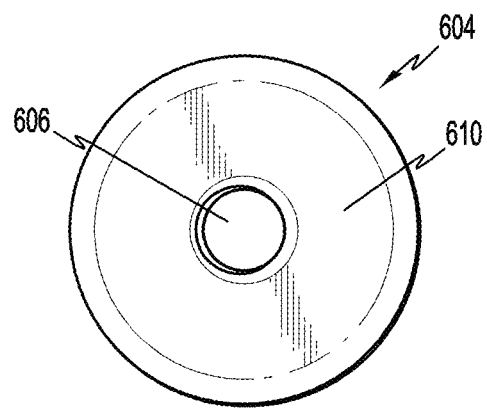
FIG. 25A  FIG. 25B
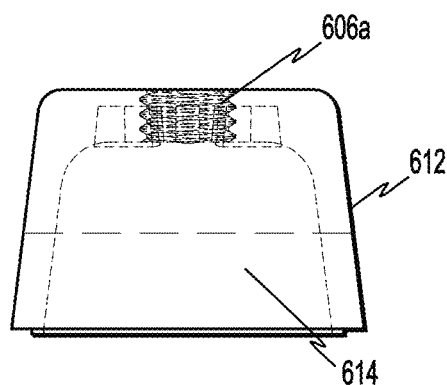
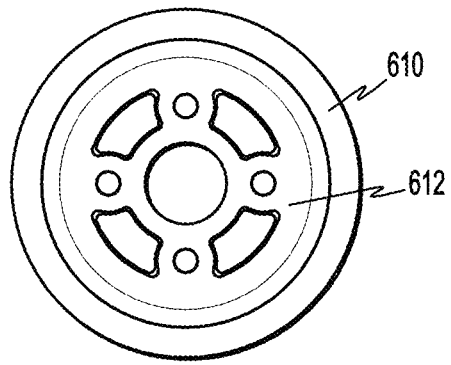
FIG. 25C  FIG. 25D

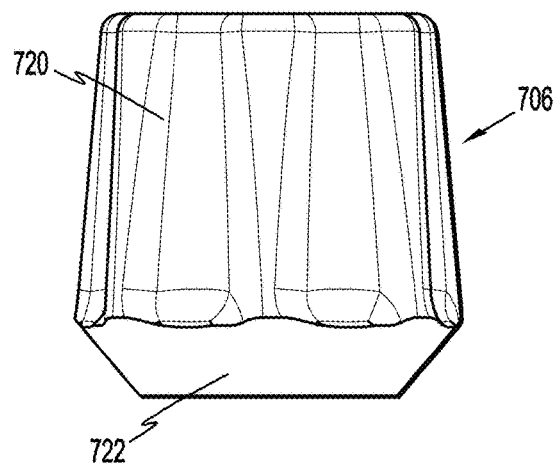
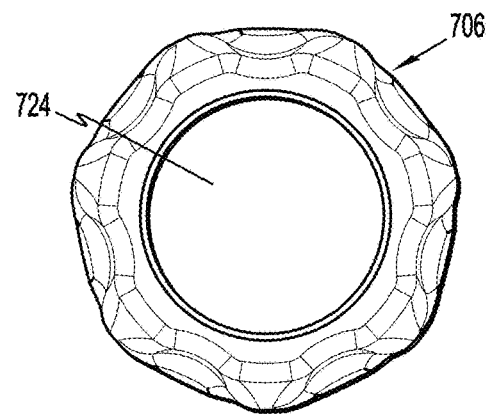
FIG. 35A  FIG. 35B
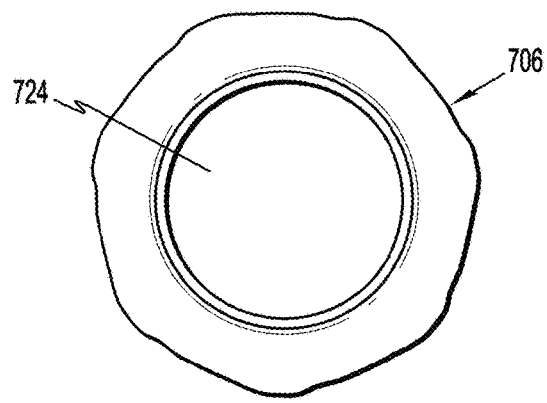
FIG. 35C

CONSTRUCTION ANCHOR APPARATUS, SYSTEM AND METHODOLOGY

CROSS REFERENCE TO RELATED APPLICATIONS

The present application claims priority to and the benefit of U.S. provisional patent application Ser. No. 63/300,417, filed Jan. 18, 2022, and U.S. provisional patent application Ser. No. 63/352,205, filed Jun. 14, 2022, the contents of each application being incorporated herein by reference in their respective entireties.

BACKGROUND

1. Technical Field

The present disclosure relates to a construction anchoring system, and, in particular, relates to an anchoring system including one or more anchor apparatuses which are mountable relative to a form used to create a concrete support structure.

2. Background of Related Art

Currently, during construction of residential and/or commercial building structures, provisions are made to accommodate the various electrical, plumbing, sprinkler, ductwork supplies, etc. to be incorporated in the final completed unit. With construction involving concrete or concrete structural elements, contractors are usually required to drill into the cured concrete to embed a fastener, hook, rod or the like to couple and run, e.g., electrical lines along a horizontal beam, vertical beam or a ceiling. Embedding a fastener or hook within cured concrete is an arduous and time-consuming process and may affect the structural integrity of the concrete and/or structure. In addition, multiple contractors, e.g., electricians, plumbers, HVAC personnel, may require access to the beam structures for installation of additional fasteners, bolts, etc. which not only may further potentially affect the integrity of the concrete, but also presents logistical issues for the various contractors who need access to the support structure before the finishing work is performed at the site.

SUMMARY

Accordingly, the present disclosure is directed to a novel system, apparatus and methodology to assist contractors in residential and commercial construction. The system and associated methodology will substantially impact the current construction industry. More specifically, the system and methodology employ one or more anchor apparatuses which are positioned within the form, for example, a metallic form, used to create the support structure before, e.g., depositing the concrete within the form. Upon curing of the concrete support structure, the form is removed and the anchor apparatuses, which are now embedded in the support structure, are readily exposed to be utilized in a plurality of ways, including, but not limited to, supporting electrical lines, plumbing, sprinklers, ductwork, safety straps, safety nets etc. A number of anchor apparatuses may be positioned within the form to accommodate the contractor's needs and may be strategically positioned within the forms prior to pouring concrete to assist the contractor in organizing the layout of the particular equipment or supplies. Each anchor apparatus may be coupled through, e.g., an additional coupling, to an unlimited number of construction materials with relative ease to "run", e.g., the electrical, plumbing or safety equipment (e.g., safety straps, hooks, perimeter cable systems) as desired. Each contractor, e.g., an electrician or a plumber, may install their own system of anchor apparatuses on a single concrete form without any risk of interference with the other contractors. The concrete is deposited in the form and cures whereby the one or more anchor apparatuses becomes embedded with the concrete support structure. The embedded anchor apparatus is readily accessible to be coupled with, or to support, construction supplies or equipment such as ductwork, electrical cables, plumbing, sprinklers, safety lines or fences, etc. within a construction site. A plurality of anchor apparatuses may be mounted relative to the concrete form to create a system for organizing the construction materials in a manner which facilitates all phases of construction, enhances efficiency and organization, and substantially reduces costs and work hours. Moreover, the anchoring system, apparatus, and methodology for implementation will substantially impact current commercial and residential construction practices which incorporate concrete support structures in the form of beams, flooring, ceilings, roofing, etc.

In one exemplary embodiment, an anchoring system comprises at least one anchor apparatus. The at least one anchor apparatus includes an elongate anchor, a locking member mounted to the elongate member, a locking wedge mounted to the elongate anchor, an expansion member mounted to the elongate anchor adjacent the locking wedge and an anchor base coupled to the elongate anchor. The locking member is advanceable to move the locking wedge to thereby transition the expansion member from a closed approximated condition to an expanded locked condition to secure a frame between the locking member and the expansion member.

The locking member may define a central opening configured to at least partially receive the elongate anchor, and wherein the locking member and the elongate anchor include cooperating structure to advance the locking member relative to the elongate member. The locking member may define an internal thread at least partially circumscribing the central opening and wherein the elongate anchor includes an external thread configured to threadably engage with the internal thread of the locking member.

The expansion member may include first and second expansion segments with the first and second expansion segments configured to move relative to each other from the closed approximated condition to the expanded locked condition upon advancement of the locking wedge. The first and second expansion segments include cooperating internal tapered surfaces configured to cooperate with corresponding structure of the locking wedge to cause transition of the expansion member from the closed approximated condition to the expanded locked condition. The locking wedge may define a central wedge opening dimensioned to receive the elongate anchor and where the locking wedge slidably mounted on the elongate anchor. The first expansion segment may include one expansion mount depending therefrom and the second expansion segment may include one expansion slot configured to receive the expansion mount to couple the first and second expansion segments.

The anchor base includes at least one anchor mount and the expansion member includes at least one recess. The at least one anchor mount traverses the at least one anchor recess during transition of the expansion member from the closed approximated condition to the expanded locked condition. The anchor base includes a threaded aperture cooperatively dimensioned to threadably engage the external thread of the elongate anchor to secure the anchor base to the elongate anchor.

The locking member may define an internal cavity dimensioned to at least partially receive the locking wedge.

In one exemplary embodiment, a method of construction is disclosed. The method includes introducing at least at least one anchor apparatus at least partially through an opening in a form used to create a concrete support;

positioning an anchor base and an expansion member within the opening and on one side of the form;

positioning a locking member and a locking wedge on the other side of the form;

positioning an elongate anchor through an aperture of the locking member;

advancing the locking member along the elongate anchor to advance the locking wedge whereby the locking wedge engages the expansion member to cause the expansion member to move from a closed approximated condition to an expanded locked condition; and securing the locking member relative to the form to secure the form between at least the locking member and the expansion member.

The method may further include depositing concrete in the form to create the concrete support whereby the elongate anchor is at least partially embedded in the support. The method may also include removing at least the anchor base to expose an end section of the elongate anchor extending from the support. A tool may be attached to the end section of the elongate anchor.

In illustrative embodiments, advancing the locking member includes cooperatively threadably engaging an internal thread of the locking member with an external thread of the elongate anchor. Advancing the locking member may include advancing the locking wedge to cause first and second expansion segments of the expansion member to move relative to each other from the closed approximated condition to the expanded locked condition. In illustrative embodiments, advancing the locking member includes sliding the locking wedge along the external thread of the elongate anchor. The locking member may define an internal cavity and wherein removing at least the anchor base exposes the end section of the elongate anchor.

The method may further include supporting construction equipment with the tool. A plurality of anchor apparatuses may be attached to the form.

Other advantages of the construction anchoring system will be appreciated from the following description.

BRIEF DESCRIPTION OF THE DRAWINGS

Various aspects and features of the present disclosure are described hereinbelow with references to the drawings, wherein:

FIGS. 9A-9B are top plan views of the expansion member of the anchor apparatus illustrating the pair of expansion segments of the expansion member in a relative approximated condition in FIG. 9A and the expansion segments separated in FIG. 9B in accordance with illustrative embodiments of the present disclosure;

FIGS. 10A-10C are front, side elevation and bottom plan views of one expansion segment of the expansion member of the anchor apparatus in accordance with illustrative embodiments of the present disclosure;

FIGS. 12A-12C are respective side elevation partially in phantom, top plan and bottom plan views of an anchor wrench in accordance with illustrative embodiments of the present disclosure;

FIGS. 25A-25D are side elevation, top plan, side elevation view in phantom and bottom plan views of the escutcheon of the anchor apparatus of FIG. 22 in accordance with illustrative embodiments of the present disclosure;

FIGS. 35A-35C are side elevation, top plan and bottom plan views of the locking wedge of the anchor apparatus of FIG. 33 in accordance with illustrative embodiments of the present disclosure;

DETAILED DESCRIPTION

Figure 1:
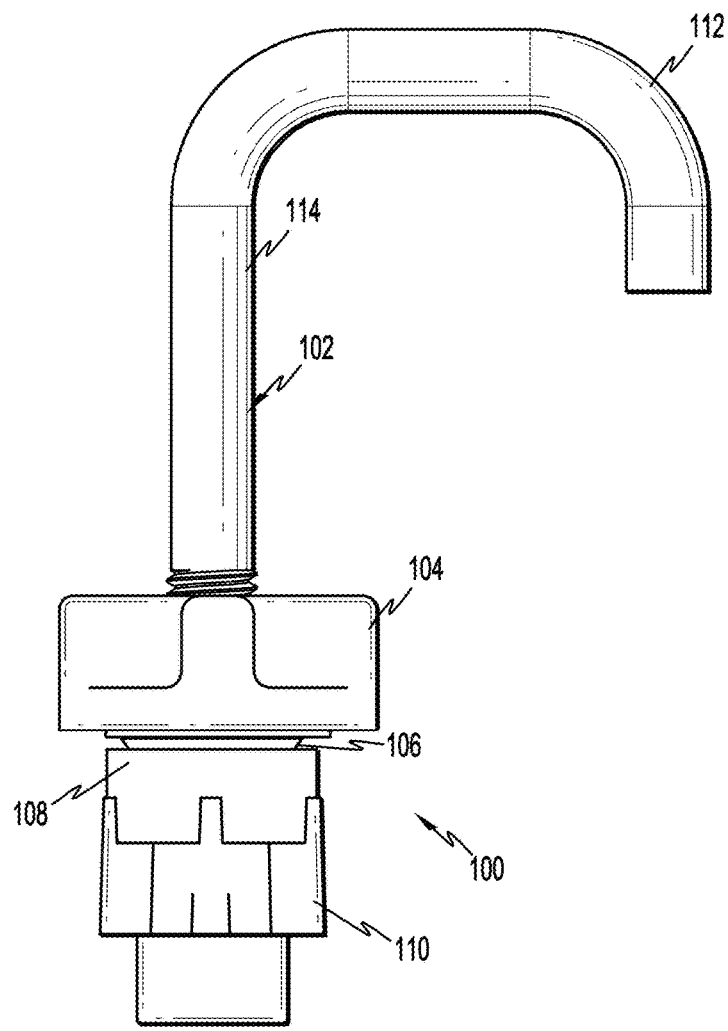
FIG. 1 is a side elevation view of the construction anchoring system illustrating a single anchor apparatus in an activated or locked condition in accordance with illustrative embodiments of the present disclosure.
Figure 2:
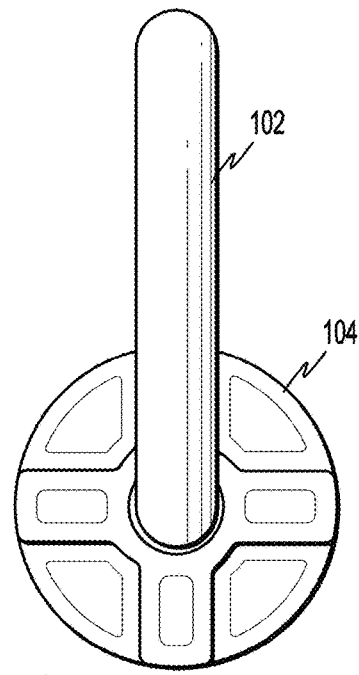
FIG. 2 is a first top plan view of the anchor apparatus in accordance with illustrative embodiments of the present disclosure.
Figure 3:
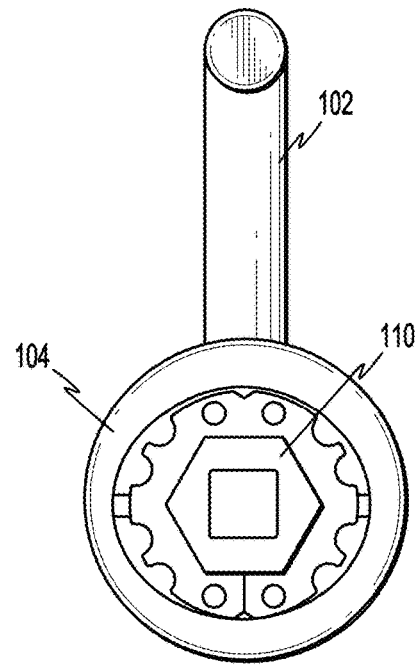
FIG. 3 is a bottom plan view of the anchor apparatus in accordance with illustrative embodiments of the present disclosure.

Particular embodiments of the present disclosure are described hereinbelow with reference to the accompanying drawings. However, it is to be understood that the disclosed embodiments are merely examples of the disclosure and may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to employ the present disclosure in virtually any appropriately detailed structure.

Referring now to FIGS. 1-5, there is illustrated a construction anchor apparatus 100 of an anchoring system 10 in accordance with an illustrative embodiment of the present disclosure. The anchoring system 10 includes one or more, e.g., a plurality of anchor apparatuses 100, depending on the needs of construction personnel. Each anchor apparatus 100 includes five components, namely, an anchor 102, a locking member 104, a locking wedge 106, an expansion member 108 and an anchor base 110. The anchor 102 may take a variety of shapes or configurations.

Figure 4:
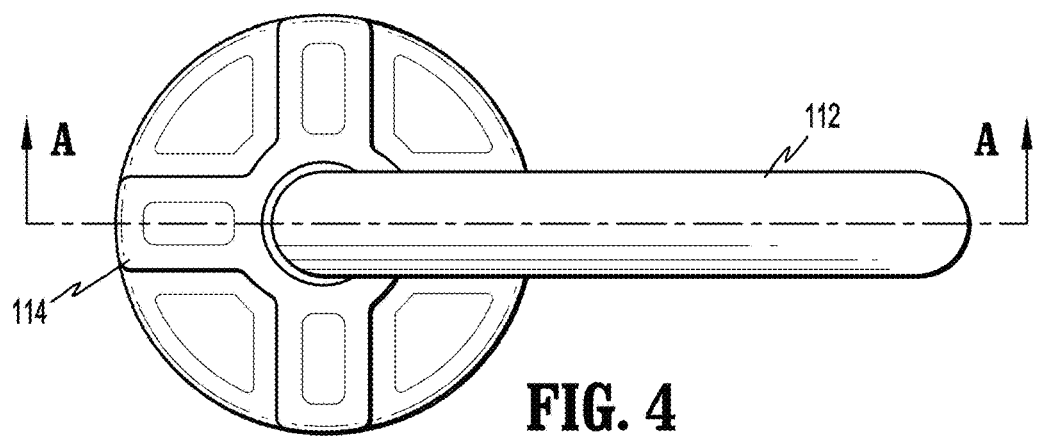
FIG. 4 is a second top plan view of the anchor apparatus in accordance with illustrative embodiments of the present disclosure.
Figure 5:
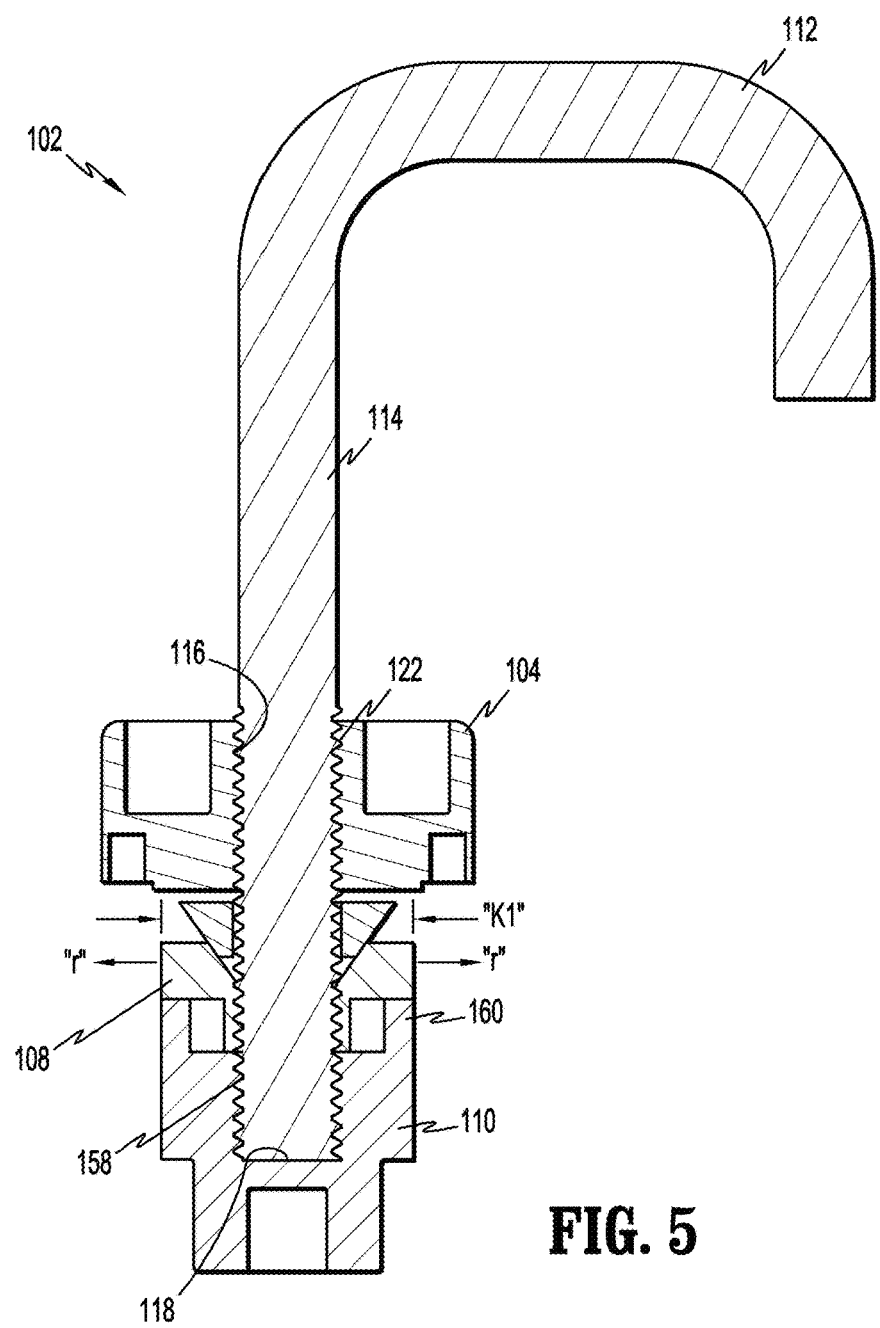
FIG. 5 is a cross-sectional view of the anchor apparatus taken along the lines A-A of FIG. 4 illustrating an initial unlocked or approximated condition of an anchor apparatus in accordance with illustrative embodiments of the present disclosure.
Figure 6:
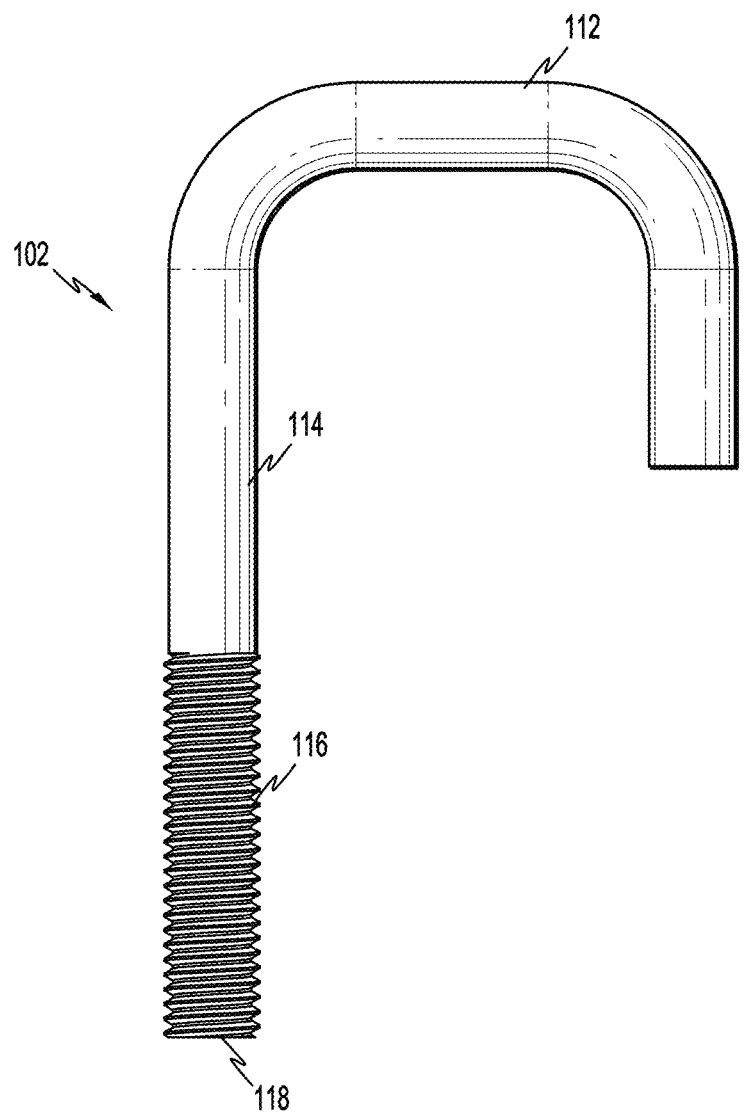
FIG. 6 is a side plan view of the anchor of the anchor apparatus in accordance with illustrative embodiments of the present disclosure.

With reference to FIG. 6, in conjunction with FIGS. 4 and 5, the anchor 102 is monolithically formed including a partial u-shaped handle 112 and an elongate anchor rod 114 depending from the handle 112. The elongate anchor rod 114 includes a connector segment, which in illustrative embodiments, is in the form of an external thread 116 extending to the end 118 of the elongate anchor rod 114 remote from the handle 112. As best depicted in FIG. 5, in the assembled condition of the anchor apparatus 100, the elongate anchor rod 114 extends through the locking member 104, the locking wedge 106, the expansion member 108 and the anchor base 110. FIG. 5 illustrates the initial or unlocked condition of the anchor apparatus 10.

Figure 7A:
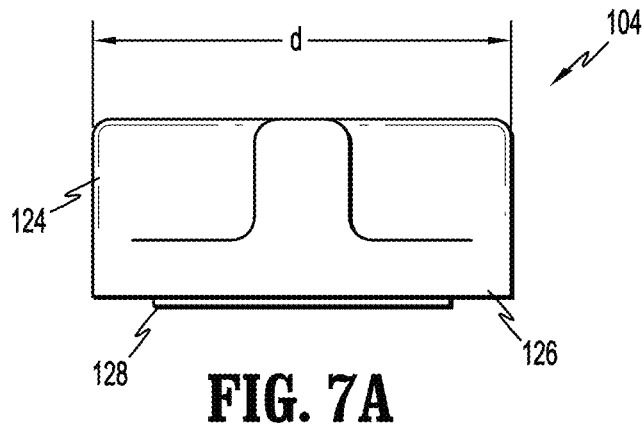
FIGS. 7A-7C are respective side elevation, top and bottom plan views of the locking member of the anchor apparatus in accordance with illustrative embodiments of the present disclosure.
Figure 7B:
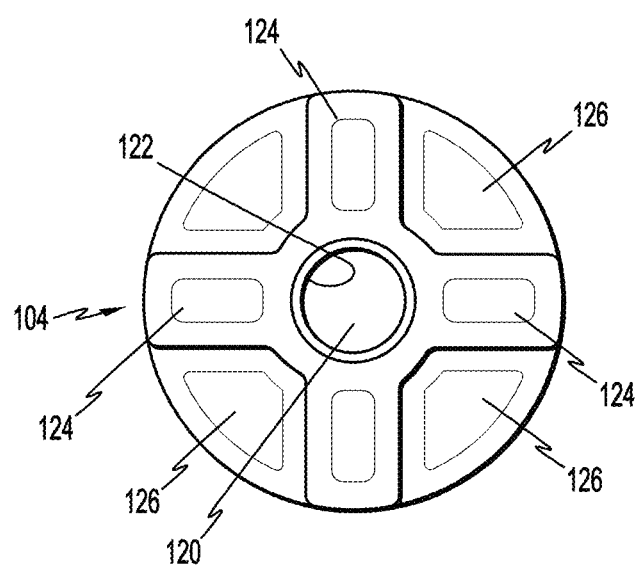
Figure 7C:
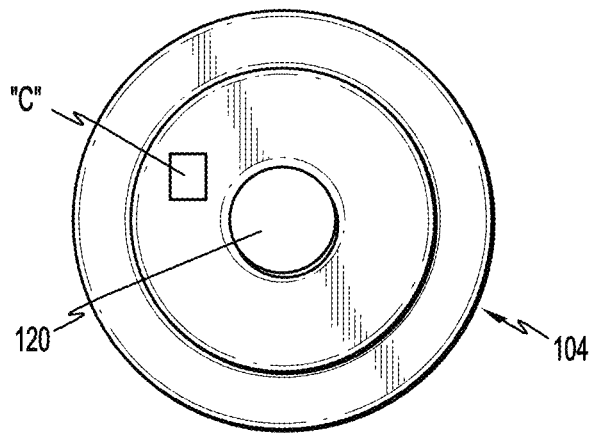

Referring now to FIGS. 7A-7C, in conjunction with FIG. 5, the locking member 104 will be discussed. The locking member 104 defines a central aperture 120 extending therethrough. In illustrative embodiments, the central aperture 120 includes an inner thread 122 (FIGS. 5 and 7B) which cooperates with the external thread 116 of the elongate anchor 102 to advance and/or retract the locking member 104 along the elongate anchor rod 114 via rotational movement of the locking member 104 relative to the elongate anchor 102. On its upper surface, the locking member 104 includes a plurality of raised segments 124 and recessed segments 126 disposed in alternating arrangement. The raised and recessed segments 124, 126 cooperate with a locking wrench to secure the anchor apparatus 100. The locking member 104 further defines a lower contacting locking plate segment 128 for engaging the locking wedge 106. The locking member 104 defines an outer dimension or diameter "d" which is preferably greater than an opening in the metal pan deck through which the anchor apparatus will be positioned. The locking member 104 may include information in the form of indicia, an RFID tag or be color coded (identified by reference "c") to assist the construction personnel in locating and placement of the anchor apparatuses 100 at desired or predetermined locations within the construction site or assist the personnel in coupling construction equipment relative to the apparatuses as will be explained hereinbelow. The indicia or color coding may be incorporated in both the upper and lower surfaces of the locking member 104.

Figure 8A:
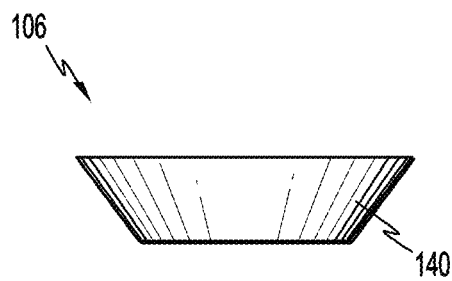
FIGS. 8A-8C are respective side elevation, top and bottom plan views of the locking wedge of the anchor apparatus in accordance with illustrative embodiments of the present disclosure.
Figure 8B:
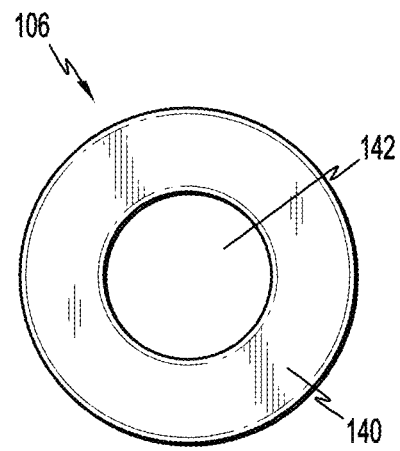
Figure 8C:
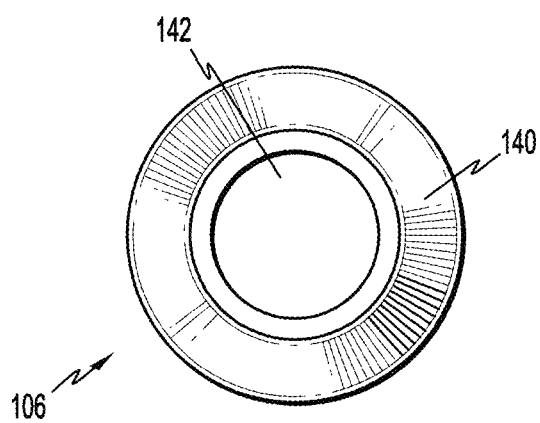

With reference to FIGS. 8A-8C, in conjunction with FIG. 5, the locking wedge 106 will be discussed. The locking wedge 106 includes an outer tapered wall 140, for example, in the form of a frustum, defining a central wedge opening 142 extending therethrough. The outer tapered wall 140 engages cooperating structure of the expansion member 108 to expand the expansion member 108 upon tightening of the locking member 104. The central wedge opening 142 is configured to receive the elongate anchor rod 114 to permit sliding movement of the elongate anchor rod 114 through the locking wedge 106 without engaging the external thread 116, e.g., the elongate anchor rod may slide freely through the central wedge opening 142. In illustrative embodiments, the opening 142 is devoid of a thread.

With reference to FIGS. 9A and 9B, in conjunction with FIG. 5, the expansion member 108 will be discussed. The expansion member 108 includes two expansion segments 144 which are movable relative to each other from an initial or closed condition of FIG. 5 to an expanded condition upon advancement of the locking member 104 along the anchor rod 114. The expanded condition of the expansion member 108 corresponds to the open or activated condition of the anchor apparatus 100. A single expansion segment 144 of the expansion member 108 is depicted in FIGS. 10A-10C. Each expansion segment 144 includes a semicircular structure defining a tapered surface(s) 146 extending to a recess. In the closed condition of the expansion member 108 depicted in FIG. 9A, the recesses define an expansion opening 148 for reception and passage of the elongate anchor rod 114. The expansion opening 148 defines a diameter greater than the diameter of the anchor rod 114. Each expansion segment 144 includes an expansion mount 150 on one side and an expansion aperture or slot 152 on the opposite side (shown in phantom in FIG. 10C). The expansion slots 152 of each expansion segment 144 are configured to receive the expansion mount 150 of the other expansion segment 144 to couple and permit the expansion segments 144 to move between the approximated of FIG. 9A and the expanded conditions of FIG. 5. In illustrative embodiments, the expansion mount 150 is cylindrical in configuration and the expansion slot 152 defines a corresponding cylindrical arrangement permitting reception and sliding movement of the expansion mounts 150 within the expansion slots 152. Other configurations for the expansion mounts 150 and the expansion slots 152 are also envisioned. As depicted in FIG. 10C, the lower surface of each expansion segment 144 defines at least partial recesses 154 spaced at ninety (90) degree intervals. The recesses 154 cooperate with corresponding structure of the anchor base 110 to couple the components while permitting outward movement of the expansion segments 144 relative to the anchor base 110.

In illustrative embodiments, in the approximated condition corresponding to the closed condition of the anchor apparatus 100, the expansion member 108 defines a dimension "k1" (see also FIG. 9A) which is less than the hole in the metal pan deck in which the anchor apparatus 100 is at least partially positioned. Thus, the expansion member 108 may be positioned on the side of the metal pan deck opposite the side where the locking member 104 is located. In the expanded condition of the expansion member 108, corresponding to the activated or open condition of the anchor apparatus 100, the expansion member 108 defines a dimension which is greater than the dimension of the hole in the metal pan deck. This, in effect, secures the anchor apparatus 100 to the metal pan deck assembly. This will be described in greater detail hereinbelow.

Figure 11A:
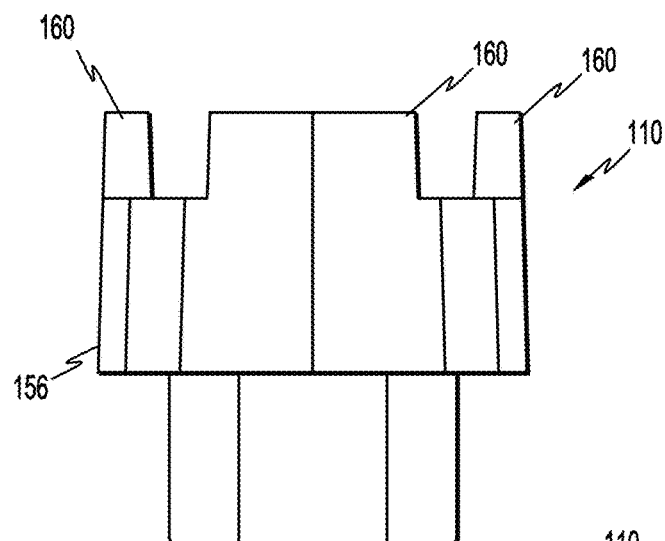
FIGS. 11A-11C are respective side elevation, top and bottom plan views of the anchor base of the anchor apparatus in accordance with illustrative embodiments of the present disclosure.
Figure 11B:
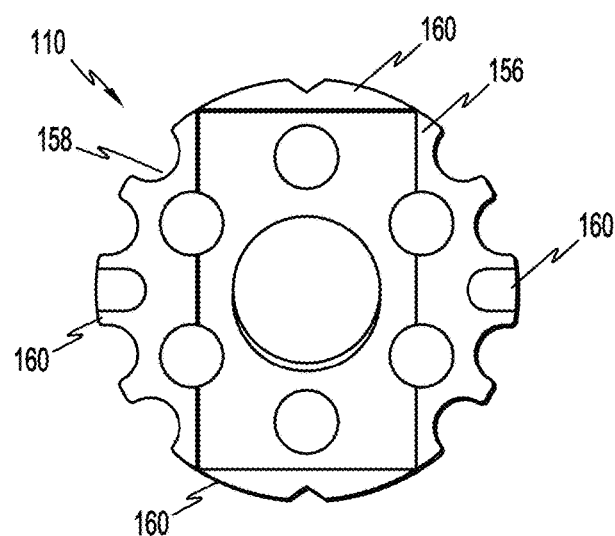
Figure 11C:
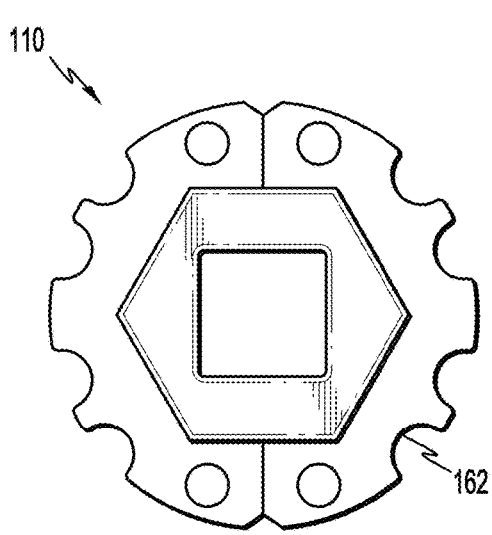

Referring now to FIGS. 11A-11C, in conjunction with FIG. 5, the anchor base 110 will be described. The anchor base 110 includes an upper base wall segment 156 defining a central threaded aperture 158 (see also FIG. 5) at least partially extending within the anchor base 110. The threaded aperture 158 is configured to threadably engage the external thread 116 of the anchor rod 114 to secure the anchor base 110 and the expansion member 108 relative to the anchor rod 114. The upper base wall segment 156 further defines a plurality of base mounts 160 spaced about the anchor base 110 at ninety (90) degree intervals. The base mounts 160 are cooperatively received within the recesses 154 on the underside of the expansion segments 144 to couple the anchor base 110 and the expansion member 108. The base mounts 160 traverse the recesses 154 of the expansion segments 144 upon displacement of the expansion segments 144 radially outwardly during advancement of the locking member 104 and the locking wedge 106. The anchor base 110 further includes a lower base wall segment 162 having a polygonal, for example, a hexagonal shape, configured to cooperatively engage an appropriately sized torque wrench.

FIGS. 12A-12C illustrate an exemplative wrench 200 for use with the anchor apparatus 100 of the anchoring system 10 of the present disclosure. The wrench 200 includes a handle 202 contoured for engagement by the operator and a wrench head 204 depending from the handle 202. The wrench head 204 includes a slot 206 and three recesses 208 on its lower surface (FIG. 12C). The slot 206 and the recesses 208 are offset at radial intervals of ninety (90) degrees. The slot 206 and the recesses 208 are configured to engage or receive the raised segments 124 of the locking member 104 (FIG. 7B) to couple the wrench 200 to the locking member 104. Thus, rotation of the wrench 200 causes corresponding rotation of the locking member 104 and traversal along the anchor rod 114. The slot 206 facilitates placement and alignment of the wrench head 204 relative to the locking member 104. The slot 206 of the wrench 200 may also receive the lower base wall segment 162 of the anchor base 110 to tighten the anchor base 110 to the external thread 116 of the anchor rod 112.

Each of the components of the anchor apparatus 100 may be formed of a suitable rigid polymeric material or a metallic material. In embodiments, at least the anchor 102 is formed of a suitable metal such as stainless steel or the like. At least the locking member 104 may be made in a variety of colors, e.g., color-coded, to correspond to the tradesman or construction personnel who intend to use the particular anchor apparatus 100. More specifically, a particular color may be associated with specific construction personnel to assist said personnel in identifying the anchor apparatuses 100 which will be associated with his/her equipment. Any of the components may include indicia such as a bar cod, RFID tag or chip etc. to facilitate utilization and placement of the anchor apparatuses about the construction site.

Figure 13:
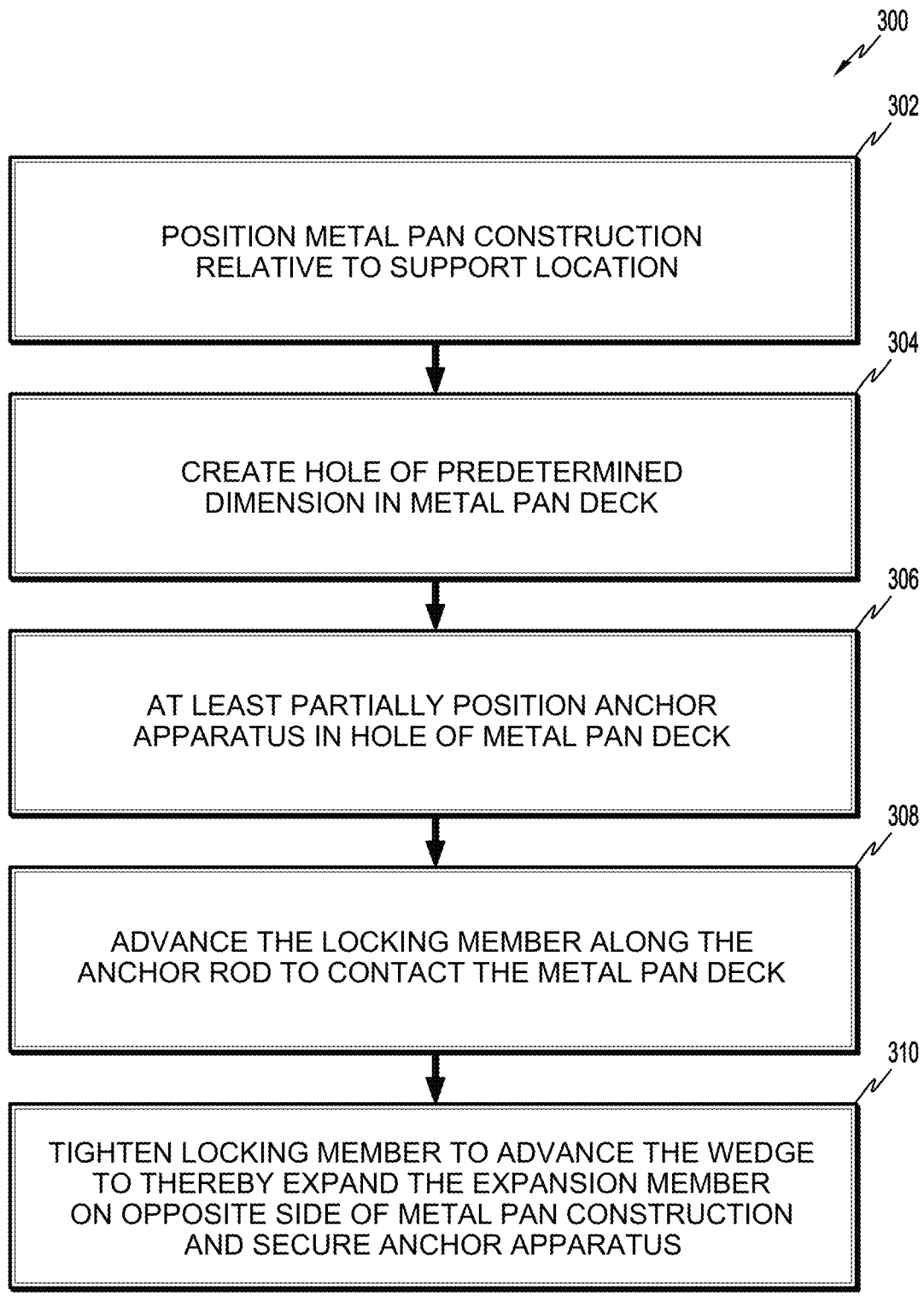
FIG. 13 is a flow chart illustrating a method of use of the anchor apparatus of the anchoring system in accordance with illustrative embodiments of the present disclosure.

FIG. 13 is a flow chart depicting one illustrative methodology of use of the anchor apparatus 100 of the anchoring system 10. The methodology is used in conjunction with forming a support a concrete support, for example, and without limitation, a horizontal beam, a vertical beam, a floor, a ceiling etc. During formation of the support, a form for the concrete support may include a metal pan deck construction. Generally, the form includes at least one horizontal or vertical metal pan deck upon which concrete is deposited. The methodology 300 includes positioning the metal pan deck relative to a support location in a construction site where a concrete support such as a vertical column, horizontal column, floor, ceiling, etc. is to be formed. (STEP 302). A hole of a predetermined dimension or diameter (if not already formed in the metal form support) is created. (STEP 304). The hole may be 1¼ inches in diameter although other dimensions are contemplated. The anchor apparatus 100, in the closed condition of FIG. 5 without the locking member 104 and the locking wedge 106 advanced and the expansion member 108 in its closed or approximated condition, is at least partially positioned within the hole in the metal pan deck. (STEP 306). In illustrative embodiments, the locking member 104 is positioned on one side of the metal pan deck and the expansion member 108 and the anchor base 110 are positioned on the opposite side of the metal pan deck (e.g., beneath the metal deck pan). In addition, in the approximated condition of the expansion member (FIG. 9A) corresponding to the closed condition of the anchor apparatus 100, the dimension "k1" (FIG. 9A) of the expansion member 108 is less than the dimension of the hole "h" in the metal deck pan "p" (FIG. 14) thereby permitting passage of the expansion member 108 and the anchor base 110 through the hole. The locking member 104 defines a dimension "d" (FIG. 7) greater than the hole formed in the metal pan deck. The anchor base 110 may be secured to the extreme end of the external thread 116 of the anchor rod 112 with, for example, use of the wrench 200.

Figure 14:
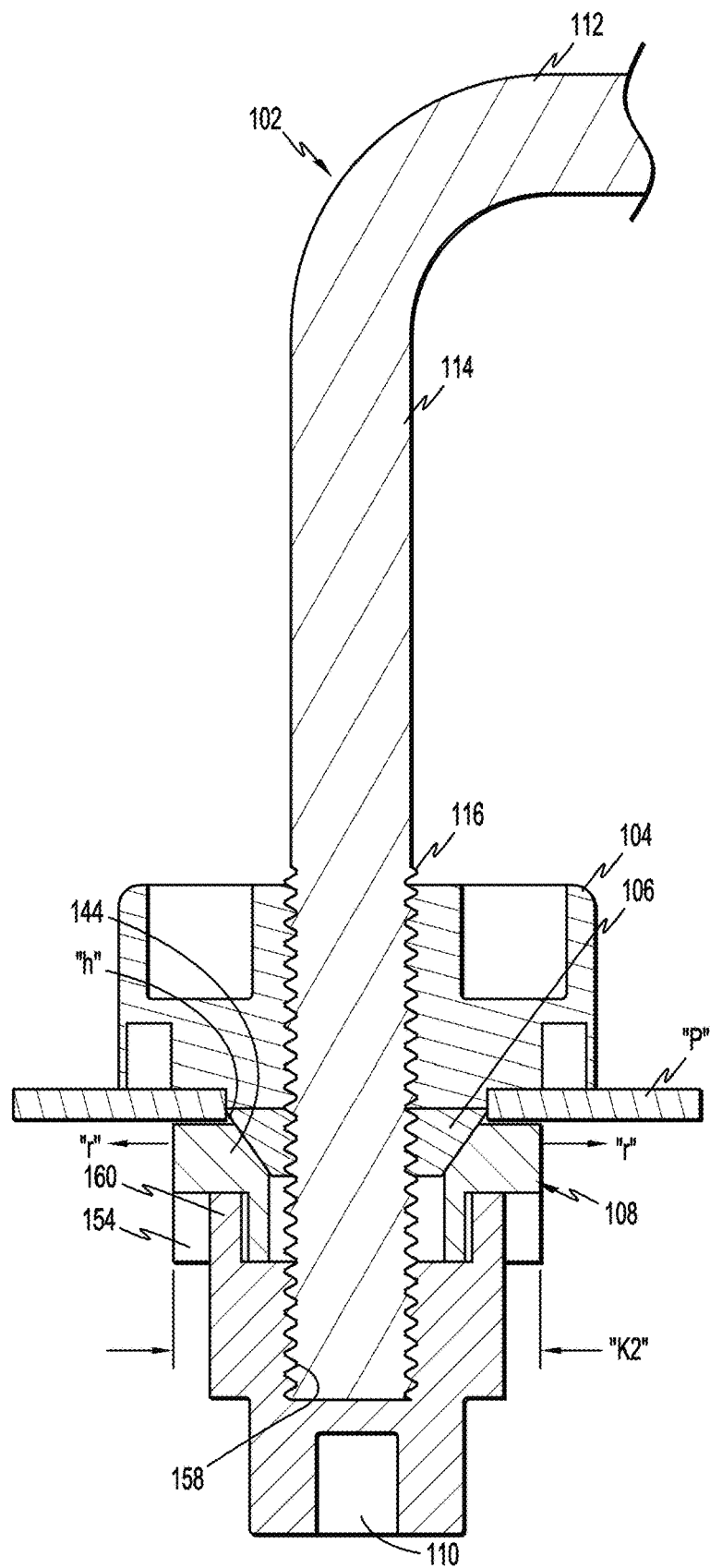
FIG. 14 is a cross-sectional view of the anchor apparatus similar to the view of FIG. 5 illustrating an activated or locked condition of the anchor apparatus secured to a metal deck pan in accordance with illustrative embodiments of the present disclosure.

The operator then engages the locking member 104, for example, with the wrench 200 in the manner described hereinabove, and rotates the locking member 104 about the anchor rod 114 in a first rotational direction, for example, a clockwise direction to advance the locking member 104 against the metal pan deck. (STEP 308). During this rotational movement, the threaded coupling of the locking member 104 and the external thread 116 of the anchor rod 114 causes the locking member 104 to advance along the anchor rod 114 to contact and/or advance the locking wedge 106. As best depicted in the cross-sectional view of FIG. 14, advancement of the locking wedge 106 causes engagement of the outer tapered wall 140 of the locking wedge 106 with the inner tapered walls 146 of the expansion segments 144 of the expansion member 108. In response to this motion, the expansion segments 144 are each driven radially outwardly (see arrows "r" in FIGS. 5 and 14) whereby the expansion member 108 assumes the expanded condition depicted in FIG. 14 corresponding to the activated or locked condition of the anchor apparatus 100. As noted hereinabove, during radial outward movement of the expansion segments 144 of the expansion member 108, the recesses 154 on the underside of the expansion segments permit the anchor mounts 160 of the anchor base 110 to slide within the recesses to permit the radial outward movement of the expansion segments 144 and the expansion member 108. (Compare FIGS. 5 and 14). In this position, the expansion member 108 defines dimension "k2" which is greater than the dimension of the opening "o" in the metal pan deck "p". Advancement of the locking member 104 secures the anchor apparatus 100 relative to the metal pan deck "p". (STEP 310 of FIG. 13; see also FIG. 14). As best depicted in FIG. 14, the metal pan deck "p" is secured within the gap between the lower contacting locking plate segment 128 of the locking member 104 and the extended expansion element 108. The steps 302-310 may be repeated as necessary to position additional anchor apparatuses relative to the construction site and the support as desired in accordance with a predefined strategic plan of installation of the anchoring system or a portion thereof.

Once one or more anchor apparatuses are mounted relative to the metal pan deck, attention is directed to forming the concrete support with the metal deck pan "p". As previously addressed, the anchoring system 10 is intended for use with cement or concrete support structures in connection with residential or commercial building construction. The anchoring system 10 may be embedded within horizontal or vertical beams, flooring or ceilings. The following discussion will focus on use of the anchoring system 10 in its application with a horizontal beam constructed during a phase of a construction. However, it is appreciated that the anchoring system 10 has many applications inclusive of those mentioned above and in many other applications.

During formation of a horizontal beam, a form for the concrete beam is constructed with the use of, the aforementioned metal pan deck. Generally, the form includes a lower metal pan deck and may also include two vertical form boards depending upwardly from the lower metal pan deck. With reference now to the flow chart 400 of FIG. 15, which is a continuation of the process flow of FIG. 13, a plurality of anchor apparatuses 100 as part of the anchoring system 10 is installed relative to the metal pan deck 'p" at predetermined locations as selected by the contractor. (STEP 402). As noted above, these locations preferably correspond to the locations where the equipment, e.g., electrical lines, plumbing, safety cables, safety hooks etc. are to "run" or to be positioned in the structure. Concrete is deposited onto the metal pan deck to engulf the handle 112 and the anchor rod 114 of the anchor 102, at least partially engulfing the locking member 104 and optionally at least portions of the locking wedge 106 of each anchor apparatus 100 secured to the metal pan deck. (STEP 404). As described hereinabove, the expansion member 108 and the anchor base 110 are disposed on the opposite side of the metal pan deck remote from the poured concrete. The concrete is cured to form a column, e.g., a horizontal or vertical column or even flooring or ceilings (STEP 406) securing the anchor rod 114 and the locking member 104 within the cured column. With the column formed, the anchor base 110 and optionally the expansion member 108 are released from the external thread 116 of the anchor 102 by rotation of the anchor base 110 with, for example, the wrench 200. (STEP 408) Upon removal of the anchor base 110, the lower portion of the external thread 116 of the anchor rod 102 is exposed or extends beneath the metal pan deck. In addition, as one option, the underside of the locking member 104 is visible beneath the metal pan deck. As noted, the locking member 104 may be color coded to correspond with building information modeling (BIM) or trade standards, or may include indicia, RFID tags, bar codes, etc. In addition, each anchor 102 may be laser etched with a QR-code on the bottom face or end 118 of the anchor rod 114 that when scanned by construction personnel identifies one or more pages, blueprints etc. that displays information relating to the anchoring system, its installation and/or its application for one or more particular identified trades. Thereafter, a tool is coupled to the exposed external thread 116 of the anchor 100. (STEP 410).

Figure 15:
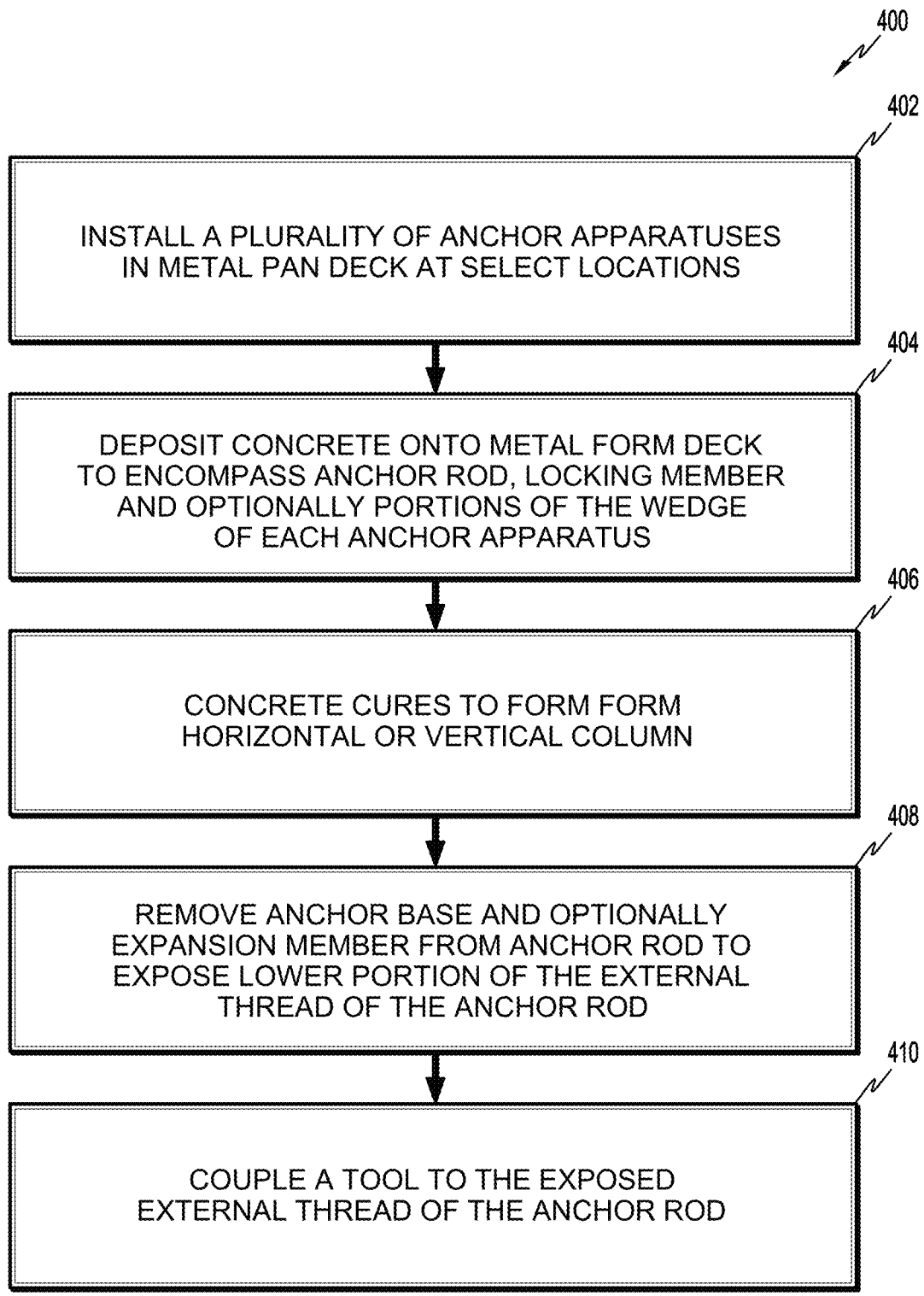
FIG. 15 is a flow chart illustrating a continued method of use of the anchor apparatus for embedding in a concrete support in accordance with illustrative embodiments of the present disclosure.

It is to be appreciated that the flow chart of FIGS. 13 and 15 includes STEPS that may be combined, may be performed in a different order than as outlined in the chart, and/or some of the STEPS may be omitted.

Figure 16:
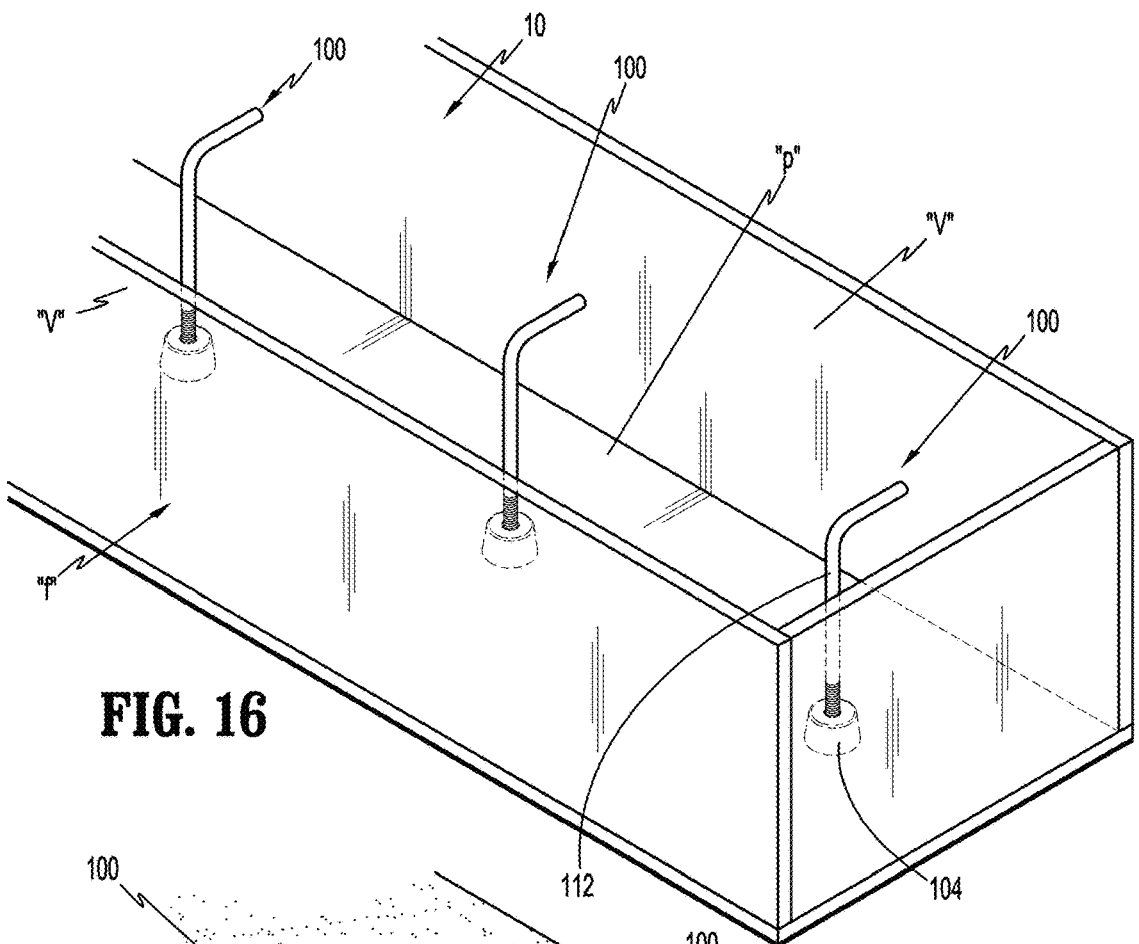
FIG. 16 is a perspective view illustrating a plurality of anchor apparatuses of the anchoring system secured to the metallic form board of the concrete form in accordance with one exemplary methodology of use of the system.
Figure 17:
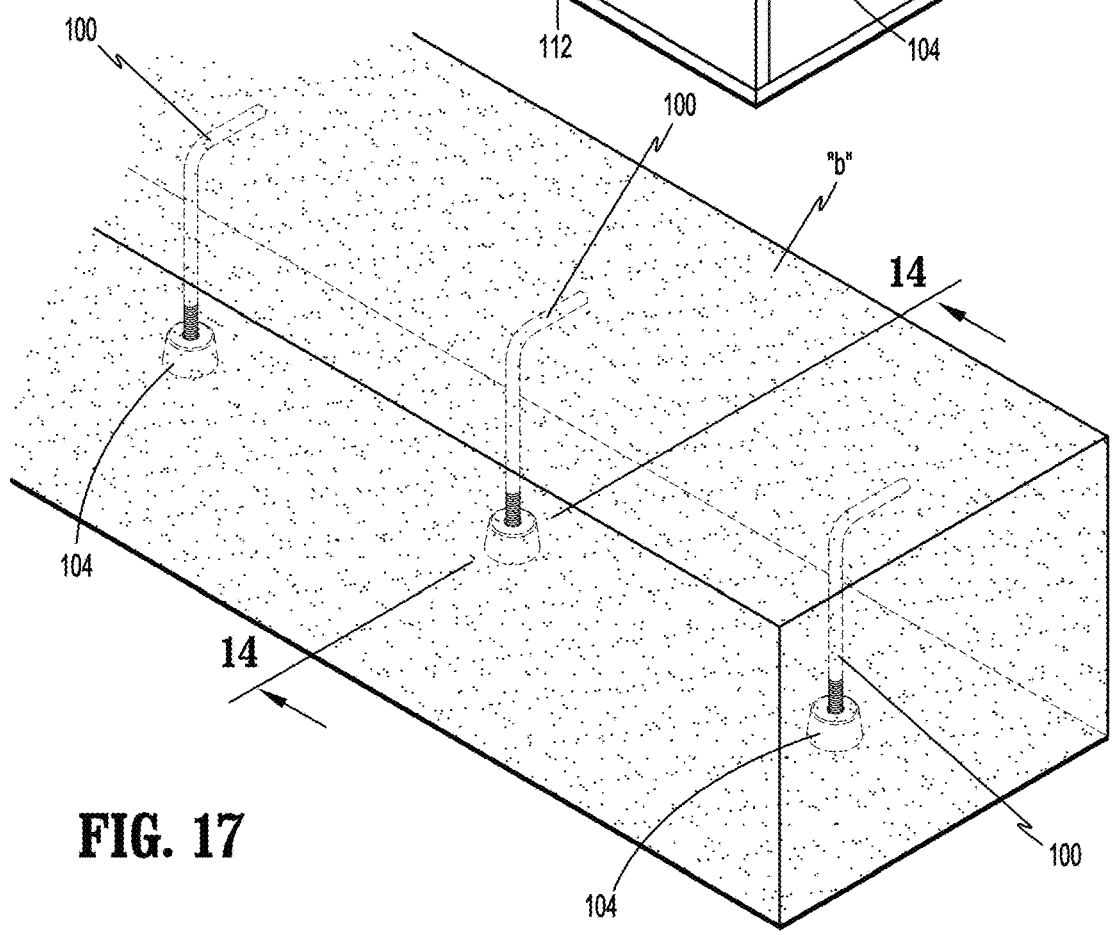
FIG. 17 is a view similar to the view of FIG. 16 illustrating concrete deposited in the concrete form with the anchor apparatuses embedded within the concrete in accordance with one exemplary methodology of use of the system.

FIG. 16 illustrates one or more anchor apparatuses 100 of the anchoring system 10 secured within a form "f." In FIG. 16, the concrete form "f" is shown with the optional vertical form boards "v" and the metal pan deck "p," and further illustrates the anchor apparatuses 100 disposed within the interior of the concrete form "f". FIG. 17 illustrates concrete poured into the form "f" to form a horizontal beam "b" upon curing of the concrete and depicts in phantom the anchor apparatuses 100 permanently embedded within the horizontal beam "b". In FIG. 17, the horizontal metal pan deck "p" and vertical form boards "v" are removed.

Figure 18:
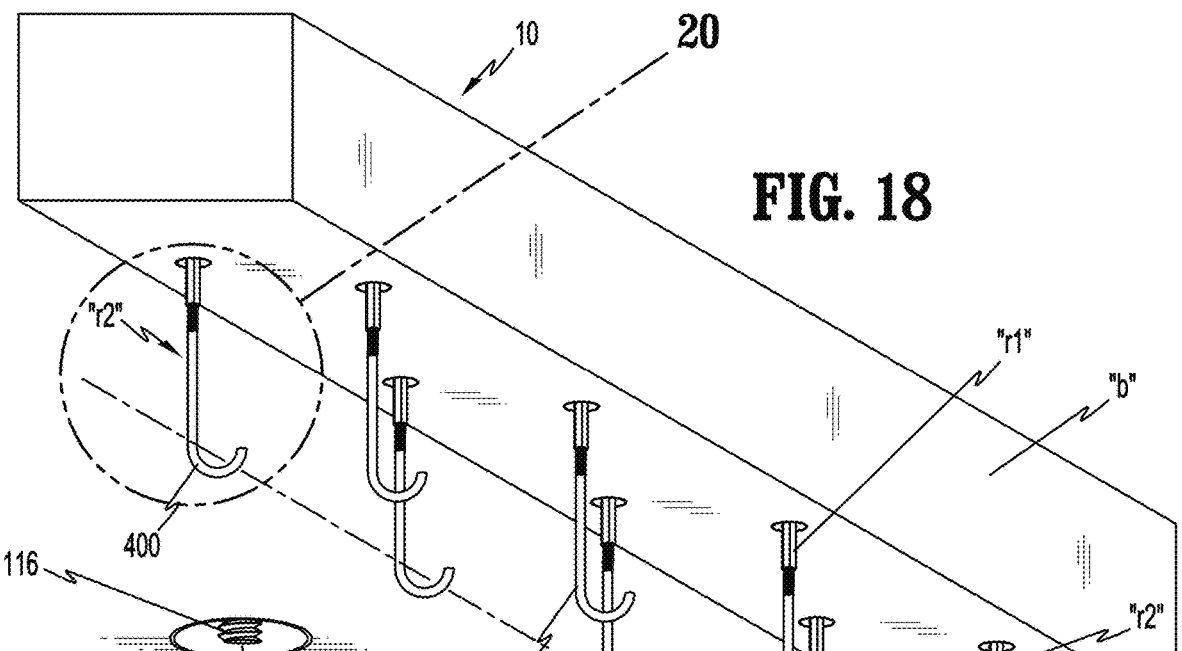
FIG. 18 is a perspective view illustrating a plurality of anchor apparatuses of the system within the concrete structure and further illustrating a coupling tool and a support hook mounted to each elongate anchor in accordance with one exemplary methodology of use of the system.
Figure 19:
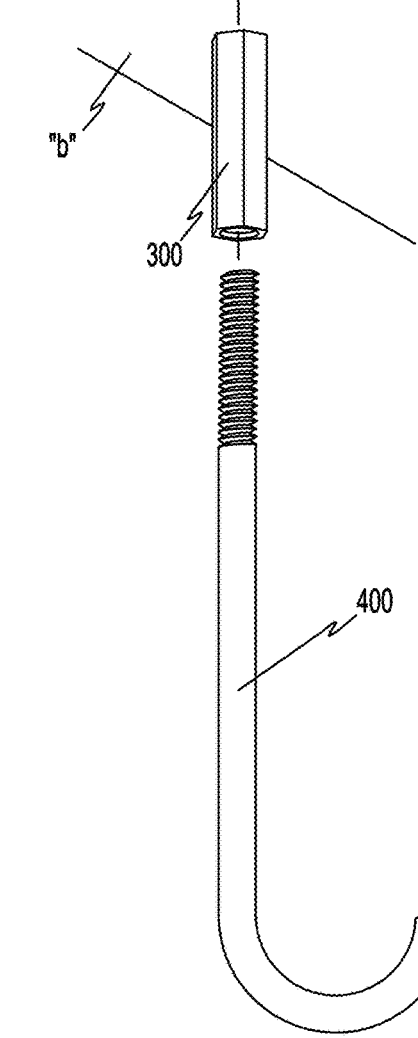
FIG. 19 is a perspective view illustrating the coupling tool and support hook being secured to one elongate anchor in accordance with one exemplary methodology of use of the system.
Figure 20:
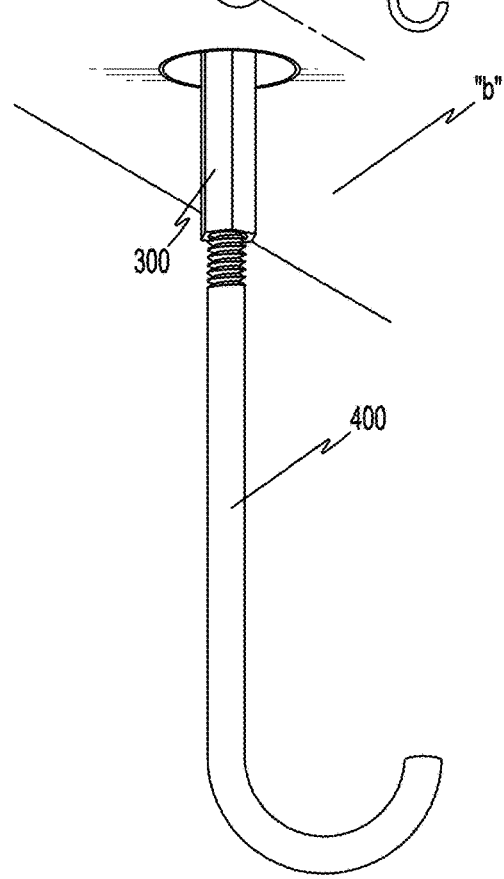
FIG. 20 is an enlarged view of the area of isolation depicted in FIG. 18 illustrating the coupling tool and the support hook secured to a single elongate anchor of the anchor apparatus in accordance with one exemplary methodology of use of the system.

With reference to FIGS. 18-20, at least the anchor base 110 and the optionally the expansion element 108 may be removed leaving the extreme end of the external thread 116 of the anchor 102 exposed from the concrete support "b.". Specifically, the external thread 116 is accessible to be coupled to an additional coupling tool, construction tool, mount, safety hook, safety cable or the like. FIG. 19 illustrates an internal threaded coupling tool 300 being engaged with the external thread 116 of the anchor rod 112 and a support or safety hook 400 being threadably engaged with the coupling tool 300. FIG. 20 illustrate the coupling tool 300 and the hook 400 secured relative to the anchor apparatus(es) 100. As shown in FIG. 18, a plurality of anchors 102 and hooks 400 may be secured along the horizontal support beam "b" to support materials, supplies, or safety equipment (e.g., perimeter cable) each identified schematically as reference numeral 500, which, again, is inclusive of electrical lines, plumbing, sprinklers, ductwork, safety cable, safety hooks or netting etc. It is also envisioned that separate rows of anchors 102 may be positioned for utilization by different construction personnel, e.g., row "r1" of the anchor apparatuses 100 may be used by the electrician, row "r2" of the anchor apparatuses 100 may be used by the plumber, etc. It is also further envisioned that the underside of the locking members 104 may be color coded or include indicia to assist the construction personnel to associate the dedicated anchor 100 with the proper trade, e.g., red covers to be used by the electrician, blue covers by the plumber, orange covers for HVAC personnel, etc. This also enhances usability and the organizational capabilities of the anchoring system.

Figure 21A:
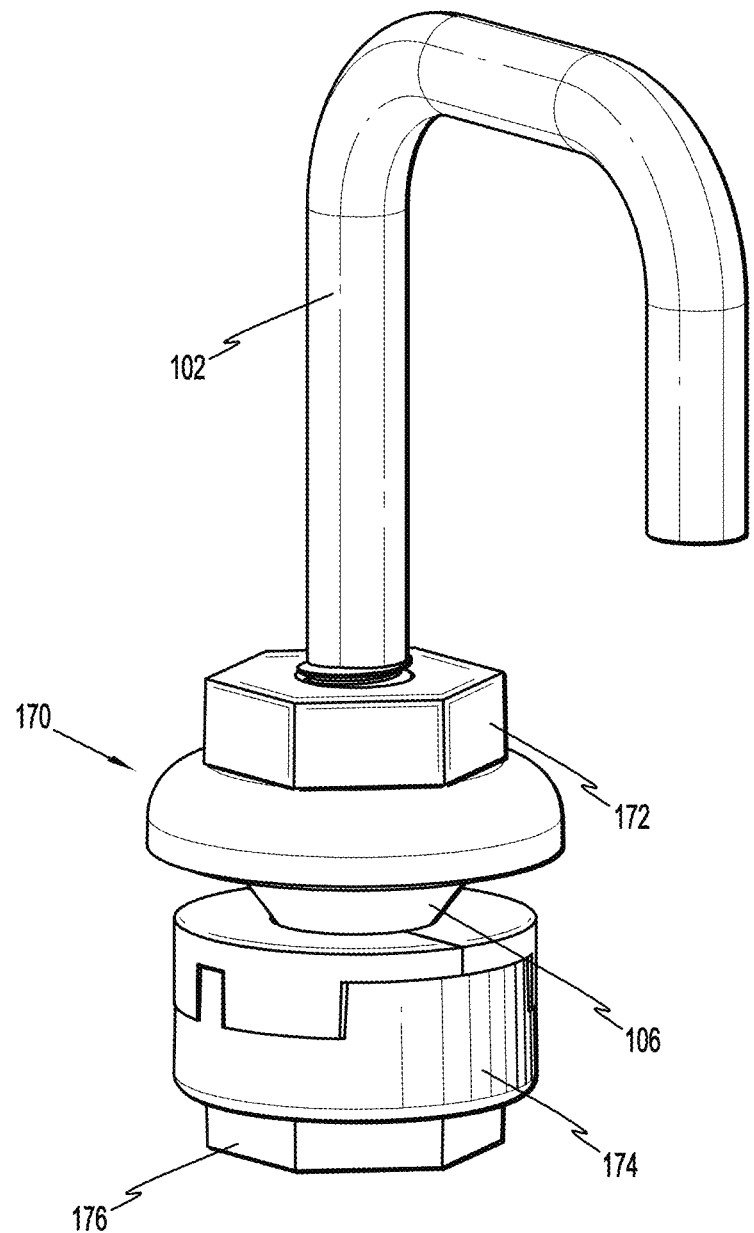
FIGS. 21A and 21B are perspective views of an alternate embodiment of the anchor apparatus of FIGS. 1-13 in respective closed and locked conditions in accordance with one or more illustrating embodiments of the present disclosure.
Figure 21B:
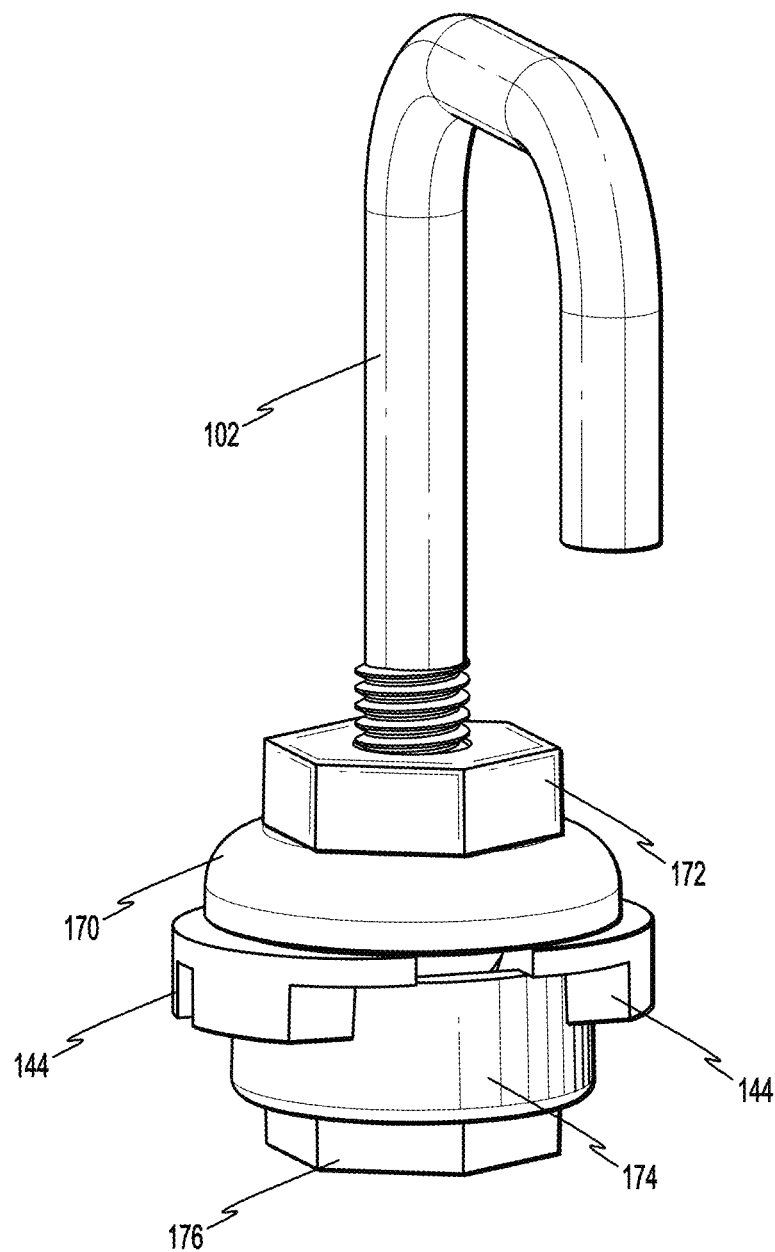

FIGS. 21A and 21B are perspective views of an alternate embodiment of the anchor apparatus of FIGS. 1-13 in respective closed and open conditions in accordance with one or more illustrating embodiments of the present disclosure. In accordance with this embodiment, the locking member 170 includes a hex head or polygonal segment 172 to be engaged by a wrench to tighten the components. The anchor base 174 may also include a hex head or polygonal segment 176 to be engaged by a wrench. FIG. 21B also illustrates the expansion segments 144 displaced in a manner to be secured to the form board.

Figure 22:
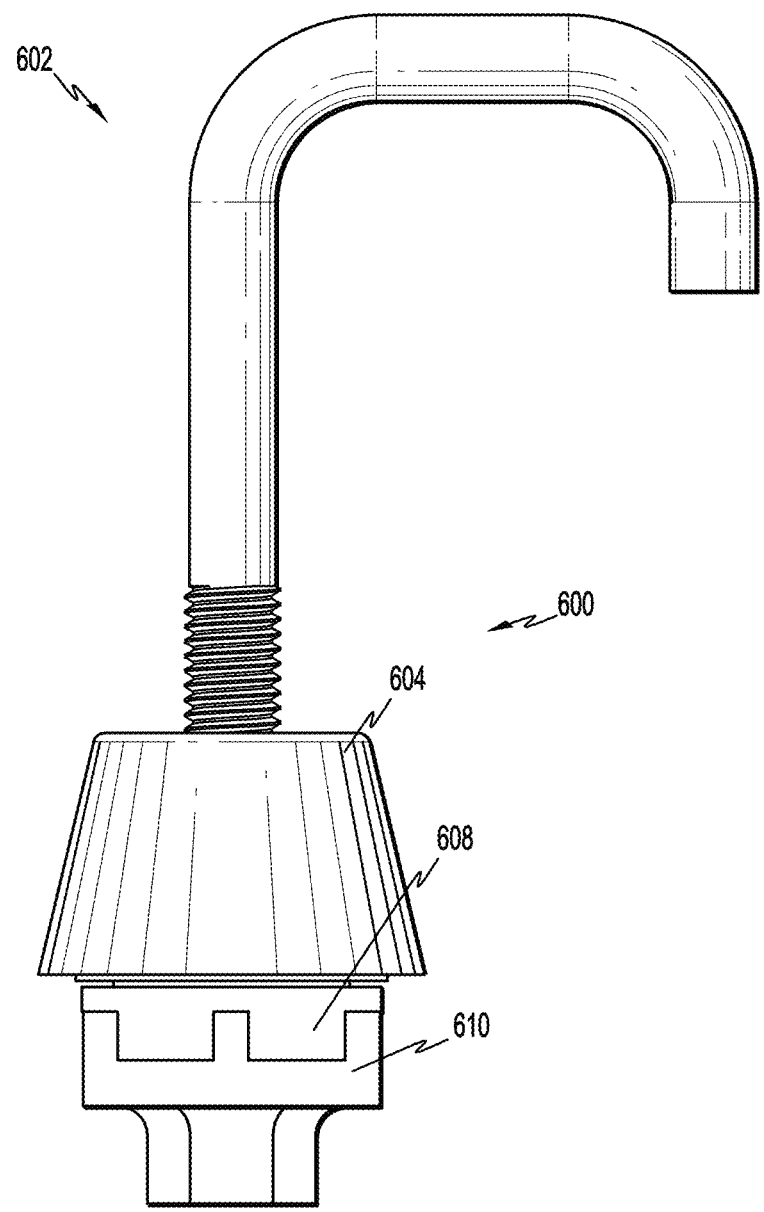
FIG. 22 is a side elevation view of another embodiment of the anchor apparatus in an activated or locked condition in accordance with illustrative embodiments of the present disclosure.
Figure 23:
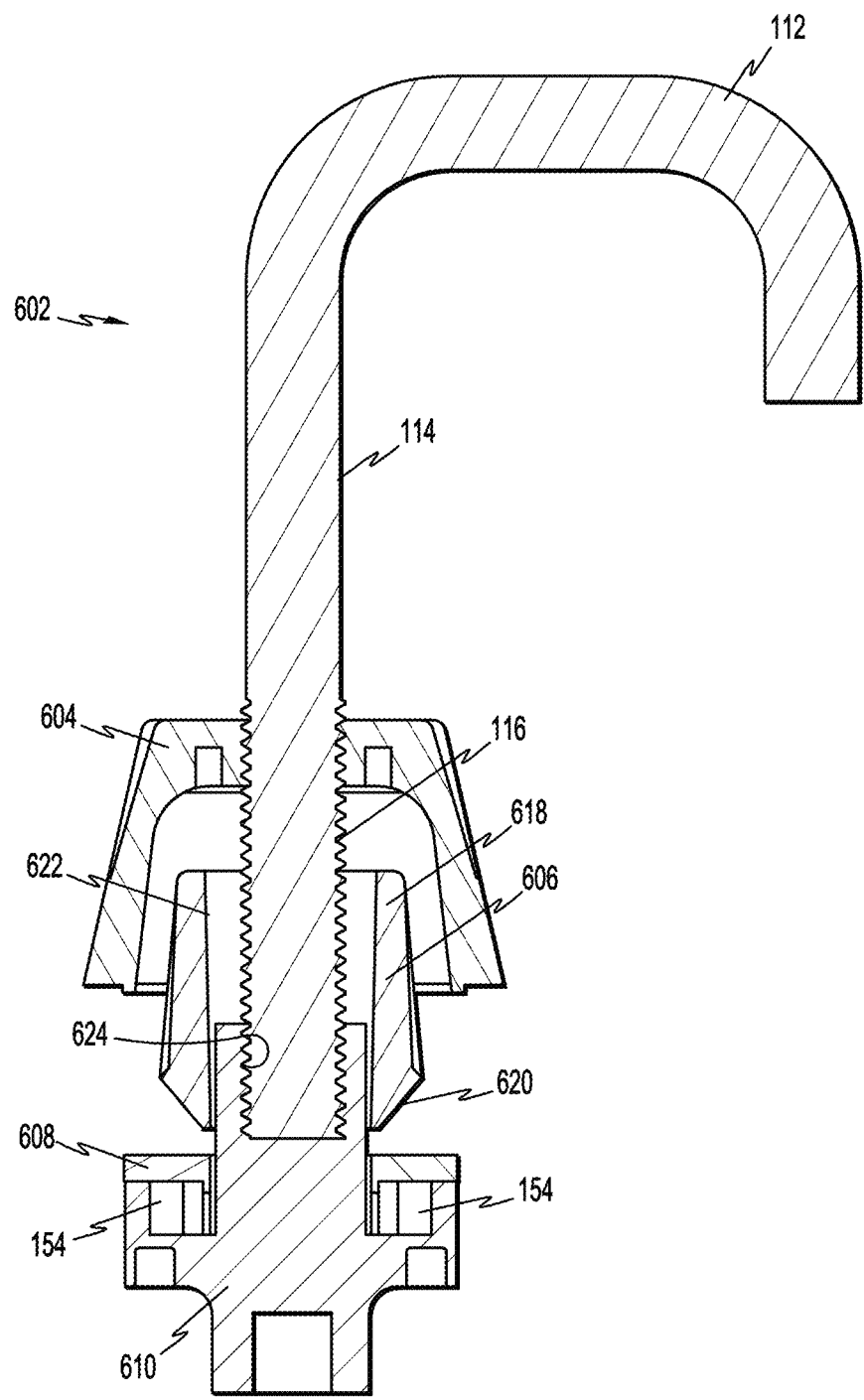
FIG. 23 is a cross-sectional view of the anchor apparatus of FIG. 22 illustrating an initial separated condition of the anchor apparatus in accordance with illustrative embodiments of the present disclosure.
Figure 24:
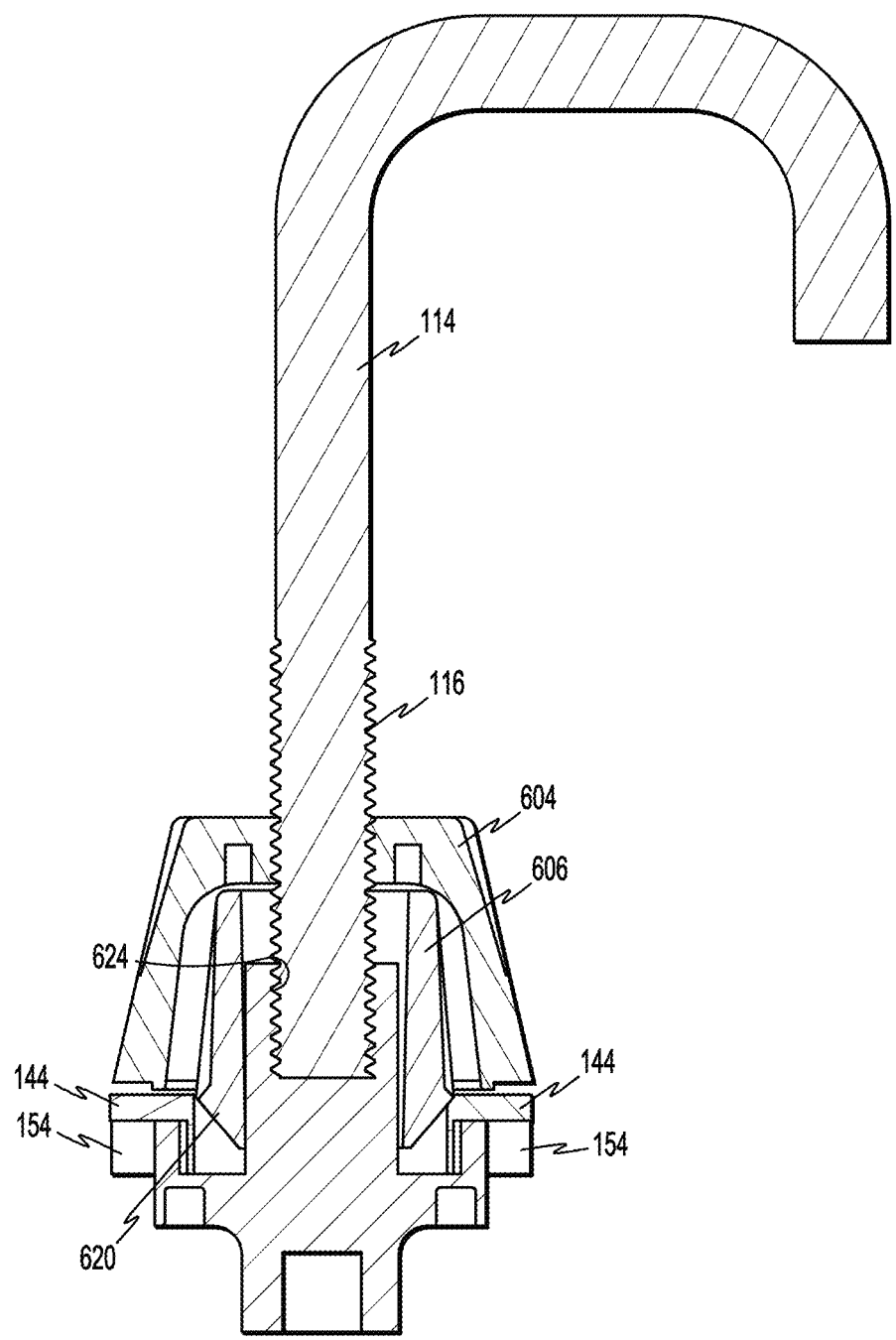
FIG. 24 is a cross-sectional view of the anchor apparatus of FIG. 22 similar to the view of FIG. 23 illustrating the activated or locked condition of the anchor apparatus in accordance with illustrative embodiments of the present disclosure.

Referring now to FIGS. 22-27, there is illustrated another exemplative embodiment of the present disclosure. The anchor thread apparatus 600 is intended for use with a deck pan, for example, a recessed metal deck pan, used in concrete forming including, without limitation, vertical columns, horizontal columns, flooring, ceiling etc. As best depicted in FIGS. 22-24, the anchor apparatus 600 includes an anchor 602, a locking member or escutcheon 604, a locking wedge 606, an expansion member 608 and an anchor base 610. The anchor 502 and the expansion member 608 are substantially similar to the respective anchor 102 and expansion member 108 described in connection with the embodiments of FIGS. 1-20, and reference is made thereto for a discussion of the details of these components. FIG. 23 illustrates the anchor apparatus 600 in the unactuated or spaced open condition. FIG. 24 illustrates the anchor apparatus 600 in an actuated condition. As shown in FIG. 24, the expansion segments 144 of the expansion member 608 are displaced to engage the recessed metal pan.

With reference to FIGS. 25A-25C, in conjunction with FIG. 22 and the cross-sectional views of FIGS. 23 and 24, the escutcheon 604 will be discussed. The escutcheon 604 may be in the shape of a frustum; however, other shapes are also envisioned. The escutcheon 604 includes a central passage 606 for reception and passage of the elongate anchor 602. The central passage 606 is threaded or includes an internal threaded component 606a for engaging the external thread 116 of the anchor rod 114. The escutcheon 604 further includes an outer wall 612 defining an internal cavity 614 dimensioned for positioning and/or receiving the locking wedge 606. The escutcheon 604 may be tightened sufficiently against the metal pan deck to create an isolated chamber defined by the internal cavity 614. This, in effect, establishes a tight seal with the metal pan deck to prevent ingress of concrete within the internal cavity 614 when the concrete is poured and during curing of the concrete thereby maintaining the external thread of the anchor rod 112 accessible to the contractor. The escutcheon 604 (as well as the locking member 104 in the embodiment of FIGS. 1-20) also may include an indicator, an RFID tag or bar code or may be colored (identified schematically as reference numeral 616 (FIG. 25A) to compliment BIM or trade standards. The indicator 616 may be located on the inside or exterior of the escutcheon 604. The outer wall 612 of the escutcheon 604 may be tapered at a predetermined angle.

This tapered arrangement establishes an effective shoulder fit with the concrete upon its curing.

Figure 26A:
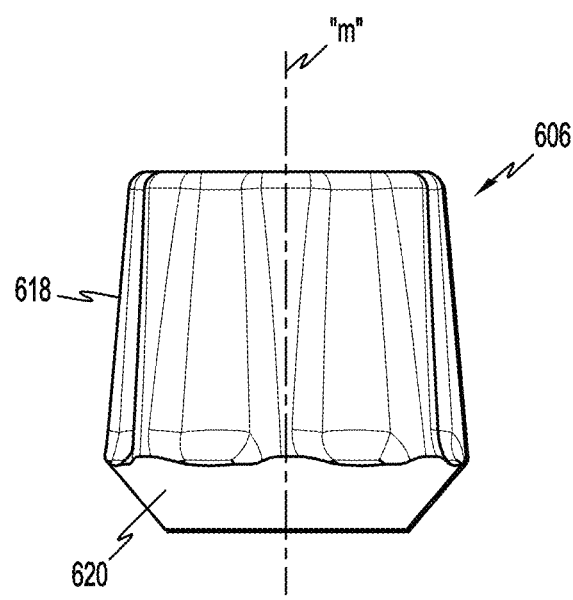
FIGS. 26A-26C are side elevation, top plan and bottom plan views of the locking wedge of the anchor apparatus of FIG. 22 in accordance with illustrative embodiments of the present disclosure.
Figure 26B:
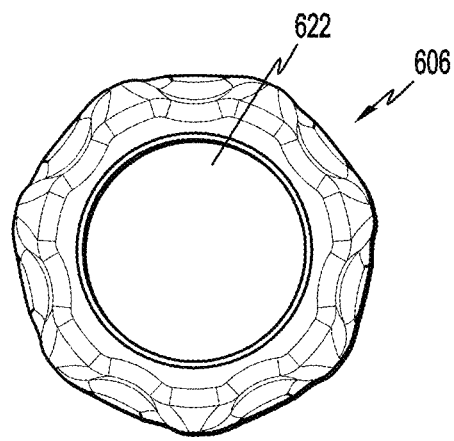
Figure 26C:
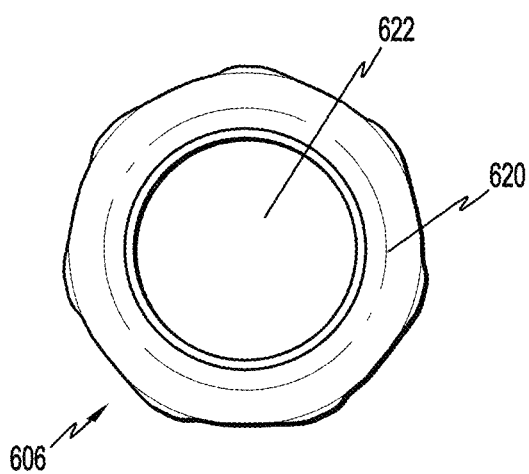

Referring now to FIGS. 26A-26C, in view of FIGS. 23 and 24, the locking wedge 606 defines a main segment 618 having a slight tapered arrangement and an expansion segment 620 at the lower end of the locking wedge 606 having a reverse angle relative to the main segment 616. The expansion segment 620 of the locking wedge 606 ranges from about 30 degrees to about 60 degrees relative to the longitudinal axis "m" of the locking wedge 606. The expansion segment 620 is advantageously dimensioned to engage the components of the expansion member 608 to displace the expansion segments 144 and secure the expansion member 608 relative to the recessed metal pan construction. The locking wedge 606 defines an internal bore 622, which, in illustrative embodiments, is not threaded to receive the anchor rod 114 of the anchor 602, and permit sliding movement therethrough. In alternate embodiments, the internal bore 622 may be threaded.

Figure 27A:
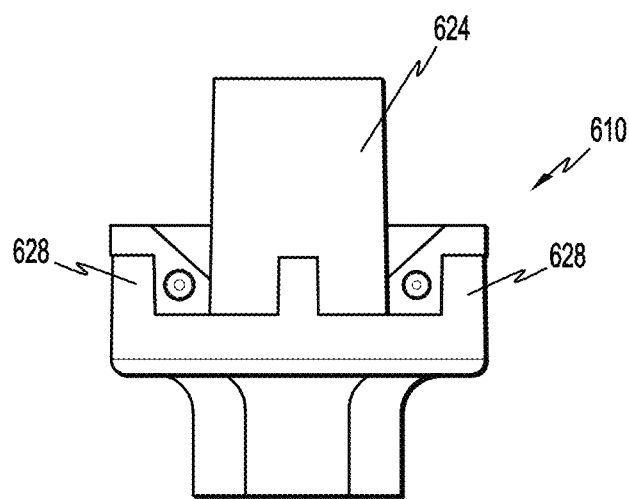
FIGS. 27A-27C are side elevation, top plan and bottom plan views of the anchor base of the anchor apparatus of FIG. 22 in accordance with illustrative embodiments of the present disclosure.
Figure 27B:
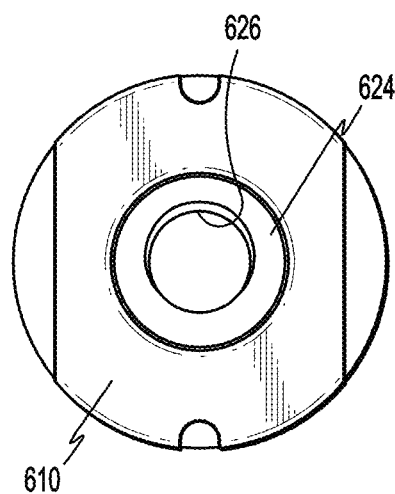
Figure 27C:
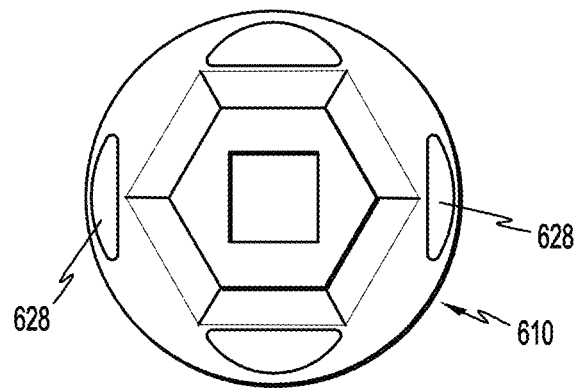

Referring now to FIGS. 27A-27C, in view of FIGS. 23 and 24, the anchor base 610 will be discussed. The anchor base 610 includes an internal cylindrical segment 624 defining an internal threaded aperture 626 to threadably engage the external thread 116 of the anchor rod 114. The internal aperture 626 of the cylindrical section 624 is dimensioned to receive the locking wedge 606 and permit passage of the locking wedge 606 over the cylindrical section 624. The anchor base 610 includes a plurality of anchor mounts 628 which are received within the recesses 154 of the expansion member 608 and are capable of sliding movement within the recesses 154 during movement of the expansion segments 144 between the approximated condition of FIG. 23 to the radially displaced condition of FIG. 24 in a similar manner to that described hereinabove in connection with FIGS. 1-20.

The anchor apparatus 600 is used in a similar manner to the anchor apparatus 100 of FIGS. 1-20. For example, one or more of the anchor apparatuses 600 are used in conjunction with forming a support a concrete support, for example, and without limitation, a horizontal beam, a vertical beam, a floor, a ceiling etc. During formation of the support, a form for the concrete support may include a corrugated metal pan deck construction. Generally, the form includes at least one horizontal or vertical metal pan deck upon which concrete is deposited. A depicted in FIG. 13, the methodology includes positioning the metal pan deck relative to a support location in a construction site where the support is to be formed. The anchor apparatus 600, in the closed condition of FIG. 22, is at least partially positioned within the hole in the metal pan deck with the escutcheon 604 positioned on one side (i.e., the outer side) of the metal pan deck and the expansion member 608 and the anchor base 610 positioned on the opposite side of the metal pan deck. The anchor base 610 is threadably engaged with the distal end of the external thread of the anchor 102 through coupling of the internal aperture 624 of the anchor base 610 with the external thread 116. The operator then engages the escutcheon 604, for example, and rotates the escutcheon 604 about the external thread 116 of the anchor rod 114 in a first rotational direction, for example, a clockwise direction, to advance the escutcheon 604 again the metal pan deck. During this rotational movement, the threaded coupling of the escutcheon 604 and the external thread 116 of the anchor rod 114 causes the escutcheon 604 to advance along the anchor rod 114 to contact and/or advance the locking wedge 606. Advancement of the locking wedge 606 causes engagement of the expansion segment 620 of the locking wedge 106 with the inner tapered wall 146 of the expansion segments 144 of the expansion member 108 (FIG. 10B). In response to this motion, the expansion segments 144 are each driven radially outwardly whereby the expansion member 108 assumes the expanded condition depicted in FIG. 24. In this position, the expansion member 108 defines a dimension "k2" which is greater than the dimension of the opening in the metal gate pan. Advancement of the escutcheon 604 secures the anchor apparatus 100 relative to the metal pan deck, and also creates a fluid tight seal which will prevent ingress of concrete within the internal cavity 614 of the escutcheon 604 during the curing process.

Once the concrete is cured thereby forming the support, the anchor base and optionally the expansion member 108 are removed. As best depicted in FIG. 24, the external thread 116 of the anchor rod 114 is recessed within the internal cavity 614 of the escutcheon 604. The internal cavity 614 is free of concrete, permitting the construction personnel to access the remote end of the external thread 116 terminating in the escutcheon 604 to couple one or more sleeves or tools in the manner described hereinabove in connection with the embodiment of FIGS. 1-20.

Each of the components of the anchor apparatus 100 may be formed of a suitable rigid polymeric material or a metallic material. In embodiments, at least the anchor 102 is formed of a suitable metal such as stainless steel or the like. At least some or potentially all of the components include an RFID tag or bar-code or other machine-readable indicia to be scanned via a scanning device, for example an RFID scanner or bar code reader to provide information of the product installed or the installation parameters as discussed hereinbelow. At least the escutcheon 604 and/or anchor rod may be made in a variety of colors, e.g., color-coded, to correspond to the tradesman or construction personnel who intend to use the particular anchor apparatus 100. More specifically, a particular color may be associated with specific construction personnel to assist said personnel in identifying the anchor apparatuses 100 which will be associated with his/her equipment.

Figure 28:
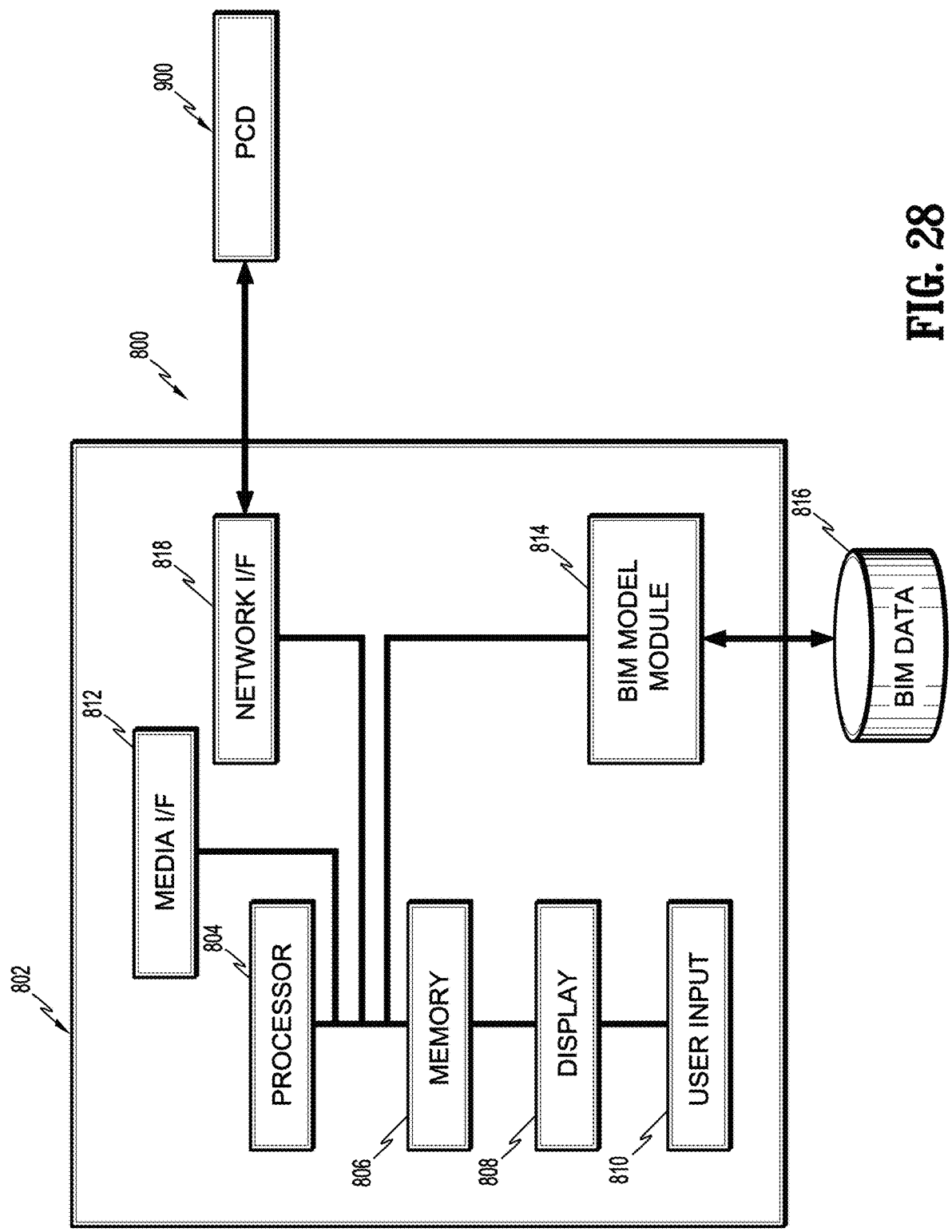
FIG. 28 illustrates a computer system for installation of the anchor apparatuses in accordance with which one or more embodiments of the invention can be implemented illustrating the server and the portable computing device in communication with the server.

Referring now to FIG. 28, there is illustrated framework of a comprehensive system and methodology for installation of equipment at a construction site in accordance with one or more embodiments of the present disclosure. In one exemplary embodiment, the system and methodology 800 will be discussed in conjunction with the installation of any of the anchor apparatuses 100 of the present disclosure described hereinabove. However, it is to be appreciated that the system and methodology 800 may have different applications and can be implemented in the installation of any type of construction equipment. In general, the system and methodology include utilizing Building Information Modeling (BML) to develop a model, for example, a 2-D or 3-D model, of the building to be constructed or which is in a partial construction phase, as a template to assist construction personnel in the proper positional installation of the anchor apparatuses 100. In particular, the model will be utilized to ensure the accurate installation of a plurality of anchor apparatuses 100 at predetermined locations within the construction site as set forth in accordance with the plan, design, existing build codes, OSHA requirements, etc. In general, the model will be available through a wireless connection and/or the Internet to be accessed by a portable computing device including, for example, a smartphone, tablet, portable computer, iPhone, etc. (hereinafter, referred to as a PCD) carried by construction personnel, mounted to an actuator or mounted to a telerobot, to assist in identifying the proper location for installation of all anchor apparatuses 100, 600 for any of the equipment installation applications mentioned hereinabove. The software for generating the model with positional indicators for the anchor apparatuses may be available as a downloaded application on a subscription basis. In certain applications, the positional indicators of the respective anchor apparatuses 100, 600 to be installed will be incorporated into the model as input subsequent to the generation of the model as, for example, an overlay, or initially incorporated as data used to generate the original model. It is further envisioned that the model may be continuously updated in response to input from the field, for example, based on data obtained by the PCD at the construction site.

The system and methodology 800 comprise a main server 802 and the aforementioned PCD 900. The main server 800 including a controller or processor 804 having memory 806 with software or logic programmed to perform the various functions associated with the afore-described detection and positional processes. The server 802 includes a visual or graphical display 808, a user input 810 such as a computer keyboard and/or mouse and a media interface 812 (e.g., wireless or electrical/mechanical connection such as a USB port or a CD-ROM) to permit import of program instructions in accordance with embodiments of the present application. These components are well known in the art and require no further discussion.

The system further includes a Building Information Management (BIM) data management module 814 coupled to a BIM database 816. The BIM database 816 includes the data utilized in the development of the models or maps, including 2-D or 3-D modeling of the building, to be constructed or developed, or which may be in a partial construction phase. The model to be generated by the BIM module 814 is typically detailed with respect to the design, development and construction documentation of building assemblies, systems, equipment and components including heating, HVAC, plumbing, electrical, concrete construction columns, steel I-Beams, flooring, etc. Preferably, the constructed model or models are as complete as possible to include all building assemblies, systems, equipment and components. In exemplary embodiments, the model or models generated by the BIM module 814 include the locations of all the anchoring apparatuses 100 to be installed at the construction site for all equipment applications. The data pertaining to the positional indicators for anchor apparatus location may be available as data within the BIM database 816 when the model is first generated by the BIM module 814. Alternatively, or additionally, this data can be input via the user input and/or interface 810 and incorporated subsequently into the model. As a further alternative, feedback received from the PCD 900 may be incorporated into the model to update the model as the installation of the anchor apparatuses progresses.

The server 802 furthers include a network interface I/F 818 which enables communication, wireless or wired, between the server 802 and the PCD 900 at the construction site. Thus, the network I/F 818 will direct the data to be received and potentially displayed by the PCD 900 and will receive data from the PCD 900. The data may be inclusive of only certain portions of the model(s) of interest to construction personnel, e.g., the areas of the building requiring installation of the anchor apparatuses or include model(s) of the entire building to be constructed. The network I/F (which can include, for example, modems, routers and Ethernet cards) enables the system to couple to other data processing systems or devices (such as remote displays or other computing and storage devices) through intervening private or public computer networks (wired and/or wireless).

As used herein, the term "processor" refers to one or more individual processing devices including, for example, a central processing unit (CPU), a microprocessor, a microcontroller, an application-specific integrated circuit (ASIC), a field programmable gate array (FPGA) or other type of processing circuitry, as well as portions or combinations of such circuitry elements.

Additionally, the term "memory" refers to memory associated with a processor, such as, for example, random access memory (RAM), read only memory (ROM), a removable memory device, a fixed memory device, and/or a flash memory. Media interface I/F 812 may be an example of removable memory, while the other types of memory mentioned may be examples of memory 806. Furthermore, the terms "memory" and "media" may be viewed as examples of what are more generally referred to as a "computer program product." A computer program product is configured to store computer program code (i.e., software, microcode, program instructions, etc.). For example, computer program code when loaded from memory 806 and/or media interface I/F 818 and executed by processor 804 causes the device to perform functions associated with one or more of the components and techniques of system 800. One skilled in the art would be readily able to implement such computer program code given the teachings provided herein. Similarly, the components and techniques described herein may be implemented via a computer program product that includes computer program code stored in a "computer readable storage medium." Other examples of computer program products embodying embodiments of the invention may include, for example, optical or magnetic disks. Further, computer program code may be downloaded from a network I/F 918 executed by the system.

Still further, the I/O interface formed by devices 1106 and 1108 may be used for inputting data to the processor 804 and for providing initial, intermediate and/or final results associated with the processor 804.

Figure 29:
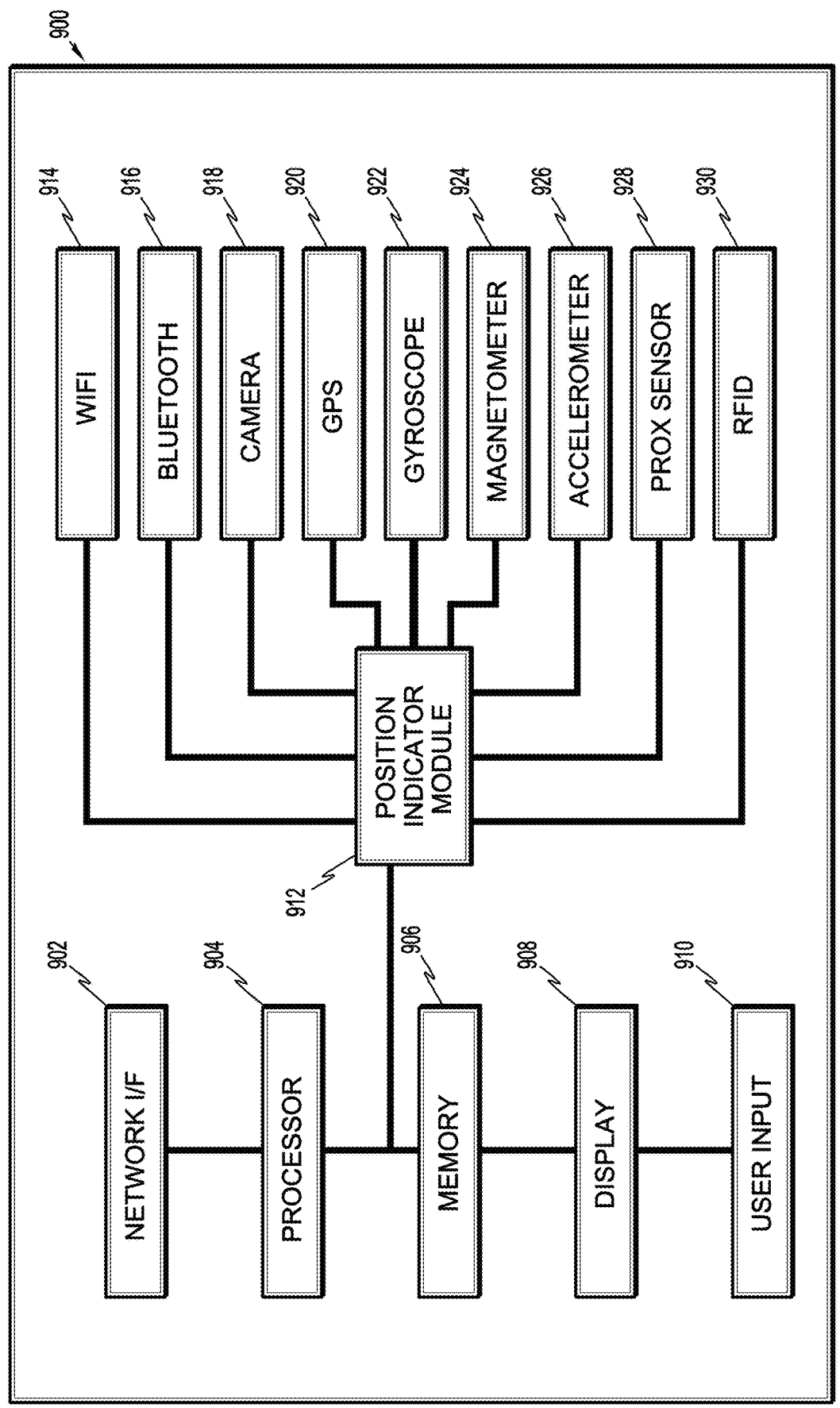
FIG. 29 illustrates the portable computing device of the system of FIG. 28.

Referring now to FIG. 29, the PCD 900 will be discussed. The PCD 900 will include the requisite hardware components to communicate or interact with the server 802. The PCD includes a network interface I/F 902 having wireless capabilities (e.g., 4G or 5G) to enable wireless communication with the network I/F 818 of the server 802 or any wireless systems installed at the construction site. Alternatively, the connection to the server 802 may be through a wired network utilizing Ethernet cables, multiple routers, switches etc. to transfer data. The PCD 900 includes a conventional processor 904 and a memory 906 which stores software instructions that are executable by the processor 904.

The PCD 900 further includes a display 908 such as a LED or LCD screen to display the model data and a user input 910 in the form of, for example, a mouse, keyboard or touchscreen to input data. The PCD 900 further includes a position indicator module 912 configured to determine the location or position of the PCD 900 relative to the model generated by the BIM model module 814 of the construction building/site. In one exemplary embodiment, the position indicator module PCD 912 requires installation of a proprietary application downloaded by a user to the memory 906 of the PCD 900, for example, on a subscription basis. In certain embodiments, access to the application may be tiered, i.e., certain tiers may have higher functionality than other tiers resulting in a higher subscription price for the higher function tiers. Alternatively, or additionally, an existing web browser hosting the application may be available. The position indicator module 912 can include any type of software capable of receiving input from various sensors or components associated with the PCD 900 to determine the location of the PCD 900 relative to the construction or building site model.

Any conventional outdoor and/or indoor positioning systems as components of the position indicator module 912 are contemplated and can be incorporated into the position indicator module 912 to determine the precise location of the PCD 900.

The PCD 900 further includes a plurality of sensors or components which may be utilized individually, or in combination as positioning systems, to track the location of the PCD 900 relative to the generated building model and to provide data relevant to the anchor installation process back to the server. These sensors include, but are not limited to WIFI 914, Bluetooth 916, a camera 918, a Global Position System (GPS) sensor 920, a gyroscope 922, a magnetometer 924, an accelerometer 926, a proximity sensor 928 and a radio frequency identifier device or sensor (RFID) 930. These sensors are incorporated in most commercially available smartphones, tablets, portable computers.

In certain embodiments, to track the PCD 900 relative to the generated model of the building, the GPS sensor 920 is utilized in a conventional manner. The GPS sensor 920 is effective in open construction where a direct line of sight to the PCD 900 is available. Cellular-based triangulation methodologies with GPS are also envisioned. In other embodiments, a WIFI positioning methodology such as WPS or Wipes/WFPS may be utilized with the WIFI 914, individually, or in combination with the GPS capabilities, by tracking the location of the PCD 900 relative to nearby known Wi-Fi hotspot(s), one or more of which may be installed at the commercial site. Bluetooth Low Energy (BLE) technology may be utilized where signals from reference beacons disposed at the commercial site are at the core of the indoor location technology. The PCD 900 detects the signal from the beacon with the Bluetooth 916 and can calculate roughly the distance to the beacon and hence estimate the location of the PCD 900. This data is sent along with the location signal to the reader. Active RFID location tracking systems utilizing active or passive RFID tags positioned as known reference points detectable by the RFID or module 930 are also envisioned.

In other exemplary embodiments, the magnetometer 924 of the PCD 900 may be utilized individually or to augment the other methodologies where a "fingerprinting" technology is used to map the magnetic fields at the construction site and then the magnetometer 924 can use that map to find the location of the PCD 900 relative to the generated map. In other embodiments, an inertial navigation methodology may be utilized that incorporates the accelerometer 926 and the gyroscope 922 of the PCD 900 to continuously calculate the position, the orientation, and the velocity (direction and speed of movement) of the PCD 900 based on an initial reference or known starting point. A visual positioning methodology including the camera 918 of the PCD 900 can determine the location of a PCD 900 by decoding location coordinates from visual reference markers which are encoded with the marker's location coordinates.

Exemplative location methodologies are disclosed in U.S. Pat. No. 9,539,164 to Sanders and U.S. Pat. No. 9,749,780 to Huang et al., the entire contents of each disclosure being incorporated by reference herein.

In other embodiments, an infrared (IR) sensor station may be mounted to, for example, a tripod and calibrated. Light is emitted from an IR LED reflects off, for example, the PCD 900 or a component to which the PCD is mounted and is captured by a detecting photodiode to produce a signal that is a function of the distance between the sensor and the surface. This technology can be used individually or in concert with the aforementioned GPS and position sensors discussed hereinabove to properly locate one or more subsequent anchor placement positions based on a previously stored reference anchor apparatus or some other known reference point within the construction site.

In another aspect of the present disclosure, the RFID sensor 930 of the PCD 900 may be utilized to scan RFID tags mounted to, or associated with, the components of the anchor apparatuses 100, 600. Scanning of the RFID tags with the RFID sensor enables the system 900 to gather information and data concerning the anchor apparatuses that are installed or need to be installed. The data may include, but is not limited to, manufacturer of the components of the anchor apparatuses, lot numbers, manufacture date, installer, installation date and any other metadata which may be useful to track and forward installation and product details back to the server 802 or the PCD 900. This information would be invaluable for record keeping purposes, progression of anchor installation, etc.

Figure 30:
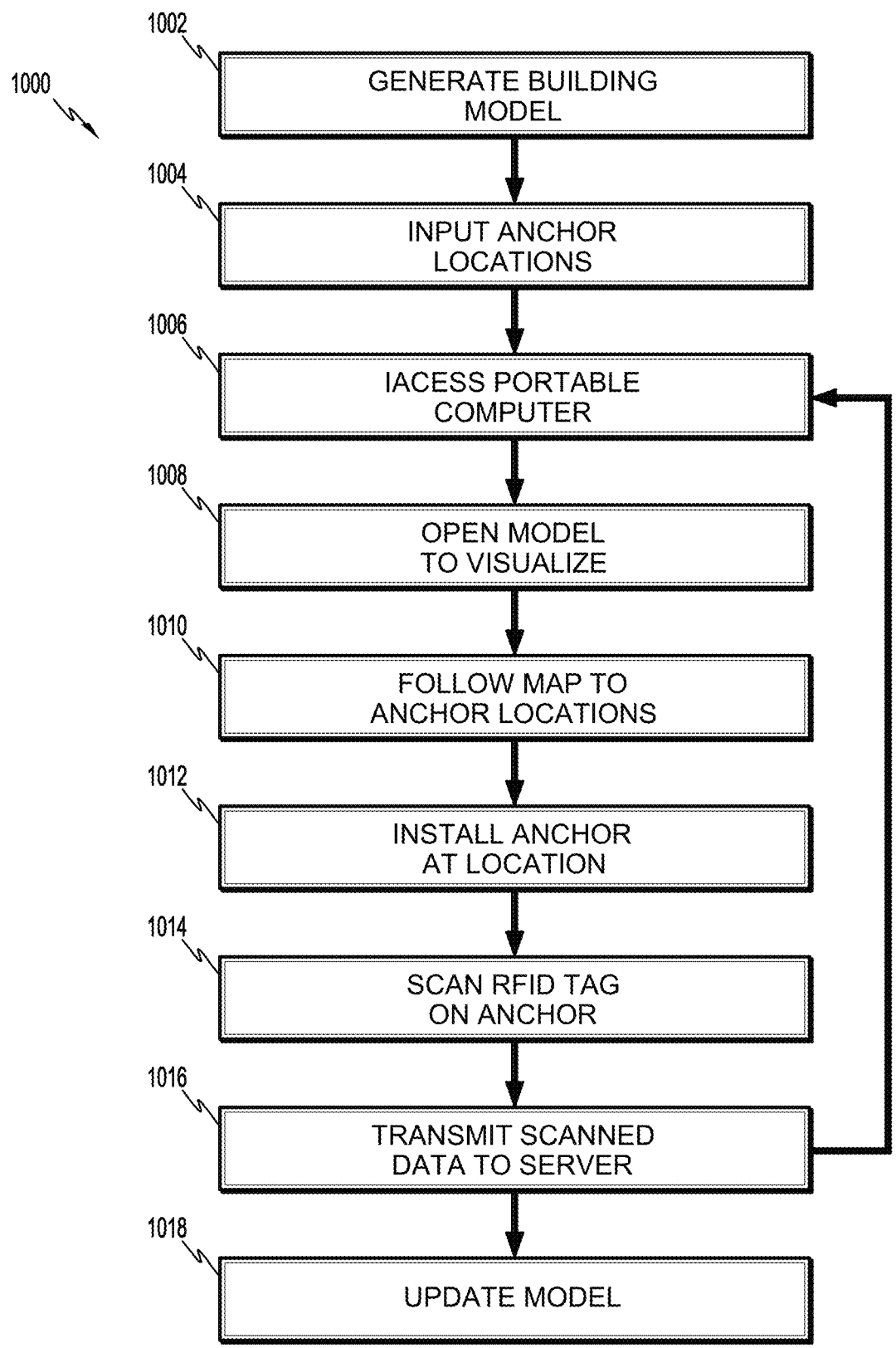
FIG. 30 is a flow chart illustrating a system and methodology for use in conjunction with the computing system for installation of the anchor apparatuses.

Referring now to FIG. 30, a basic flow chart 1000 illustrating a method for installation of the anchoring apparatuses in accordance with an exemplary embodiment of the present disclosure is illustrated. In STEP 1002, a building model, for example, a 3-D model of the building is developed by the BIM Module 814 utilizing conventional building model techniques. In STEP 1004, data is input into the building model to indicate the locations of the sets of anchoring apparatuses to be installed in the building. As mentioned above, each set of anchoring apparatuses may be assigned to a variety of construction equipment including, but not limited to heating, ventilating, HVAC, electrical, plumbing, safety fences, etc. In certain embodiments, the position indicators for the anchoring apparatuses may appear as an overlay on the map. In other embodiments, the anchor position indicators may be built into the map in STEP 1002. It is further envisioned that STEP 1004 may be combined and data concerning anchor position indicators incorporated into the original model. Each set of anchoring apparatuses 100 may be located within the model of the building site, e.g., the structural concrete columns and supports, at any predefined locations thereby providing a mechanism to eventually install the equipment in an orderly manner without any concerns of misalignment, interference, etc. of the equipment. Moreover, the layout of the equipment to be installed is readily visible via the generated model to personnel at the server 802 end and at the PCD 900 end. In addition, if any adjustments are needed with respect to the location of any of the anchor apparatuses 100, this may be accomplished via the input at the server 802 end or alternatively at the PCA 900 end.

Figure 31:
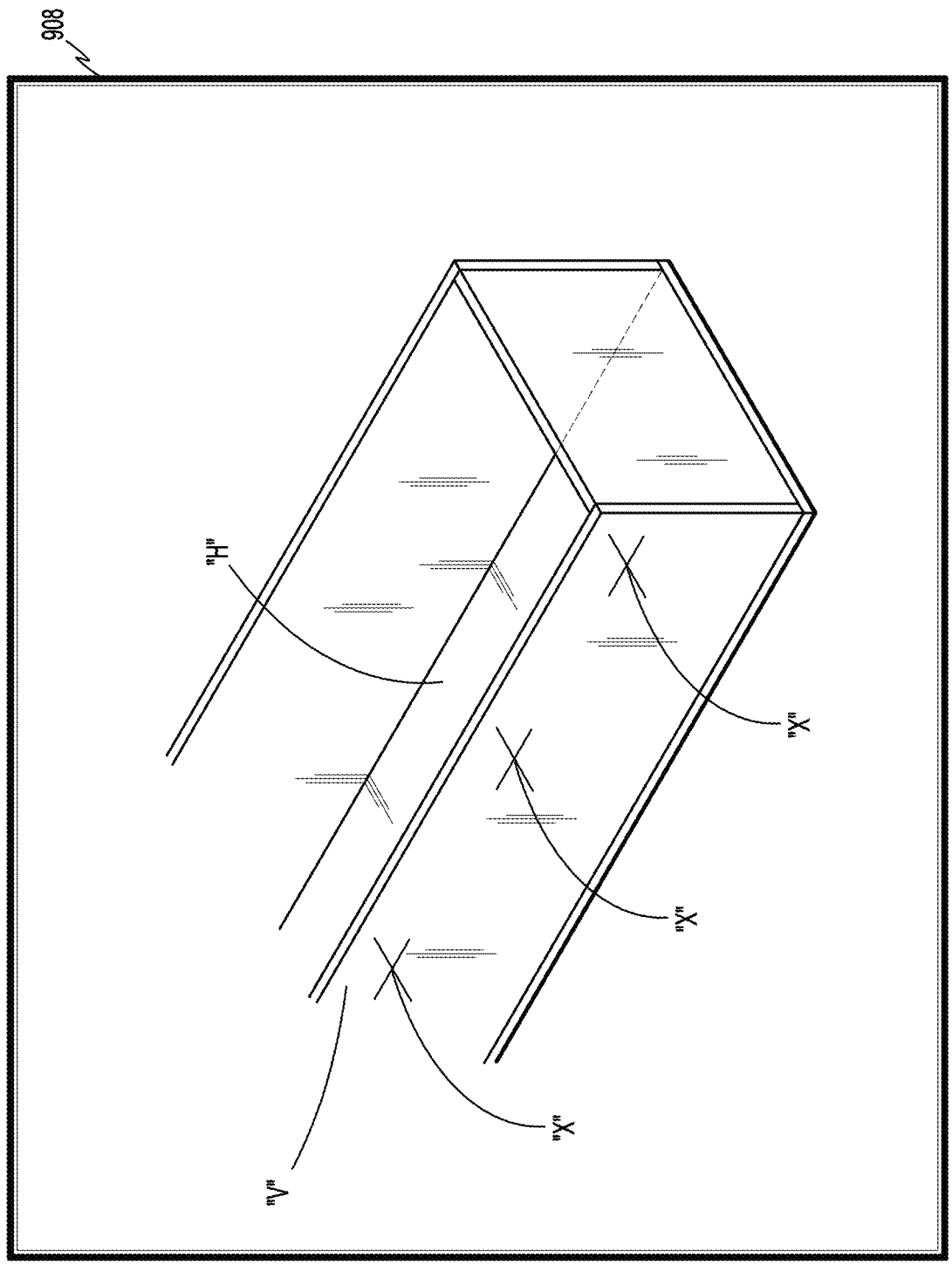
FIG. 31 illustrates a visual display of the portable computing device identifying locations for installation of the anchor apparatuses.

In STEP 1006 the user accesses the PCD and opens the model on the PCD 900 (STEP 1008) and visualizes the locations of the anchor apparatuses 100 the operator is responsible to install. Following the model or map, the operator proceeds to the set of anchoring apparatuses guided by any of the positioning systems discussed hereinabove. (STEP 1010). For example, with reference to FIG. 31, which is generally similar to FIG. 16, the visual display 908 of the PDA may present a 3-D model at least inclusive of the vertical boards "v" and the horizontal form board "h", and the surrounding environment to the user. The visual display may be indexed, for example, with display cross-hairs "x"

corresponding to the positional locations where anchor apparatuses are to be installed. In embodiments, it is envisioned that the PCD 900 may provide in addition to visual indicia of the location of the visual indicators, an audible indicator (e.g., a beep, a voice indicator), vibrate, activate the light within the PCD 900 or any other means inclusive, but not limited to tactile or visual indicators when the PCD 900 is at the proper location at which the anchor apparatus needs to installed. The installer then installs the anchoring apparatuses in the concrete form board as discussed hereinabove. (STEP 1012).

In addition, operator scans with the RFID scanner 930 of the PCD the RFID tags associated with the various components of the anchoring apparatus. (STEP 1014) The data obtained by the RFID tag or bar code may be stored in the PCD 900 and/or transferred back to the server 802 either through instruction by the operator or automatically. (STEP 1016). The data obtained by the RFID scanner 930 provides at least two benefits: 1) provides the metadata associated with the installed anchor apparatus including manufacture, installer, installation date, lot number etc. for record keeping purposes: and 2) provides an indicator that the anchor apparatus at this location has been installed. In STEP 1018, the model is updated to include the information obtained by the RFID scanner 930. The operator then continues to install additional anchor apparatuses 100 following the original or the updated model to the next anchor position displayed on the model and installs an additional anchor apparatus 100 in the same manner. The operator proceeds to the subsequent position indicators for each of the anchoring apparatuses of the set and repeats at least STEPS 1010-1016 for each anchor apparatus 100.

The procedure set forth in the flow chart of FIG. 30 may be repeated for each set of anchoring apparatuses 100. For example, the first set may be installed to support electrical cable. The second set may be installed to support plumbing equipment, etc. The third set for installing HVAC equipment etc. It is envisioned that the model may incorporate different colors as anchor position indicators to correspond with respective equipment to be installed. For example, red to identify electric, blue for plumbing, orange HVAC, etc. Alternatively, or additionally, the model data forwarded from the server end may include only those anchor position indicators associated with installation of a particular equipment.

Thus, as each anchor apparatus or set of anchor apparatuses is installed, this information is conveyed from the PCD 900 to the server 802. The BIM model is updated (STEP 1018) to reflect the installation of the selected anchor apparatuses 100. It is envisioned that the updated model may incorporate indicia distinguishing anchor locations where an anchor apparatus has been installed anchor apparatus 100 and those positions devoid of an installed anchor apparatus 100. For example, an installed anchor apparatus 100 may be indicated as a green circle or dot around the anchor location position on the model and those anchor location positions without an installed anchor apparatus 100 would be labeled with a red circle or dot on the model, or alternatively an installed anchor apparatus 100 would be indicated as a solid circle while an uninstalled anchor apparatus 1000 would be an open circle. Other visual indicators are also envisioned. Thus, the operator can view the status of the anchor installation process and identify those anchors positions needing installation of an anchor apparatus 100.

It is to be appreciated that the flow chart of FIG. 30 includes STEPS that may be combined, may be performed in a different order than as outlined in the chart, and/or some of the STEPS may be omitted.

Figure 32:
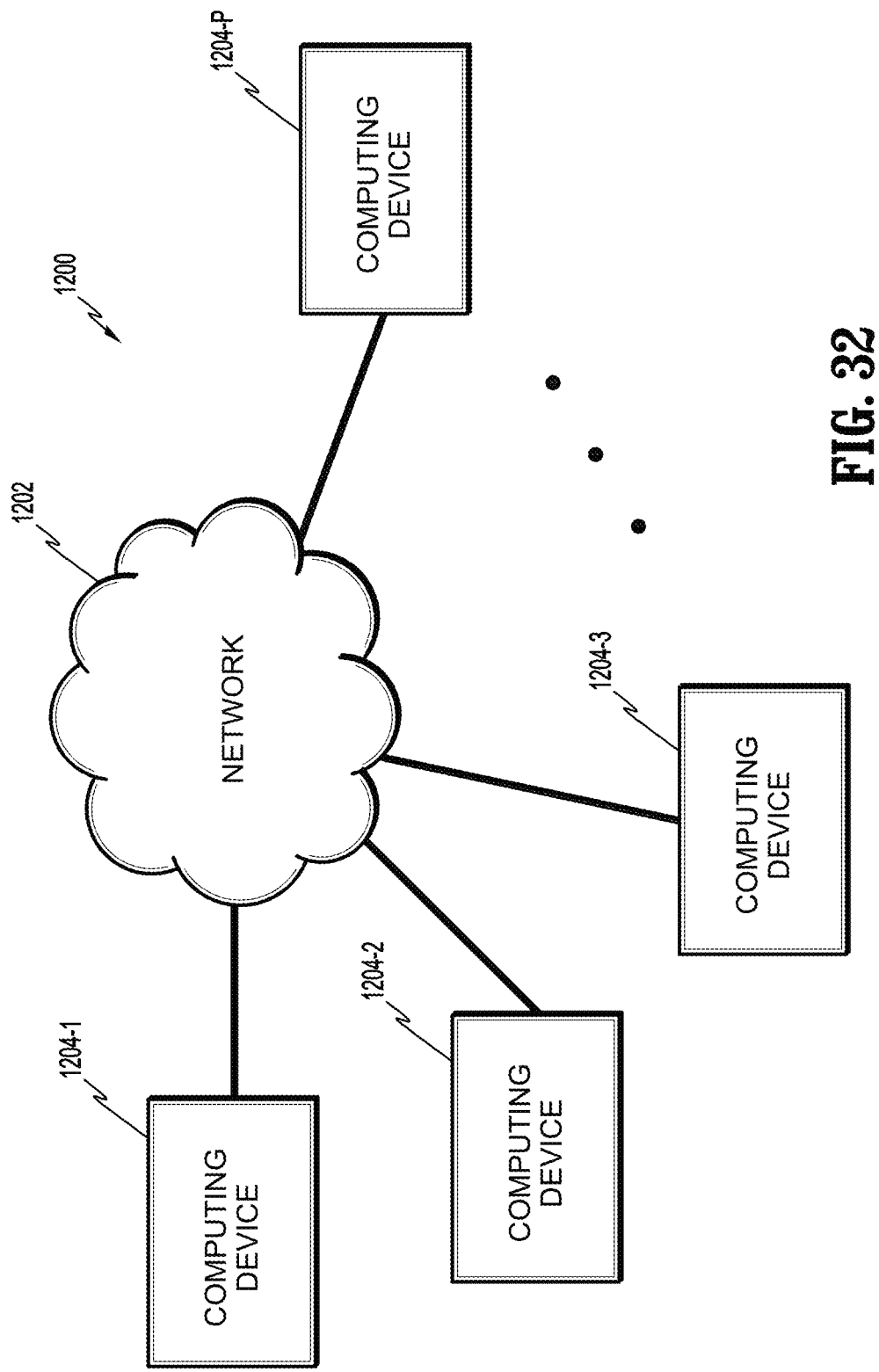
FIG. 32 illustrates a distributed communications/computing network in accordance with which one or more embodiments of the present disclosure can be implemented.
Figure 33:
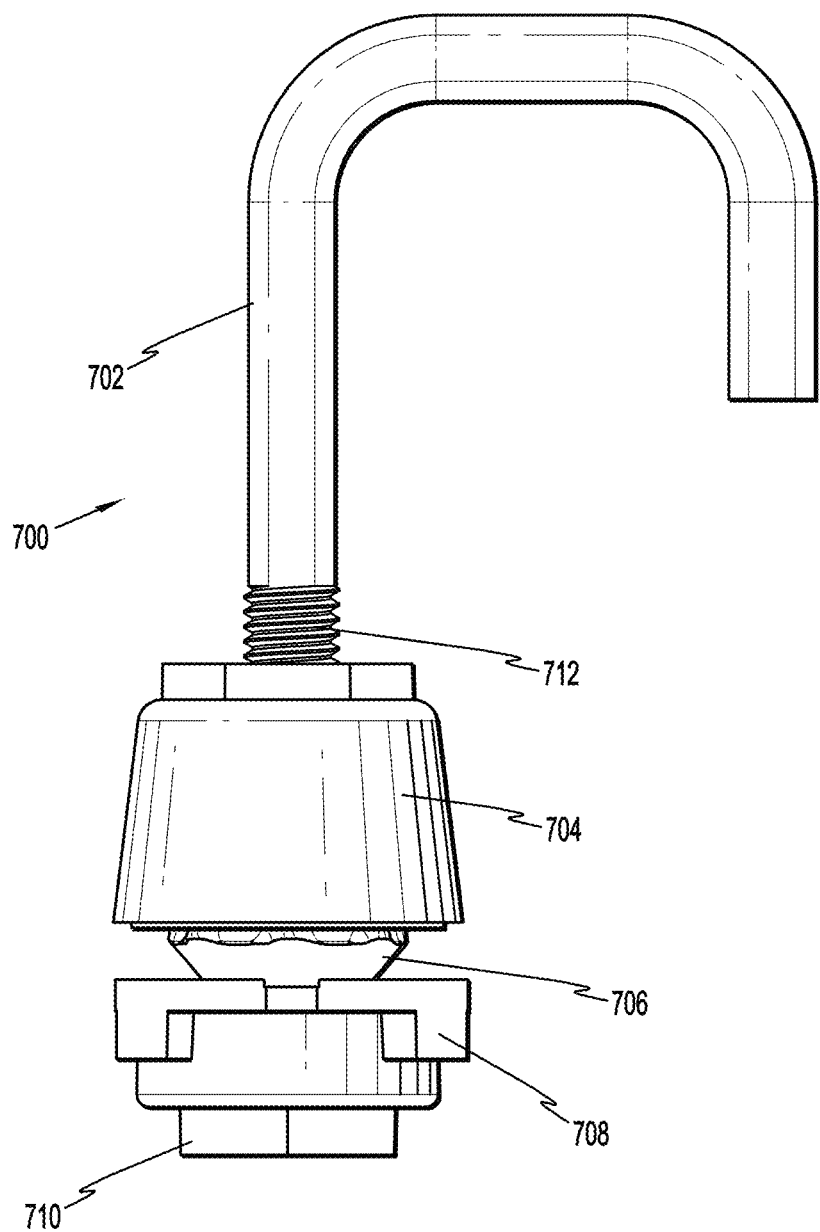
FIG. 33 is a side elevation view of another embodiment of the anchor apparatus in accordance with illustrative embodiments of the present disclosure.
Figure 34A:
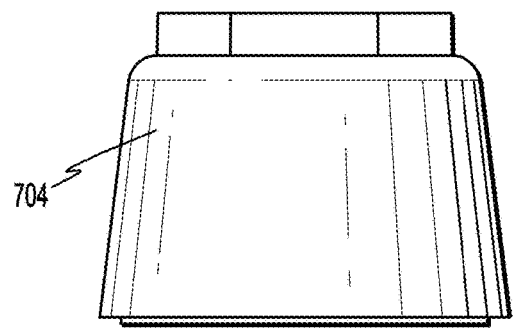
FIG. 34A-34D are side elevation, top plan, side elevation view in phantom and bottom plan views of the escutcheon of the anchor apparatus of FIG. 33 in accordance with illustrative embodiments of the present disclosure.
Figure 34B:
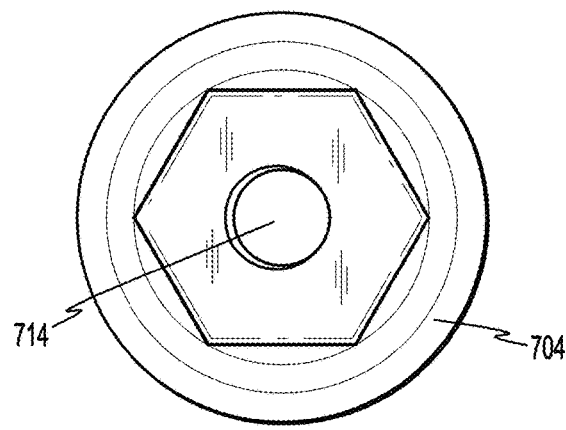
Figure 34C:
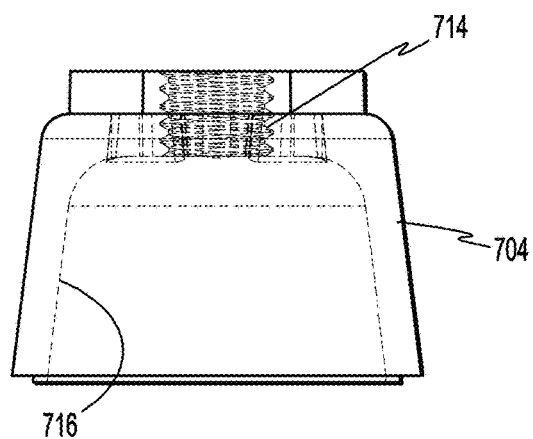
Figure 34D:
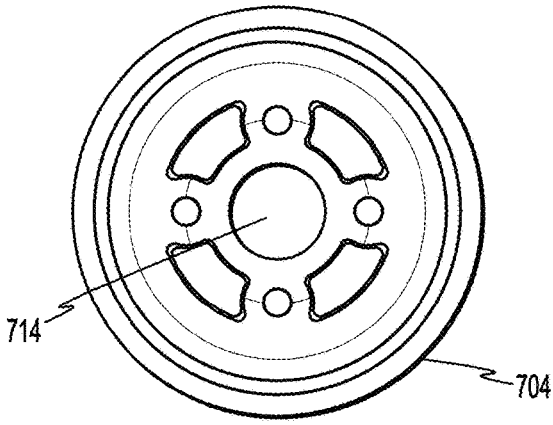
Figure 36A:
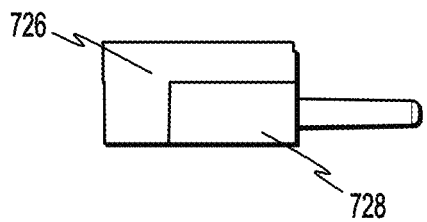
FIGS. 36A-36D are first side elevation, top plan, second side elevation and bottom plan views of the expansion member of the anchor apparatus of FIG. 33 in accordance with illustrative embodiments of the present disclosure.
Figure 36B:
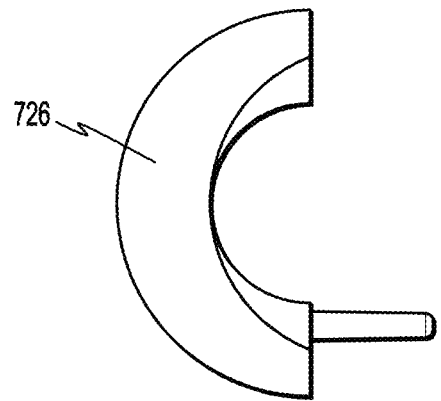
Figure 36C:
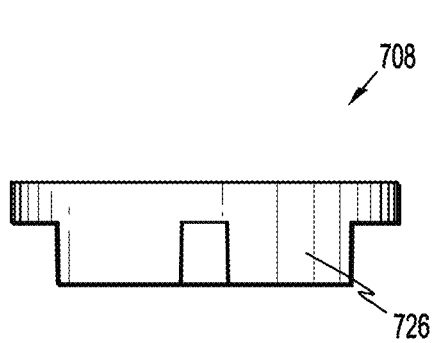
Figure 36D:
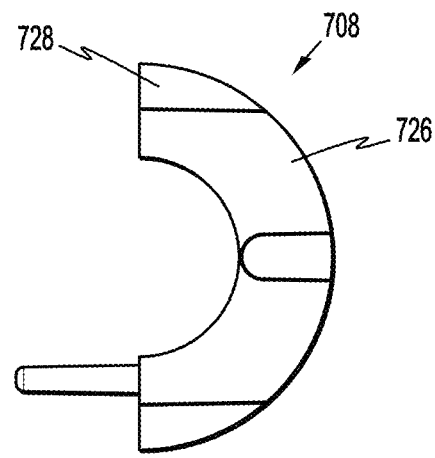
Figure 37A:
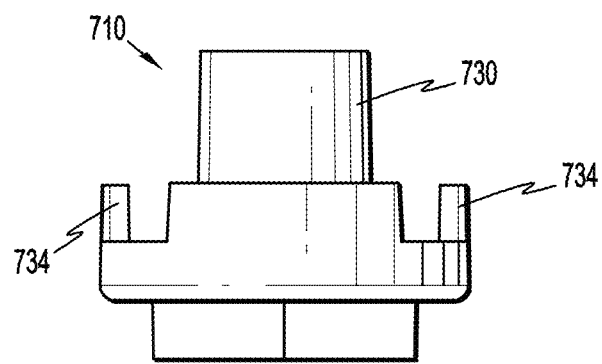
FIGS. 37A-37C are front, top and bottom plan views of the anchor base of the anchor apparatus of FIG. 33 in accordance with illustrative embodiments of the present disclosure.
Figure 37B:
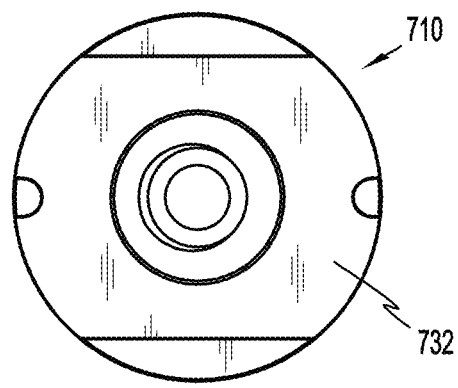
Figure 37C:
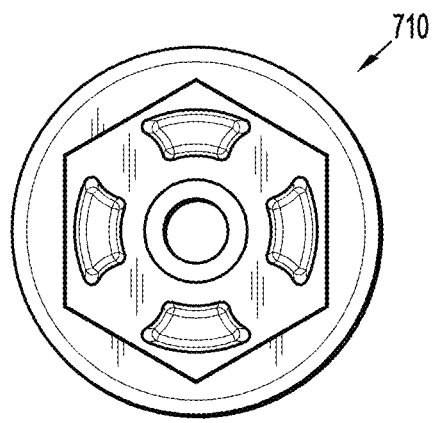
Figure 38:
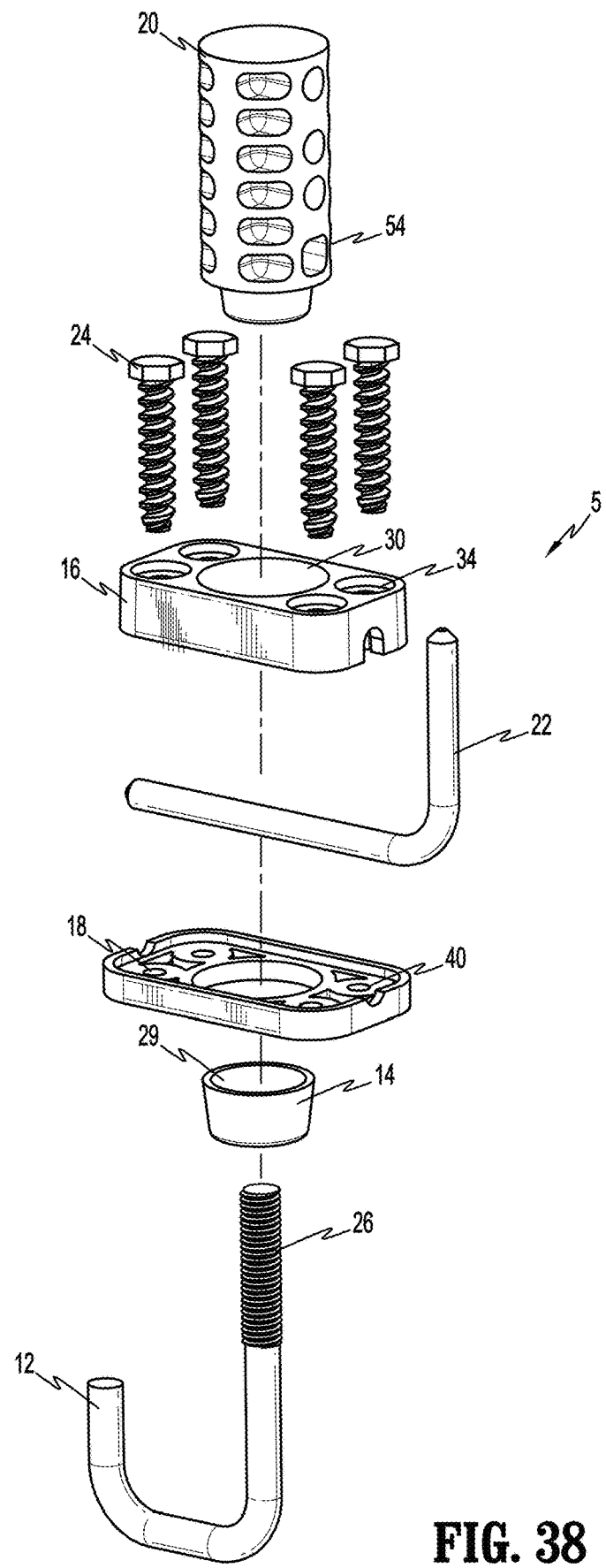
FIGS. 38 and 39 are first and second exploded perspectives view of another embodiment of the anchor apparatus in accordance with illustrative embodiments of the present disclosure.
Figure 39:
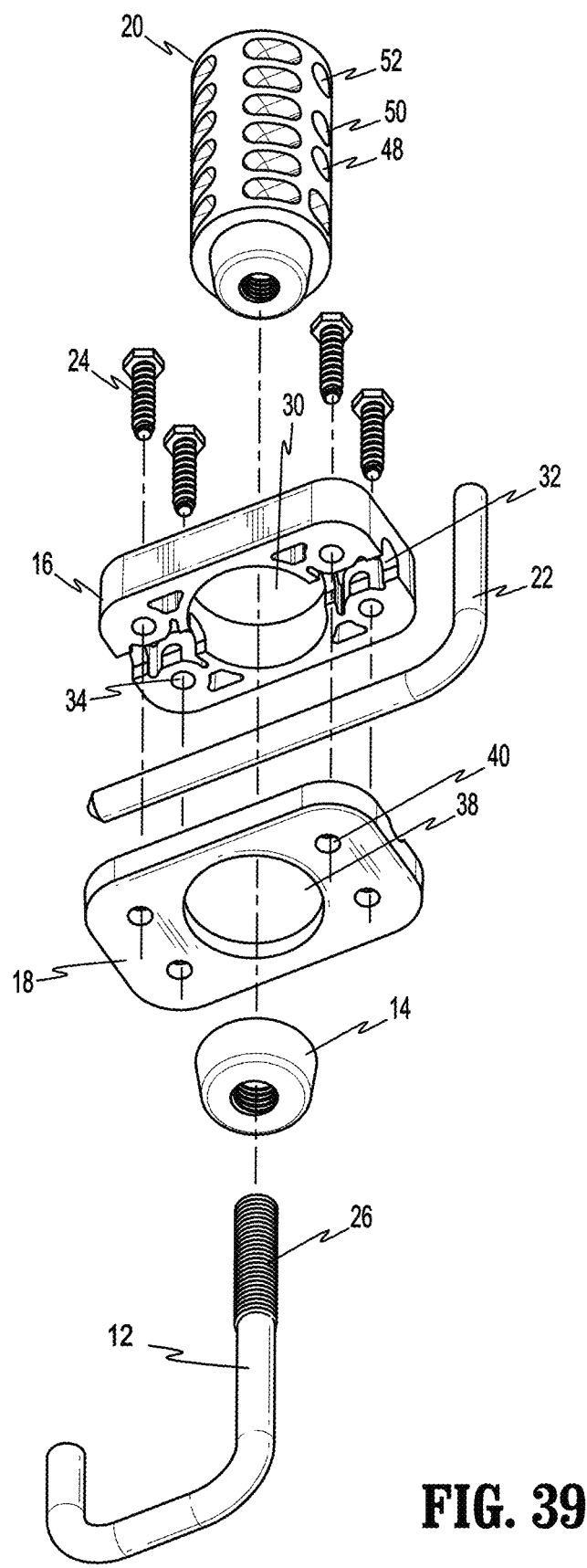

FIG. 32 illustrates a distributed communications/computing network (processing platform) in accordance with which one or more embodiments of the invention can be implemented. By way of illustration, FIG. 32 depicts a communication system 1200 that includes a plurality of computing devices 1204-1 through 1204-P (herein collectively referred to as computing devices 1204) configured to communicate with one another over a network 1202.

The network 1202 may include, for example, a global computer network such as the Internet, a wide area network (WAN), a local area network (LAN), a satellite network, a telephone or cable network, or various portions or combinations of these and other types of networks (including wired and/or wireless networks).

As described herein, the computing devices 1204 may represent a large variety of devices. For example, the computing devices 1204 can include the PDA 900 described hereinabove, a portable device such as a mobile telephone, a smart phone, tablet, computer, a client device, etc. The computing devices 1204 may alternatively include a desktop or laptop personal computer (PC), a server, a microcomputer, a workstation, a kiosk, a mainframe computer, or any other information processing device which can implement any or all of the techniques detailed in accordance with one or more embodiments of the invention. In other exemplary embodiments, the server 802 and the PDA 900 may be incorporated as a single unit, and located at the construction site.

One or more of the computing devices 1204 may also be considered a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device, the context of which is apparent from the description.

Additionally, as noted herein, one or more modules, elements or components described in connection with embodiments of the invention can be located geographically-remote from one or more other modules, elements or components. That is, for example, the modules, elements or components shown and described in the context of FIGS. 28-32 can be distributed in an Internet-based environment, a mobile telephony-based environment, a kiosk-based environment and/or a local area network environment. The system and methodology are not limited to any particular one of these implementation environments.

By way of example, in an Internet-based and/or telephony-based environment, the system is configured to enable a user to identify the proper installation for anchor installation at the PCD end (one of the computing devices 1204 in FIG. 32), and the image is transmitted to a remote server (another one of the computing devices 1204 in FIG. 32) for processing and analysis such as detailed herein. At least a portion of the processing and analysis may be performed at the user end.

Additionally, for example, in a kiosk-based environment, a device (one of the computing devices 1204 in FIG. 32) such as PCD 900 captures an image or enables a user to select an image, and the image is transmitted through either a wired or wireless connection to a server (another one of the computing devices 1204 in FIG. 32) for processing and analysis as described herein. Again, at least a portion of the processing and analysis may be performed at the user end.

In a LAN-based environment, all image capture, processing and analysis can be performed by one or more computing devices (1204 in FIG. 32) that are locally coupled to the LAN.

In one or more embodiments, the computing system environment shown in FIG. 32 employs a cloud computing platform, where "cloud" refers to a collective computing infrastructure that implements a cloud computing paradigm. For example, as per the National Institute of Standards and Technology Publication No. 800-145, cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. Cloud-based computing platforms (also sometimes referred to as data centers) are deployed and managed by cloud service providers, who provide a computing environment for customers (tenants) to run their application programs (e.g., business applications or otherwise). The applications are typically run on one or more computing devices (i.e., host devices or hosts), and write data to and read data from one or more storage devices (e.g., hard disk drives, flash drives, etc.). The storage devices may be remote from the host devices such that they are connected via a communication network. However, some or all of the storage devices may be part of the same computing devices that implement the hosts.

In one or more embodiments, the computing system environment shown in FIG. 32 employs blockchain/distributed ledger technology. The terms "blockchain," "ledger" and "distributed ledger" may be used interchangeably. As is known, the blockchain or distributed ledger protocol is implemented via a distributed, decentralized computer network of compute nodes. A given one of the blockchain compute nodes (ledger nodes) resides on a client or the client otherwise has access to a blockchain compute node. The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In the case of a "bitcoin" type implementation of a blockchain distributed ledger, the blockchain contains a record of all previous transactions that have occurred in the bitcoin network. The bitcoin system was first described in S. Nakamoto, "Bitcoin: A Peer-to-Peer Electronic Cash System," 2008, the disclosure of which is incorporated by reference herein in its entirety.

Referring now to FIGS. 33-37, there is illustrated another embodiment of the present disclosure. The anchor thread apparatus 700 includes some similar components to the anchor thread apparatuses described in the embodiment of FIGS. 1-20 and FIGS. 21-26. The anchor apparatus is also intended for use with a deck pan, for example, a recessed metal deck pan or a non-recessed metal deck pan, used in concrete forming including, without limitation, vertical columns, horizontal columns, flooring, ceiling etc. The anchor apparatus 700 includes an anchor 702, an escutcheon 704, a locking wedge 706, an expansion plate 708 and an anchor base 710. The anchor 702 may take a variety of shapes or configurations and includes an external thread 712. As shown in FIGS. 34A-34D, the escutcheon 704 may be in the shape of a frustum; however, other shapes are also envisioned. The escutcheon 704 includes a threaded central passage 714 for reception and threadably engaging the external thread 712 of the anchor 702. The escutcheon 704 further includes an internal cavity 716 dimensioned for positioning and/or receiving the locking wedge 706. The escutcheon 704 may be tightened sufficiently against the metal pan deck to create an isolated chamber defined by the internal cavity 716. This, in effect, establishes a tight seal with the metal pan deck to prevent ingress of concrete within the internal cavity 716 when the concrete is poured and during curing of the concrete thereby maintaining the external thread of the external thread 712 of the anchor rod 702 accessible to the contractor. The top surface of the escutcheon 704 may include a polygonal protrusion or nut segment 718 engagable by a wrench (for example, as described hereinabove) to tighten the escutcheon 704 onto the components and the recessed metal pan.

With reference to FIGS. 35A-35C, the locking wedge 706 defines a main segment 720 having a slight tapered arrangement and an expansion segment 722 at the lower end of the locking wedge 706 having a reverse angle relative to the main segment 720. The expansion segment 722 is advantageously dimensioned to engage the components of the expansion plate 708 secure the expansion segment 722 relative to the recessed metal pan construction. The locking wedge 706 defines an internal bore 724, which, in illustrative embodiments, is not threaded to receive the anchor 702, and permit sliding movement therethrough.

FIGS. 36A-36D illustrate the expansion plate 708. The expansion plate 708 is similar to the expansion member 144 described in connection with the embodiment of FIGS. 1-20 and includes two expansion segments 726 which move relative to each other between approximated and displaced conditions as described hereinabove. The expansion segments 726 include recesses 728 on its lower or bottom surface which couple with the anchor base 710.

FIGS. 37A-37D illustrates the anchor base 710. The anchor base 710 is substantially similar to the anchor base 610 of the embodiment of FIGS. 27A-27C. The anchor base 710 includes a cylindrical segment 730 defining an internal threaded aperture 732 to threadably engage the external thread 712 of the anchor 702. The cylindrical segment 730 is received within the internal bore 724 of the locking wedge 706 permitting the locking wedge 706 to slide over the cylindrical segment 730 during advancement of the escutcheon 704. Expansion plate 708 is positioned over the cylindrical segment 728 to couple the anchor base 710 and the expansion plate 708. The anchor base 710 may include one or more protrusions 734 which are received within the recesses 728 to register and/or couple the expansion plate 708 with the anchor base 710. The one or more protrusions 734 slide within the recesses 728 during movement of the expansion segments 726 between approximated and closed conditions. The bottom surface of the anchor base may include a hex head for engagement by a wrench.

The anchor apparatus 700 is used in a similar manner to that described above in connection with the flow charts of FIGS. 13 and 15, and in connection with the description of the use of the anchor apparatus of FIGS. 21-26.

The Anchor Thread RMPD (Recessed Metal Pan Deck) is a cast-in-place anchoring system designed for use in metal pan deck construction. What makes the Anchor Thread RMPD unique is that there are no screws or fasteners required to install. The installation process consists of drilling a 1⅝" hole in the metal pan deck, followed by inserting the Anchor Thread RMPD assembly and tightening the escutcheon clockwise to drive the wedge into the expansion plates to flare out while simultaneously compressing the assembly to the metal pan deck. Once the concrete has achieved the required strength, the base is removed leaving a 1 2"-13×1" threaded anchor point that is recessed from the bottom face of the metal pan deck. The escutcheon that remains in the concrete and be color coordinated to coincide with BIM or trade standards. The escutcheon creates a cavity of the same dimensions of the escutcheon cavity on the AT500 LP (Lock Plate) for the purpose of creating cross compatibility with other Anchor Thread accessories that utilize the escutcheon cavity as a shoulder for the loads applied to the Anchor Thread system. Each Anchor Thread is laser etched with a QR-code on the bottom face of the bolt that when scanned by the end user brings them to a page that displays pertinent information on the anchoring system.

FIGS. 38-50 illustrate another alternate embodiment of the anchor apparatus of the present disclosure. Anchor apparatus 5 includes multiple components, namely, anchor member 12, cover 14, locking plate 16, spacer 18, insert 20, locking pin 22 and fasteners 24. The anchor member 12 is substantially similar to the anchor described in the earlier embodiments and includes external threaded portion 26. The cover 14 may have a frusto-conical shape and defines internal threaded passage 28 which terminates in internal cavity 29. (See also corresponding components in FIG. 5). The internal cavity 29 may taper in dimension (e.g., increase in dimension) toward the open end of the cover 14. The locking plate 16 defines an internal bore 30 having a predetermined diameter ranging from about 1 inch to about 3 inches or about 2⅛ inches. Other dimensions are also contemplated. A channel 32 extends across the locking plate 16 intersecting the internal bore 30 thereby extending on both sides of the internal bore 30. The channel 32 is dimensioned to at least partially receive the locking pin 22. The locking plate 16 also includes one or more, e.g., four (4) fastener openings 34, for receiving the fasteners 24 for securing the locking plate 16 to the formboard "f" (e.g., a wood or composite form board). The spacer 18 may be optional and is configured to engage the locking plate 16 on one side, and the formboard "f" on the other side. The spacer 18 may define a peripheral lip or edge 36 configured to receive the locking plate 16 to secure the locking plate 16 relative to the spacer 18. The spacer 18 has an internal spacer bore 38 and fastener openings 40 corresponding to the internal bore 30 and the fastener openings 34 of the locking plate 16.

The insert 20 is generally cylindrical in configuration and defines a diameter corresponding to the diameter of the internal bores 30, 38 of the locking plate 16 and the spacer 20, respectively. In illustrative embodiments, the insert 20 is received within the internal bores 30, 38 with a tight tolerance. The insert 20 includes an anchor end 42 defining an internal thread 44 dimensioned to threadably engage the anchor member 12. The anchor end 42 projects outwardly from the main body of the insert 20, and may define a smaller dimension, to correspond in dimension so as to be received within the tapered internal bore 29 of the cover 14. In illustrative embodiments, the anchor end 42 slightly tapers in diameter to be received within the tapered internal bore 29 of the cover 14. The anchor end 42 may be received within the internal bore 29 with a tight tolerance relation. The other end of the insert 20 defines a flat closed surface 46. The insert 20 includes three pin receiving channels 48, 50, 52 which traverse the insert 20. The pin receiving channels 48, 50, 52 define an internal dimension generally corresponding to the outer dimension of the locking pin 22. The pin receiving channels 48, 50, 52 are selectively used (e.g., to receive the locking pin 22) in association with the intended use of the anchor apparatus as described hereinbelow. A relief channel 54 may also extend through the insert 20 to retain strength and reduce weight of the insert 20.

Figure 40:
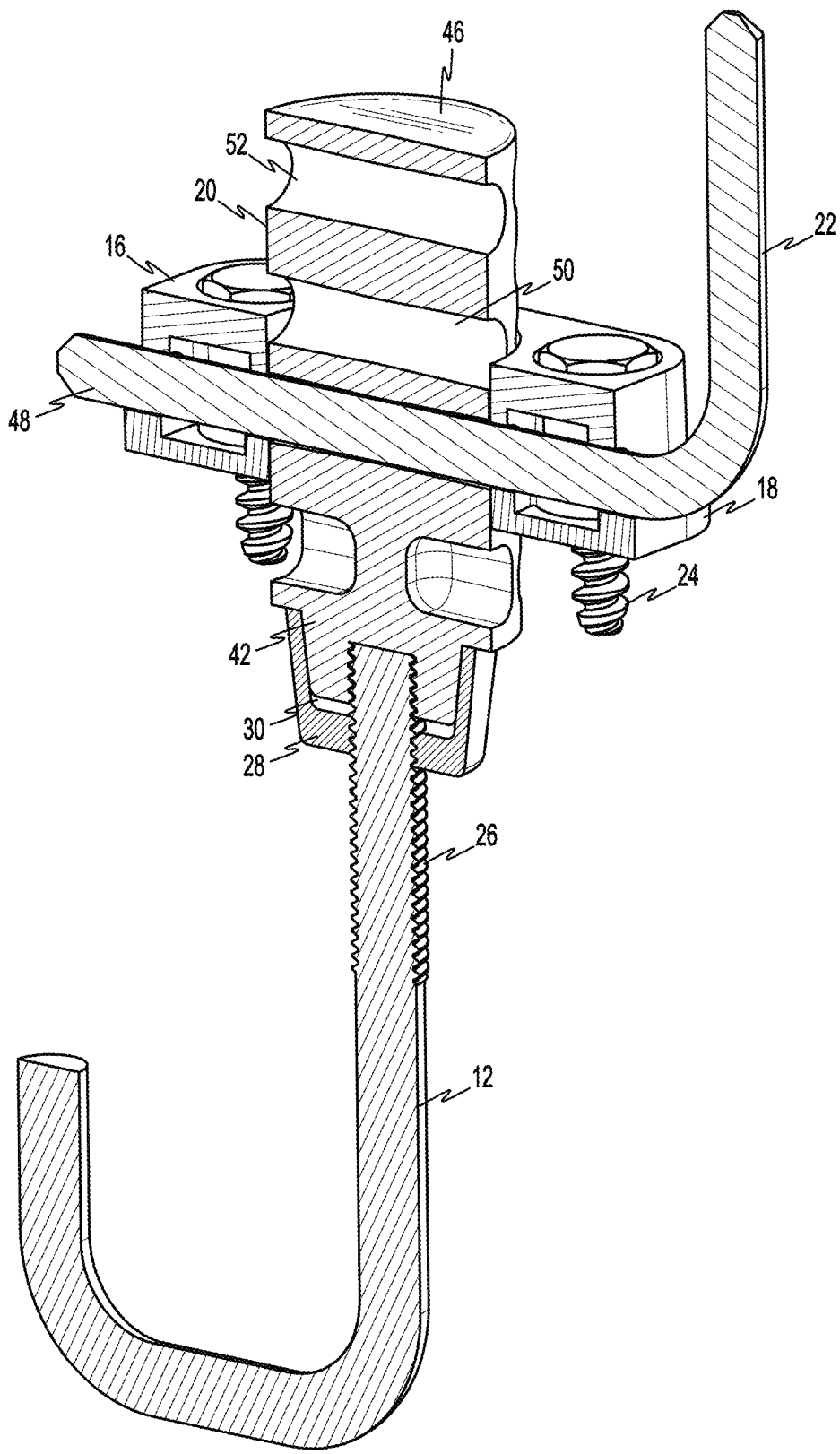
FIG. 40 is an isometric view in cross-section of the anchor apparatus of FIGS. 38 and 39 in accordance with illustrative embodiments of the present disclosure.
Figure 41:
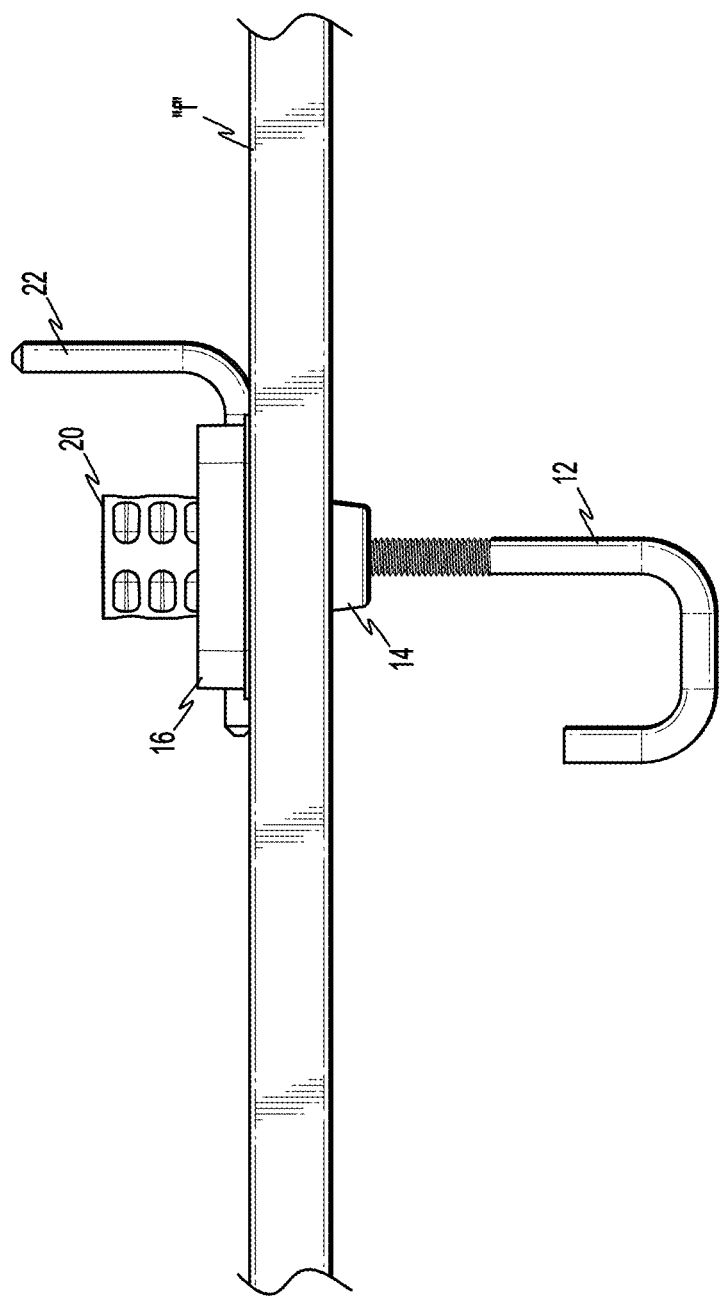
FIGS. 41 and 42 are views illustrating securement of the anchor apparatus of FIGS. 38 and 39 relative to a form board in accordance with illustrative embodiments of the present disclosure.
Figure 42:
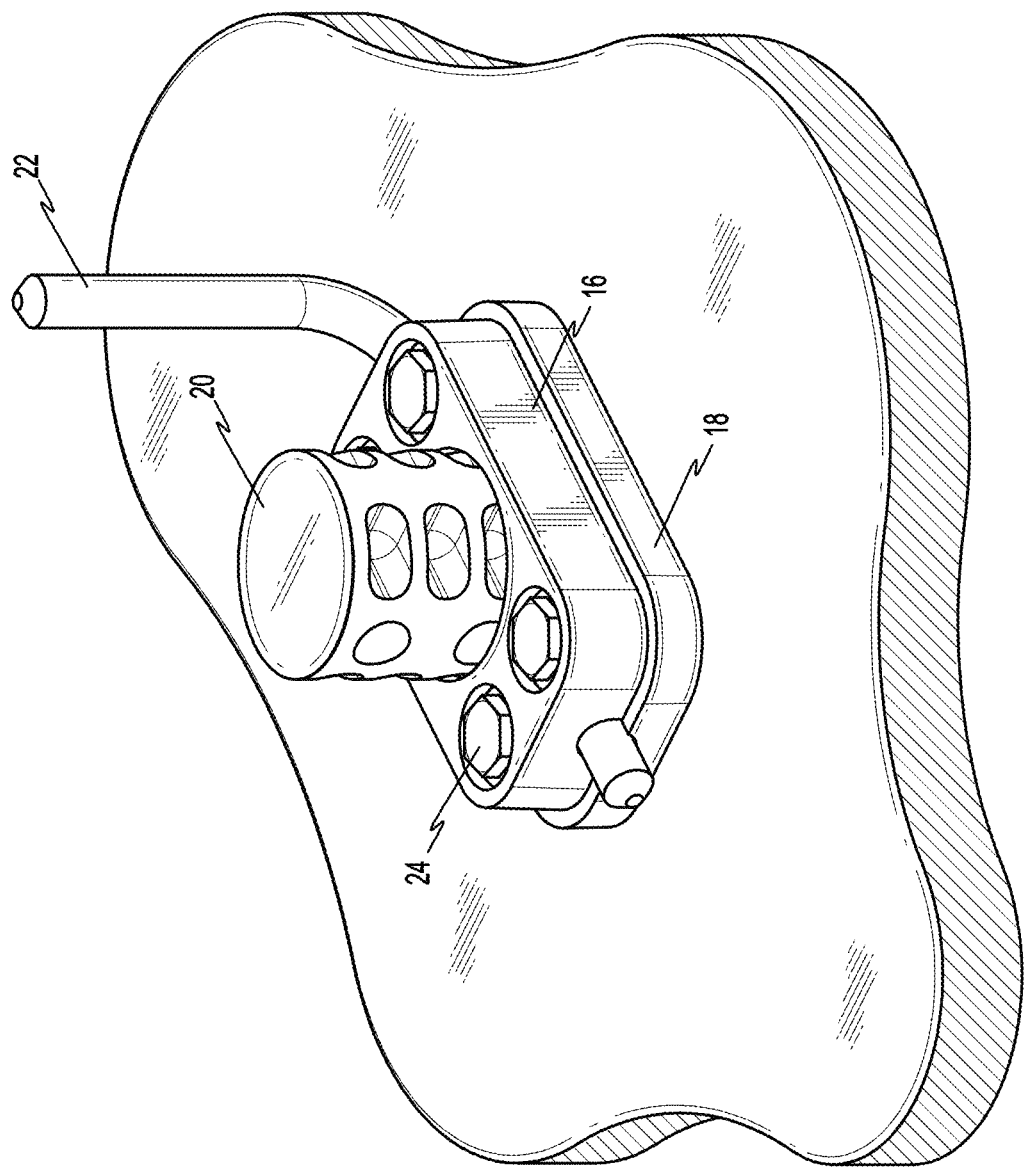
Figure 43:
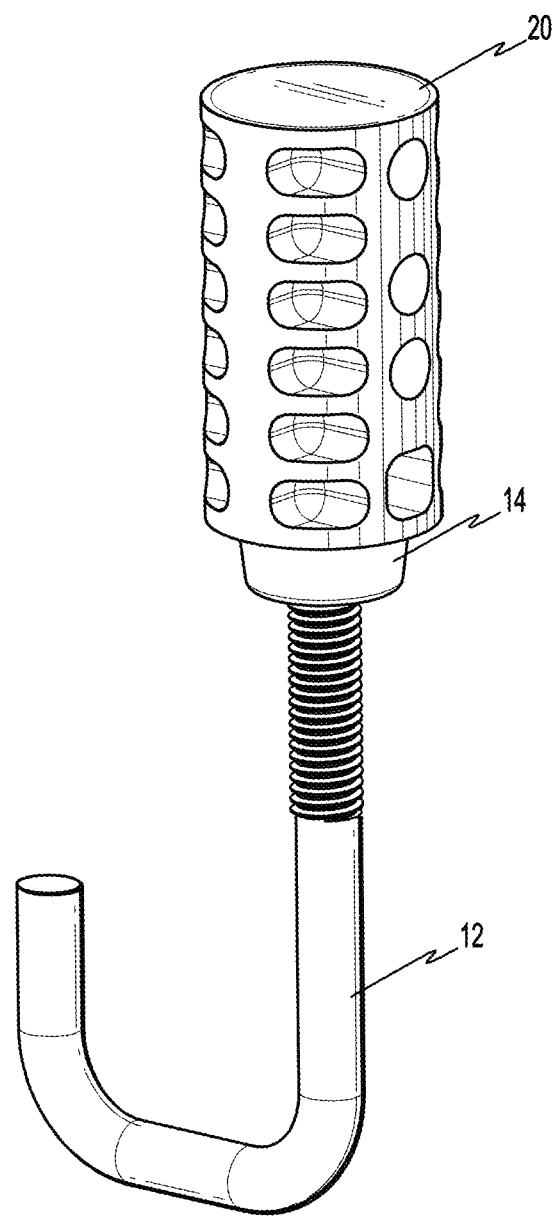
FIG. 43 is a perspective view illustrating the anchor rod secured to the anchor apparatus of FIGS. 38 and 39 in accordance with illustrative embodiments of the present disclosure.
Figure 44:
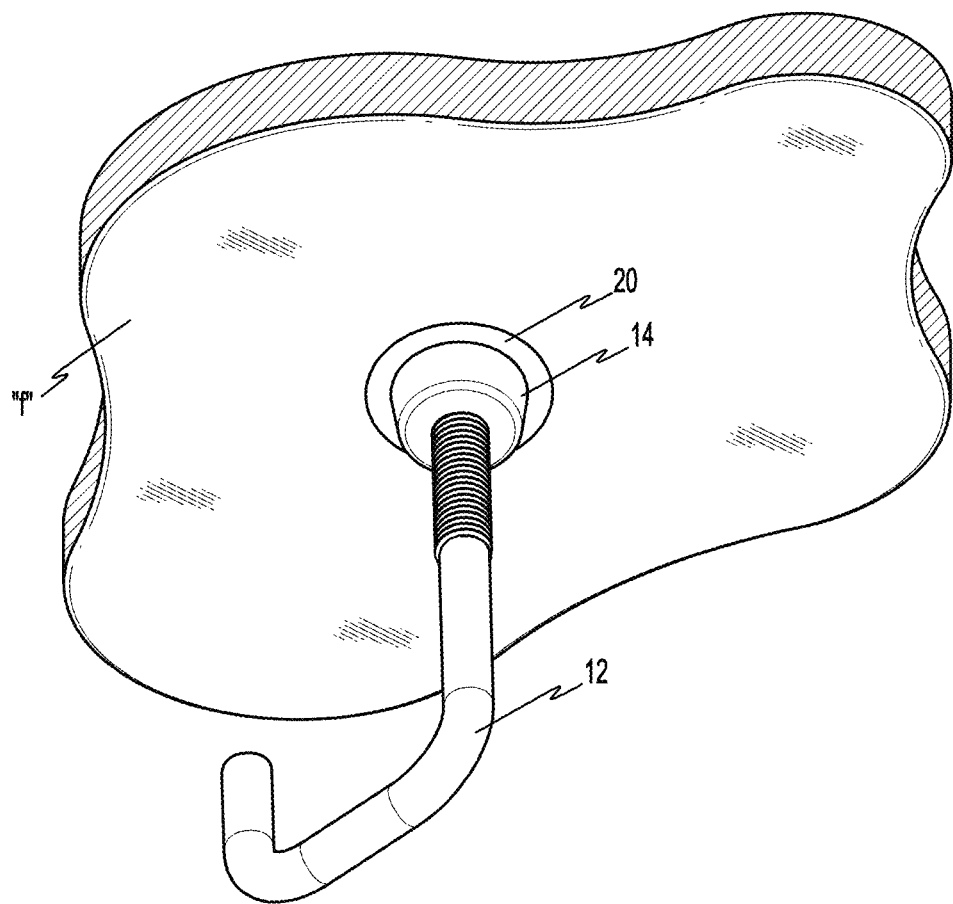
FIG. 44 is another view illustrating securement of the anchor apparatus of FIGS. 38 and 39 relative to a form board in accordance with illustrative embodiments of the present disclosure.
Figure 45:
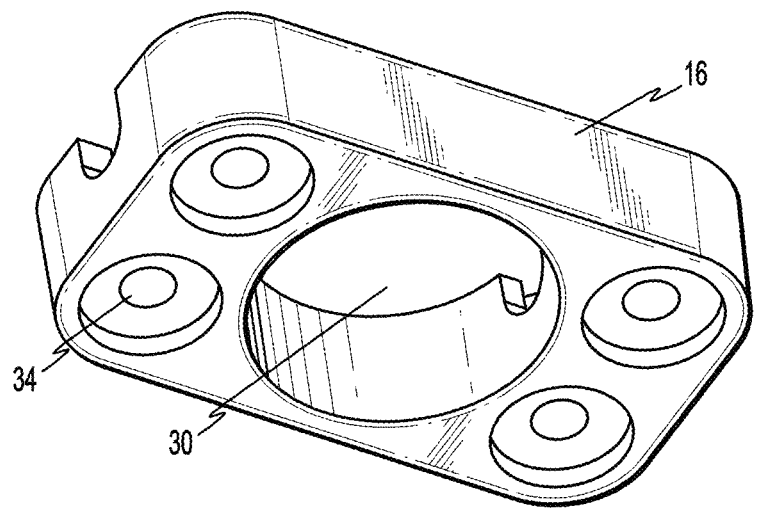
FIG. 45 is a perspective view of a locking plate of the anchor apparatus of FIGS. 38 and 39 in accordance with illustrative embodiments of the present disclosure.
Figure 46:
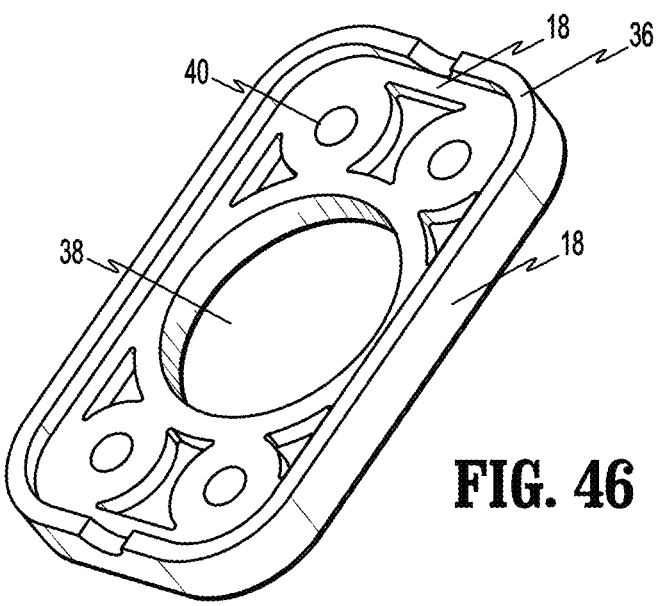
FIG. 46 is a perspective view of a spacer of the anchor apparatus of FIGS. 38 and 39 in accordance with illustrative embodiments of the present disclosure.
Figure 47:
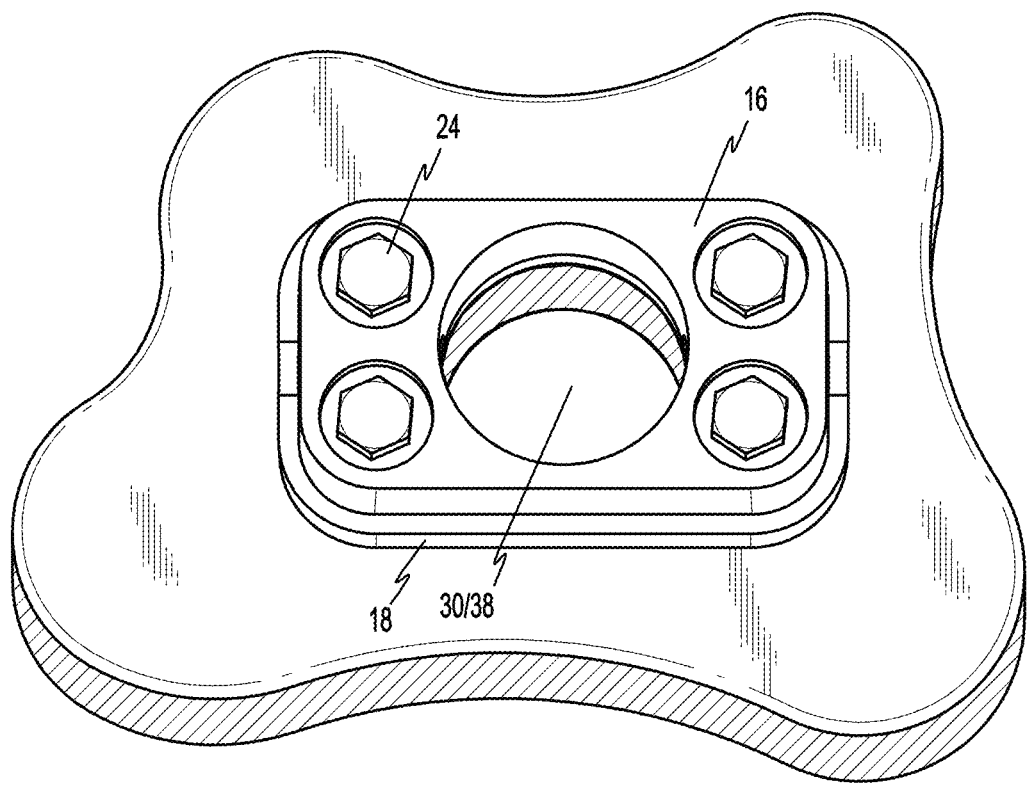
FIG. 47 is a view illustrating securement of the locking plate and the spacer of the anchor apparatus of FIGS. 38 and 39 relative to a form board in accordance with illustrative embodiments of the present disclosure.
Figure 48:
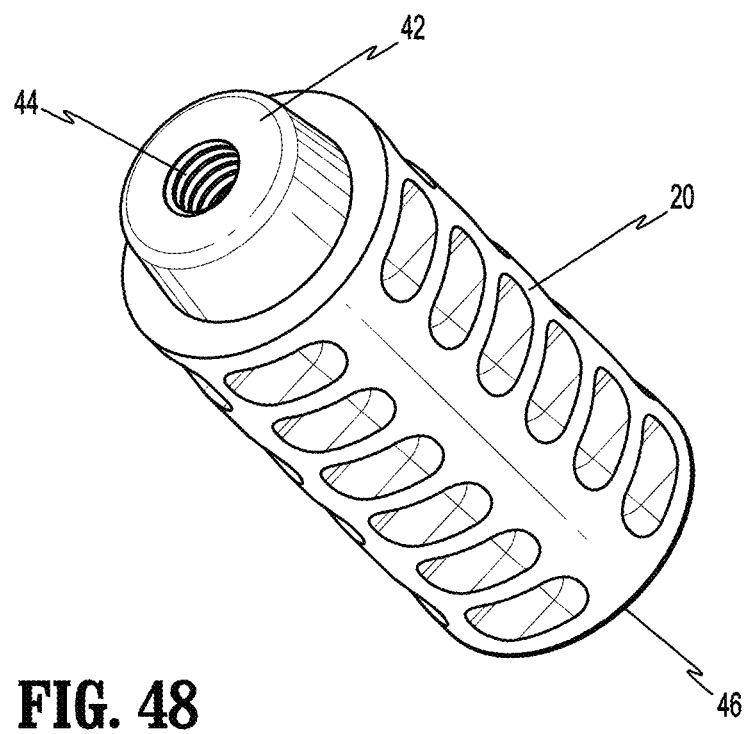
FIGS. 48 and 49 are perspective and elevation views of an insert of the anchor apparatus of FIGS. 38 and 39 in accordance with illustrative embodiments of the present disclosure.
Figure 49:
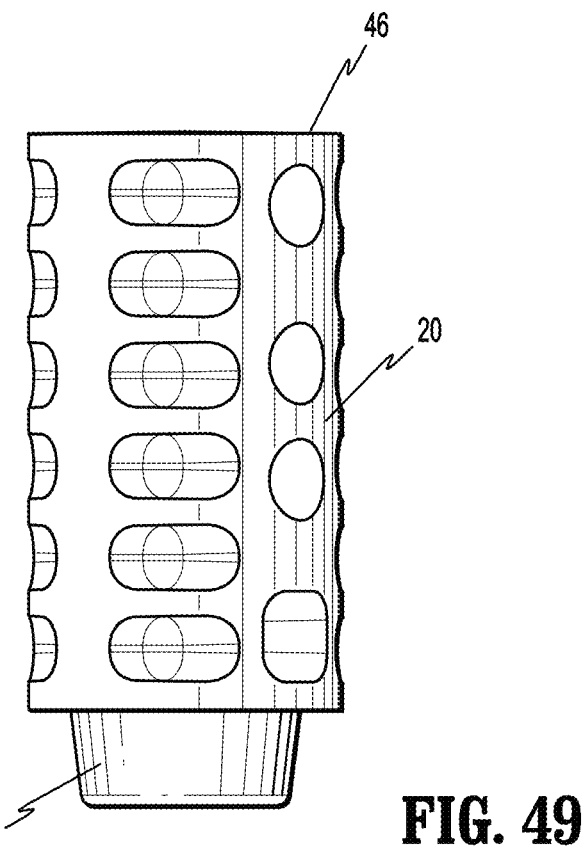
Figure 50:
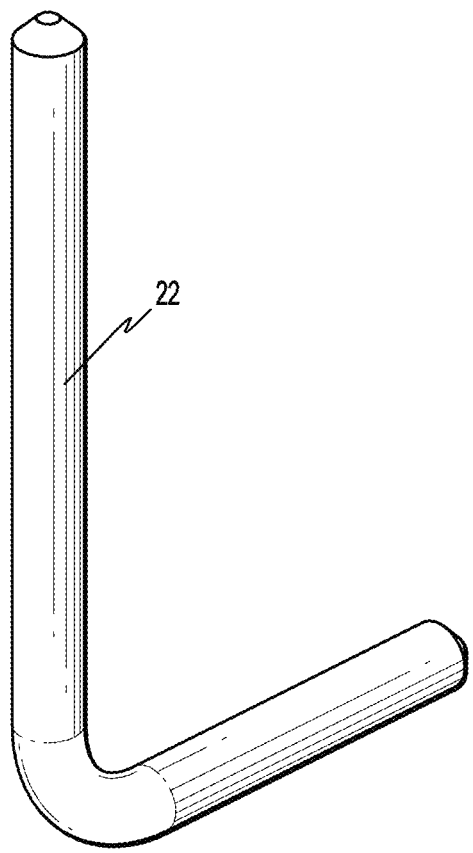
FIG. 50 is a perspective view of a locking pin of the anchor apparatus of FIGS. 38 and 39 in accordance with illustrative embodiments of the present disclosure.
Figure 51:
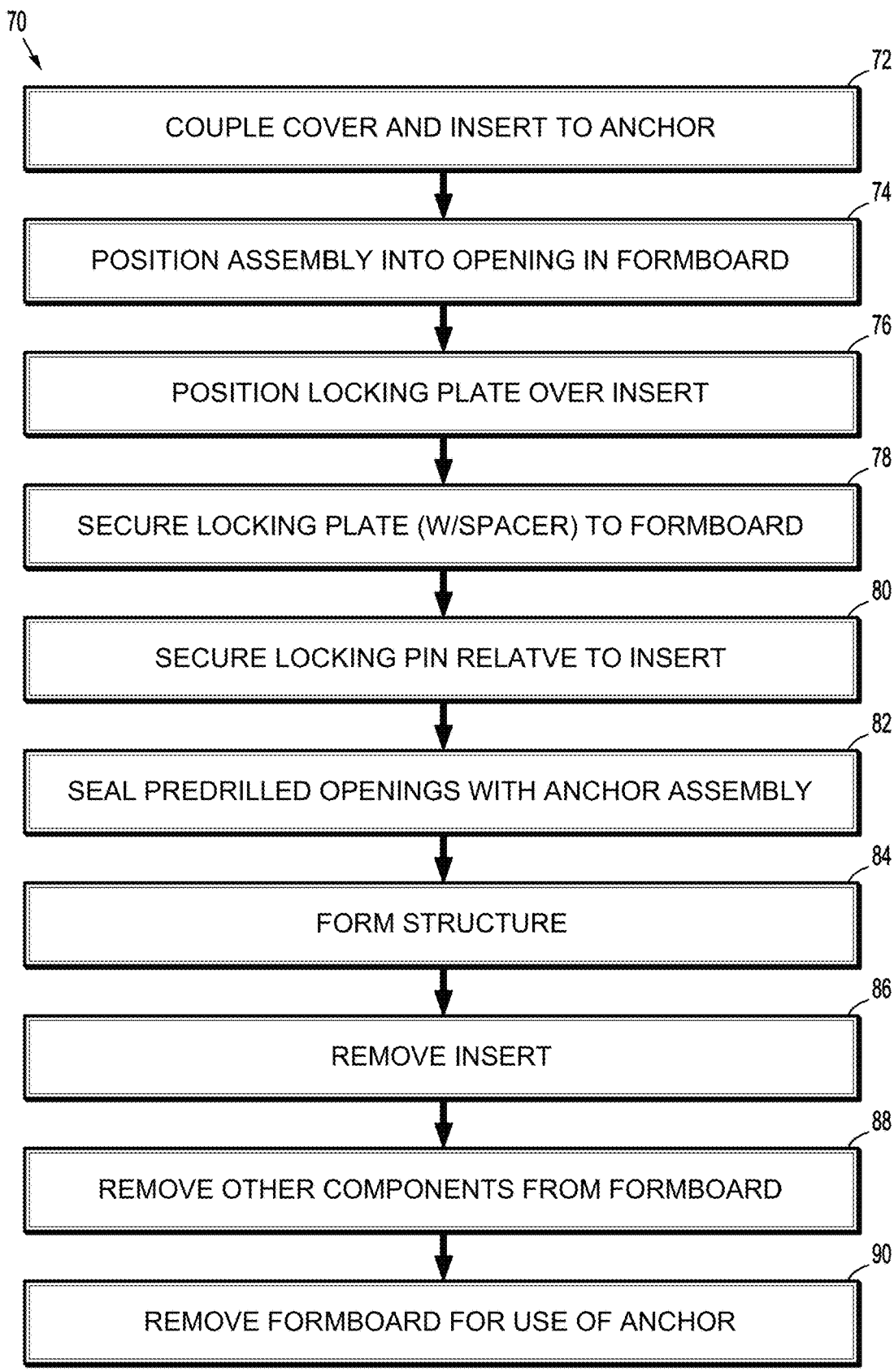
FIG. 51 is a flow chart is a flow chart illustrating a method of use of the anchor apparatus of FIGS. 38 and 39 for embedding in a concrete support in accordance with illustrative embodiments of the present disclosure.

A method of using the anchor apparatus 10 will be discussed. Referring to the flow chart of FIG. 46 of in conjunction with FIGS. 38-46, the process 70 may start by coupling the cover 14 and the insert 20 to the anchor member 12. (STEP 72). In illustrative embodiments, the cover 14 is threaded onto the threaded portion 26 of the anchor member 12 (via the internal threaded portion 28) of the cover 14. The insert 20 is also threaded onto the threaded portion 26 of the anchor 12 via the internal thread 44 of the anchor end 42. The cover 14 and the insert 20 may engage the anchor 12, simultaneously, or in sequence. Thereafter, the assembled unit is positioned within a correspondingly dimensioned opening in the formboard. (STEP 74). In illustrative embodiments, the assembled unit may be positioned through the formboard opening from the outside, i.e., with the anchor member 12 being introduced first within the formboard opening followed by passage of the cover 14 and the insert 20. Thus, the anchor apparatus 10 may be positioned and eventually secured to the formboard 10 from the outside of the formboard cavity or box "b". The opening in the formboard may be predrilled or drilled prior to insertion of the assembled unit. As noted, the formboard opening is drilled to generally correspond to the outer dimension of the insert 20. In illustrative embodiments, the formboard may have multiple predrilled openings, i.e., the formboard is provided with predrilled openings. At STEP 76, the locking plate 16 is positioned over the insert 20 whereby the internal bore of the locking plate 16 receives the insert 20. (FIG. 42). As an option, or, in the alternative, the spacer 18 may be utilized and positioned over the insert 20 whereby the internal bore of the spacer 18 receives the insert 20 followed by positioning of the locking plate 16 over the insert 20. In illustrative embodiments, the spacer 18 is utilized in association with formboards (e.g., plywood) having a smaller thickness, e.g., ¾ inch formboard. The spacer 18 may not be needed in relatively thick formboards, e.g., 1 inch formboard. The peripheral edge 36 of the spacer 18 receives the insert 20 to secure the two components. At STEP 78, the locking plate 16 and the spacer 18 (if used) are secured to the formboard with fasteners 24 advanced through the fastener openings 34, 40 of the locking plate 16 and the spacer 18. The assembled insert 20, cover 14 and anchor member 12 are moved relative to the locking plate 16 to expose pin receiving channel 48. The locking pin 22 is advanced and secured within the pin receiving channel 48. (STEP 80) (FIG. 40). In this position, the anchor apparatus 10 is secured to the formboard box. Multiple anchor apparatuses 10 may be secured to the formboard in a similar manner. In accordance with one optional use, e.g., in association with a predrilled formboard having predrilled openings for reception of multiple anchor apparatus, in the event a predrilled opening is not needed, the insert 20 may be rotated or flipped over (180°) such that the end face 46 of the insert 20 is adjacent the formboard opening. The locking pin 22 is then placed within the pin receiving channel 50 with the end face of the insert 20 flush with respect to the opening of the predrilled formboard. Thus, the predrilled opening is sealed via the insert 20 thereby enabling the closing of any predrilled openings not needed in the process. (STEP 82) As noted the outer dimension of the insert 20 is dimensioned to correspond to the predrilled opening in the formboard. Thereafter, concrete is formed to form the desired column, rail or beam structure. (STEP 84) The locking pin 22 is removed from the pin receiving channel 48 and placed into pin receiving channel 52. The insert 20 is removed by rotating the insert 20 via the locking pin 22 in a reverse (e.g., counterclockwise direction) such that the insert 20 unscrews from the anchor member 12. (STEP 86). Any insert 20 utilized as a plug may be removed by removing the locking pin 22 from the pin receiving channel 50 followed by removal of the insert 20. The locking plate 16 and the spacer 18 may be removed by unscrewing the fasteners 24. (STEP 88). The formboard is removed exposing the internal chamber of the cover 14 and the external thread 26 of the anchor member 12. (STEP 90) The exposed anchor member 12 is then utilized in a manner similar to that previously described in association with FIGS. 16-19.

In illustrative embodiments, the insert 20, locking plate 16, spacer 18, locking pin 22 and fasteners 24 may be reusable at different locations or the like. In addition, the predrilled formboards may be reusable.

In illustrative embodiments, an anchoring system, comprises at least one anchor apparatus, includes an elongate anchor, a locking member mounted to the elongate member; a locking wedge mounted to the elongate anchor, an expansion member mounted to the elongate anchor adjacent the locking wedge and an anchor base coupled to the elongate anchor. The locking member is advanceable to move the locking wedge to thereby transition the expansion member from a closed approximated condition to an expanded locked condition to secure a frame between the locking member and the expansion member.

The locking member may define a central opening configured to at least partially receive the elongate anchor, and the locking member and the elongate anchor include cooperating structure to advance the locking member relative to the elongate member. The locking member may define an internal thread at least partially circumscribing the central opening and wherein the elongate anchor includes an external thread configured to threadably engage with the internal thread of the locking member. The expansion member may include first and second expansion segments where the first and second expansion segments are configured to move relative to each other from the closed approximated condition to the expanded locked condition upon advancement of the locking wedge. The first and second expansion segments may include cooperating internal tapered surfaces configured to cooperate with corresponding structure of the locking wedge to cause transition of the expansion member from the closed approximated condition to the expanded locked condition. The locking wedge defines a central wedge opening dimensioned to receive the elongate anchor and is slidably mounted on the elongate anchor.

The first expansion segment may include one expansion mount depending therefrom and the second expansion segment may include one expansion slot configured to receive the expansion mount to couple the first and second expansion segments. The anchor base may include at least one anchor mount and the expansion member may include at least one recess. The at least one anchor mount traverses the at least one anchor recess during transition of the expansion member from the closed approximated condition to the expanded locked condition.

The anchor base may include a threaded aperture cooperatively dimensioned to threadably engage the external thread of the elongate anchor to secure the anchor base to the elongate anchor. The locking member may define an internal cavity dimensioned to at least partially receive the locking wedge.

In another illustrative embodiments, a method comprises introducing at least at least one anchor apparatus at least partially through an opening in a form used to create a concrete support; positioning an anchor base and an expansion member within the opening and on one side of the form; positioning a locking member and a locking wedge on the other side of the form; positioning an elongate anchor through an aperture of the locking member; advancing the locking member along the elongate anchor to advance the locking wedge whereby the locking wedge engages the expansion member to cause the expansion member to move from a closed approximated condition to an expanded locked condition; and securing the locking member relative to the form to secure the form between at least the locking member and the expansion member.

The method may further include depositing concrete in the form to create the concrete support whereby the elongate anchor is at least partially embedded in the support. The method may further include removing at least the anchor base to expose an end section of the elongate anchor extending from the support. The method may further include attaching a tool to the end section of the elongate anchor.

Advancing the locking member may include cooperatively threadably engaging an internal thread of the locking member with an external thread of the elongate anchor. Advancing the locking member may include advancing the locking wedge to cause first and second expansion segments of the expansion member to move relative to each other from the closed approximated condition to the expanded locked condition. Advancing the locking member may include sliding the locking wedge along the external thread of the elongate anchor. The locking member may define an internal cavity and wherein removing at least the anchor base exposes the end section of the elongate anchor.

The method may further include supporting construction equipment with the tool.

The form may comprise a metallic material.

In another illustrative embodiment, an anchoring system for installation in a support, comprises one or more anchoring apparatuses, including a locking plate configured for securement relative to a first side of a form board used to form a concrete support, the locking plate defining a longitudinal axis and defining an internal bore; an elongate anchor including a connector segment at one end for connecting with a construction tool, the elongate anchor being advanceable through the internal bore of the locking plate; an insert positionable within the internal bore of the locking plate, the insert couplable to the connector segment and defining at least one channel; a locking pin insertable within the at least one channel of the insert to secure the insert relative to the locking plate; and a cover mounted about the elongate anchor and movable for positioning over at least a portion of the insert, the cover engageable with a second side of the framework.

The insert may define a plurality of longitudinal spaced channels for receiving the locking pin where the spaced channels enable selective securement of the insert relative to the locking plate. The cover may define an internal cavity for reception of the at least the portion of the insert. The at least a portion of the insert defines a frusto-conical portion and wherein the internal bore of the cover defines a correspondingly dimensioned frusto-conical shape. The connecting segment of the elongate anchor defines an external threaded portion and the insert, and the cover include respective internal threaded portions for cooperatively engaging the external threaded portion of the elongate anchor. A spacer plate for mounting relative to the locking plate ay be provided.

In another illustrative embodiment, a method, comprises positioning a locking plate relative to a first side of a form board of a form used to form a concrete support, the locking plate defining a longitudinal axis and defining an internal bore; advancing an elongate anchor through the internal bore of the locking plate and an opening in the form board; positioning an insert within the internal bore of the locking plate, coupling the insert to the elongate member; inserting a locking pin through at least one channel of the insert to secure the insert relative to the locking plate; and advancing a cover about the elongate anchor and advancing the cover toward the second side of the form board to engage the second side.

The method may include depositing concrete in the form to create the concrete support whereby the elongate anchor is at least partially embedded in the support. The method may further include removing the cover to expose an end section of the elongate anchor extending from the support. Coupling the insert includes cooperatively threadably engaging an internal thread of the insert with an external thread of the elongate anchor. Advancing the cover includes cooperatively threadably engaging an internal thread of the insert with an external thread of the elongate anchor.

The present disclosure is directed to a method comprising generating a building model of a building to be constructed at a construction site, identifying within the building model positional locations for installation of one or more anchor apparatuses within structural elements of the building model, transmitting the building model to a portable computing device at the construction site and identifying the location of the portable computing device to a given positional location. At least the generating, identifying, transmitting and identifying steps are implemented via at least one processing device comprising a processor and a memory. The method may include installing one anchor apparatus at the given positional location. The method may further include identifying the location of a second given positional location and further including installing one anchor apparatus at the given positional location. The structural elements may include at least one of beams, columns, girders, floors and ceilings. The structural elements may include concrete or cement, e.g., initially poured concrete. Generating a model may include utilizing a building information modeling module of a server. The method may further include utilizing a portable computing device at the construction site to assist an operator to identify the corresponding positional locations of the building. Identifying within the building model positional locations may include utilizing a positional indicator module within the portable computing device to indicate a location of the portable computing device relative to a given positional location on the model. Utilizing the positional indicator may include utilizing at least one component or sensor of the portable computing device to assist in identifying the location of the portable computing device relative to the given positional location. Utilizing at least one component or sensor of the portable computing device may include receiving feedback from one or more of WIFI, Bluetooth, a camera, a GPS sensor, a gyroscope, a magnetometer, an accelerometer, a proximity sensor or an RFID sensor of the personal computing device. The method may further include scanning visual indicia data on the one or more anchoring apparatuses to ascertain information pertaining to an attribute of manufacture of the one or more anchoring apparatuses or an attribute of installation of the one or more anchoring apparatuses. The method may further include transmitting the visual indicia data to one of the portable computing device or a server associated with the portable computing device. The attribute of manufacture may include at least one of manufacture, distributer, lot or model of the one or more anchoring apparatuses. The attribute of installation may include at least one of installer, installation date or supervisor. Scanning visual indicia data may include utilizing the RFID sensor of the personal computing device to can RFID tags on components of the one or more anchor apparatuses.

In other illustrative embodiments, a computer program product including a non-transitory computer-readable storage medium encoded with computer program code that, when executed on a processor of a computer, causes the computer to implement the steps of the present disclosure. In other illustrative embodiments, a system comprises one or more processors operatively coupled to one or more memories configured to: generate a building model of a building to be constructed at a construction site; identify within the building model positional locations for installation of one or more anchor apparatuses within structural elements of the building model; transmit the building model to a portable computing device at the construction site; and identify the location of the portable computing device to a given positional location.

It is to be appreciated that combinations of the different implementation environments are contemplated as being within the scope of embodiments of the invention. One of ordinary skill in the art will realize alternative implementations given the illustrative teachings provided herein. Although the illustrative embodiments of the present disclosure have been described herein with reference to the accompanying drawings, the above description, disclosure, and figures should not be construed as limiting, but merely as exemplifications of particular embodiments. It is to be understood, therefore, that the disclosure is not limited to those precise embodiments, and that various other changes and modifications may be effected therein by one skilled in the art without departing from the scope or spirit of the disclosure. For example, although threaded couplings are illustrated for connecting or coupling some of the components, it is envisioned that any corresponding structure may be substituted such as bayonet couplings, snap fits, tongue-groove arrangements etc.

The terminology used herein is for the purpose of describing particular embodiments only and is not intended to be limiting of the invention. As used herein, the singular forms "a," "an" and "the" are intended to include the plural forms as well, unless the context clearly indicates otherwise. Additionally, the terms "comprises" and/or "comprising," as used herein, specify the presence of stated values, features, steps, operations, modules, elements, and/or components, but do not preclude the presence or addition of another value, feature, step, operation, module, element, component, and/or group thereof.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments.

The term construction site is not limited to commercial and residential buildings but includes all sites subject to buildings, repair, maintenance, etc. Such sites include but are not limited to commercial and residential buildings, tunnels, bridges, stadiums, schools, exterior façade systems, all precast concrete products and rigging points. The anchor apparatus may be installed horizontally, vertically and/or any other orientation encountered during construction at a construction site, and all wet cast applications.

Although the illustrative embodiments of the present disclosure have been described herein with reference to the accompanying drawings, the above description, disclosure, and figures should not be construed as limiting, but merely as exemplifications of particular embodiments. It is to be understood, therefore, that the disclosure is not limited to those precise embodiments, and that various other changes and modifications may be effected therein by one skilled in the art without departing from the scope or spirit of the disclosure. For example, although threaded couplings are illustrated for connecting or coupling some of the components, it is envisioned that any corresponding structure may be substituted such as bayonet couplings, snap fits, tongue-groove arrangements etc.

What is claimed is:

1. An anchoring system for installation in a support, which comprises:
    one or more anchoring apparatuses, including:
        a locking plate configured for securement relative to a first side of a form board used to form a concrete support, the locking plate defining a longitudinal axis and defining an internal bore;
        an elongate anchor including a connector segment, the elongate anchor being advanceable through the internal bore of the locking plate;
        an insert positionable within the internal bore of the locking plate, the insert couplable to the connector segment and defining a plurality of longitudinally spaced channels;
        a locking pin insertable within a select one of the plurality of longitudinally spaced channels of the insert to secure the insert at a select longitudinal position relative to the locking plate; and
        a cover mounted about the elongate anchor and movable for positioning over at least a portion of the insert, the cover engageable with a second side of the form board.

2. The anchoring system according to claim 1 wherein the cover defines an internal bore for reception of the at least the portion of the insert.

3. The anchoring system according to claim 2 wherein the at least a portion of the insert defines includes a frusto-conical portion and wherein the internal bore of the cover defines a correspondingly dimensioned frusto-conical shape.

4. The anchoring system according to claim 2 wherein the connector segment of the elongate anchor defines an external threaded portion and the insert and the cover include respective internal threaded portions for cooperatively engaging the external threaded portion of the elongate anchor.

5. The anchoring system according to claim 2 including a spacer plate for mounting relative to the locking plate.

6. The anchoring system according to claim 5 wherein the spacer plate is configured to be coupled to the locking plate.

7. An anchoring system for installation in a support, which comprises:
    one or more anchoring apparatuses, including:
        a locking plate configured for securement relative to a first side of a form board used to form a concrete support, the locking plate defining a longitudinal axis and defining an internal bore;
        an elongate anchor including a connector segment, the elongate anchor being advanceable through the internal bore of the locking plate;
        an insert positionable within the internal bore of the locking plate, the insert couplable to the connector segment of the elongate anchor and defining at least one channel;
        a locking pin insertable within the at least one channel of the insert to secure the insert relative to the locking plate;
        a cover mounted about the elongate anchor and movable for positioning over at least a portion of the insert, the cover engageable with a second side of the form board; and
    one or more fasteners receivable within one or more fastener openings of the locking plate to secure the locking plate to the form board.

8. The anchoring system according to claim 7 including a spacer plate for mounting relative to the locking plate and wherein the spacer plate includes one or more fastener openings for receiving the one or more fasteners.

9. The anchoring system according to claim 7 wherein the insert defines a plurality of longitudinally spaced channels and wherein the locking pin is insertable within a select one of the plurality of longitudinally spaced channels of the insert to secure the insert at a select longitudinal position relative to the locking plate.

10. A method, comprising:
    positioning a locking plate relative to a first side of a form board of a form used to form a concrete support, the locking plate defining a longitudinal axis and having an internal bore;
    advancing an elongate anchor through the internal bore of the locking plate and an opening in the form board;
    positioning an insert within the internal bore of the locking plate;
    coupling the insert to the elongate anchor;
    inserting a locking pin through at least one channel of the insert to secure the insert relative to the locking plate; and
    advancing a cover about the elongate anchor and advancing the cover toward a second side of the form board to engage the second side.

11. The method according to claim 10 including depositing concrete in the form to create the concrete support whereby the elongate anchor is at least partially embedded in the concrete support.

12. The method according to claim 11 including removing the cover form board to expose an end section of the elongate anchor extending from the concrete support.

13. The method according to claim 12 wherein coupling the insert includes cooperatively threadably engaging an internal thread of the insert with an external thread of the elongate anchor, the external thread including the end section of the elongate anchor.

14. The method according to claim 12 wherein advancing the cover includes cooperatively threadably engaging an internal thread of the cover insert with an external thread of the elongate anchor.

15. The method according to claim 13 including removing the insert from the elongate anchor by threadably disengaging the internal thread of the insert relative to the external thread of the elongate anchor.

16. The method according to claim 15 wherein removing the insert is performed prior to removal of the form board.

17. The method according to claim 16 further including coupling a tool to the external thread of the elongate anchor subsequent to removing the form board.

18. The method according to claim 10 wherein inserting the locking pin includes selecting a select channel of one of a plurality of longitudinally spaced channels to secure the insert at a select longitudinal position relative to the locking plate.

\* \* \* \* \*